(12) United States Patent
Nickolov et al.

(10) Patent No.: US 8,364,638 B2
(45) Date of Patent: Jan. 29, 2013

(54) AUTOMATED FILER TECHNIQUE FOR USE IN VIRTUALIZED APPLIANCES AND APPLICATIONS

(75) Inventors: Peter Nickolov, Laguna Niguel, CA (US); Leonid Kalev, Haifa (IL); Eric Tessler, Aliso Viejo, CA (US)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 13/003,863

(22) PCT Filed: Jun. 5, 2009

(86) PCT No.: PCT/US2009/046503
§ 371 (c)(1),
(2), (4) Date: Mar. 3, 2011

(87) PCT Pub. No.: WO2009/149416
PCT Pub. Date: Dec. 10, 2009

(65) Prior Publication Data
US 2011/0153697 A1    Jun. 23, 2011

Related U.S. Application Data

(63) Continuation-in-part of application No. 12/400,710, filed on Mar. 9, 2009.

(60) Provisional application No. 61/058,921, filed on Jun. 5, 2008, provisional application No. 61/058,923, filed on Jun. 5, 2008.

(51) Int. Cl.
*G06F 12/00* (2006.01)
*G06F 17/00* (2006.01)

(52) U.S. Cl. ........................................ 707/636; 707/831

(58) Field of Classification Search .......... 707/600–602, 707/620–625, 634–640, 650–655, 781–788, 707/821–831; 715/702–705, 254–256
See application file for complete search history.

(56) References Cited

U.S. PATENT DOCUMENTS

| 2007/0038656 A1* | 2/2007 | Black ............................ 707/100 |
| 2011/0119748 A1* | 5/2011 | Edwards et al. ................. 726/12 |
| 2011/0167338 A1* | 7/2011 | Pflug ............................ 715/255 |
| 2011/0191674 A1* | 8/2011 | Rawley et al. ................. 715/702 |

* cited by examiner

*Primary Examiner* — Wilson Lee
(74) *Attorney, Agent, or Firm* — Baker Botts L.L.P.

(57) ABSTRACT

Various techniques are disclosed for facilitating manipulation of virtualized storage volumes and/or file systems of one or more different types of operating systems (OSs) implemented on distributed computer systems. According to embodiments, various aspects may be directed to different embodiments of virtualized filer appliances and/or filer applications which may be used for facilitating manipulation of virtualized storage volumes and/or file systems of one or more different types of operating systems (OSs) implemented on distributed computer systems. In at least one embodiment, a filer appliance may be implemented as a virtual appliance that includes functionality for performing automated file-level and/or volume-level operations for a selected set of file systems. In one embodiment, a filer appliance may be implemented as a virtual machine which is configured or designed to handle managing of one or more volumes. In one embodiment, the filer appliance may include one or more other virtual interfaces for interfacing with one or more virtual volumes and/or one or more other virtual appliances, virtual applications, etc. Various other techniques are disclosed herein for facilitating dynamic and automated configuration of virtual appliances implemented at distributed computing systems.

10 Claims, 7 Drawing Sheets

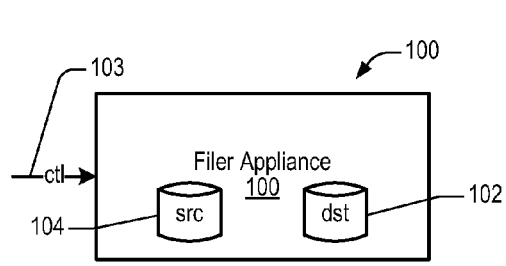
Fig. 1
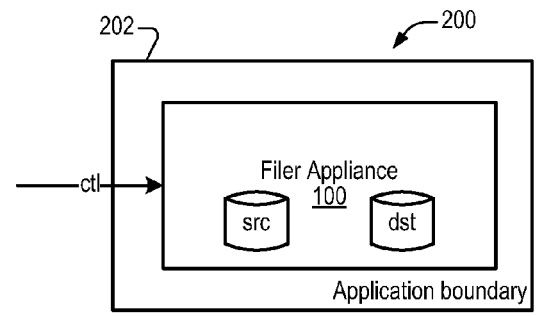
Fig. 2
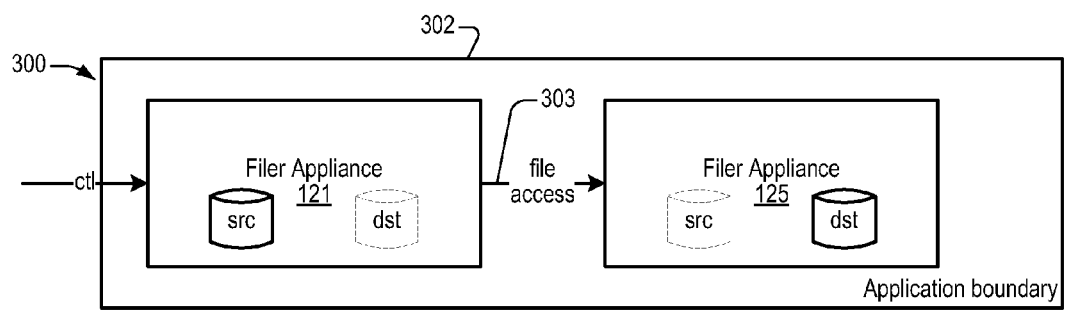
Fig. 3
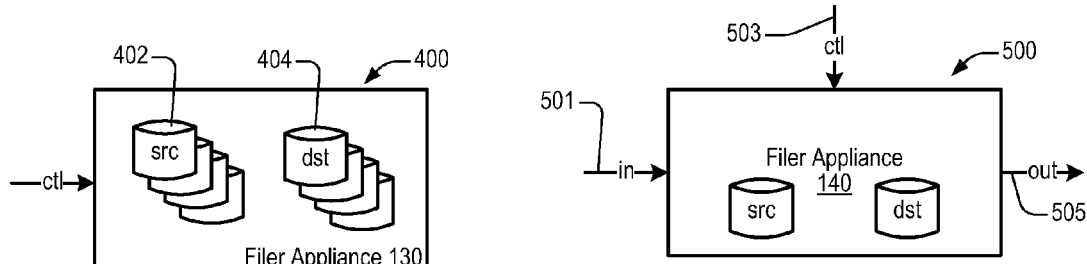
Fig. 4
Fig. 5
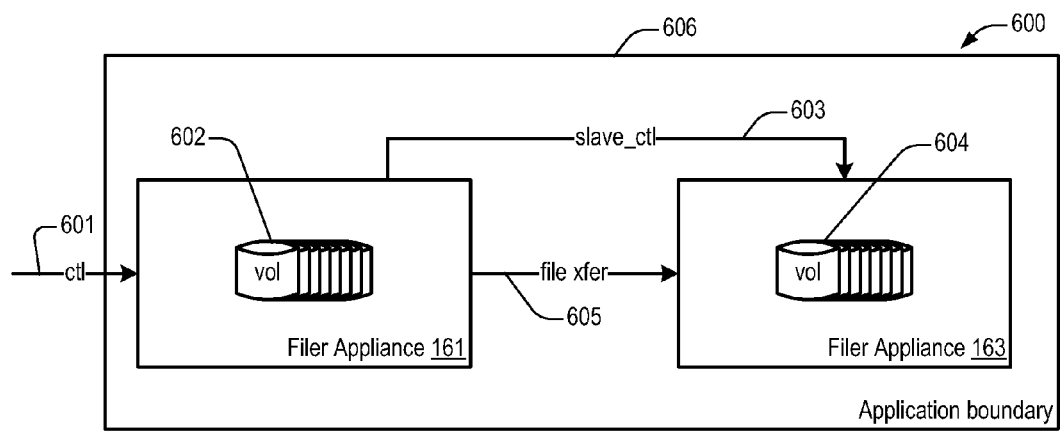
Fig. 6

Fig. 12

AUTOMATED FILER TECHNIQUE FOR USE IN VIRTUALIZED APPLIANCES AND APPLICATIONS

RELATED APPLICATION DATA

The present application claims benefit of U.S. Provisional Patent Application Ser. No. 61/058,923, titled, AUTOMATED FILER TECHNIQUE FOR USE IN VIRTUALIZED APPLIANCES AND APPLICATIONS, naming Nickolov et al. as inventors, and filed Jun. 5, 2008, the entirety of which is incorporated herein by reference for all purposes.

The present application claims benefit of U.S. Provisional Patent Application Ser. No. 61/058,921, titled, AUTOMATED FILER TECHNIQUE FOR USE IN VIRTUALIZED APPLIANCES AND APPLICATIONS, naming Nickolov et al. as inventors, and filed Jun. 5, 2008, the entirety of which is incorporated herein by reference for all purposes.

The present application is a continuation-in-part of U.S. patent application Ser. No. 12/400,710, titled, GLOBALLY DISTRIBUTED UTILITY COMPUTING CLOUD, naming Nickolov et al. as inventors, and filed Mar. 9, 2009, the entirety of which is incorporated herein by reference for all purposes.

BACKGROUND

The present disclosure relates to gaming machines such as slot machines and video poker machines. More particularly, the present disclosure relates to automated techniques for use in virtualized appliances and applications.

In utility computing environments, a grid may be described as a distributed network of computer system, which comprises of heterogeneous and non-dedicated elements.

The heterogeneity of a grid is not only defined in terms of computing elements and operating systems but also in terms of implementation of policies, policy decisions and the environment. A long-term vision of enterprise grid computing community is non dedicated seamless interoperability of different disparate systems which may be part of the same organization or different organizations.

Traditionally, applications were developed for a target environment that was homogeneous, reliable, secure, and centrally managed. However, last decade has seen the development and growth of internet technologies, which resulted in the advent of collaborative computing and data sharing. As a result, newer modes of interaction have evolved resulting in the need and use of distributed resources. Organizational resources may be data or information resources, compute resources, infrastructure resources, human resources and so on. Recently, organizations have begun to realize the benefits of outsourcing, where nonessential elements of their information technology requirements are outsourced to various forms of service providers. These have resulted in requirements for distributed application development and deployment on heterogeneous environments.

Presently, applications and middleware are typically developed for a specific platform (e.g., Windows NT, Linux, UNIX, a mainframe, J2EE, Microsoft NET) that provides a hosting and runtime environment for applications. The capabilities provided by such platforms may range from integrated resource management functions to database integration, clustering services, security, workload management, and problem determination—with different implementations, semantic behaviors, for these functions on different platforms.

BRIEF DESCRIPTION OF THE DRAWINGS

FIG. 1 shows an example embodiment of a filer appliance 100 in accordance with what at least one embodiment.

FIG. 2 shows an example embodiment of a filer application 200 which includes a filer appliance (e.g., 100).

FIG. 3 shows an example embodiment of a composite filer appliance 300 in accordance with a specific embodiment.

FIG. 4 shows an example embodiment of a filer appliance 400 in accordance with a specific embodiment.

FIG. 5 shows an example embodiment of a filer appliance 500 in accordance with a specific embodiment.

FIG. 6 shows an example embodiment of a filer application 600 in accordance with a specific embodiment.

FIG. 12 illustrates a specific and specific example embodiment of a graphical user interface (GUI) which may be used for implementing various functionality and/or other aspects described herein.

DETAILED DESCRIPTION OF EXAMPLE EMBODIMENTS

Overview

Figure 7:
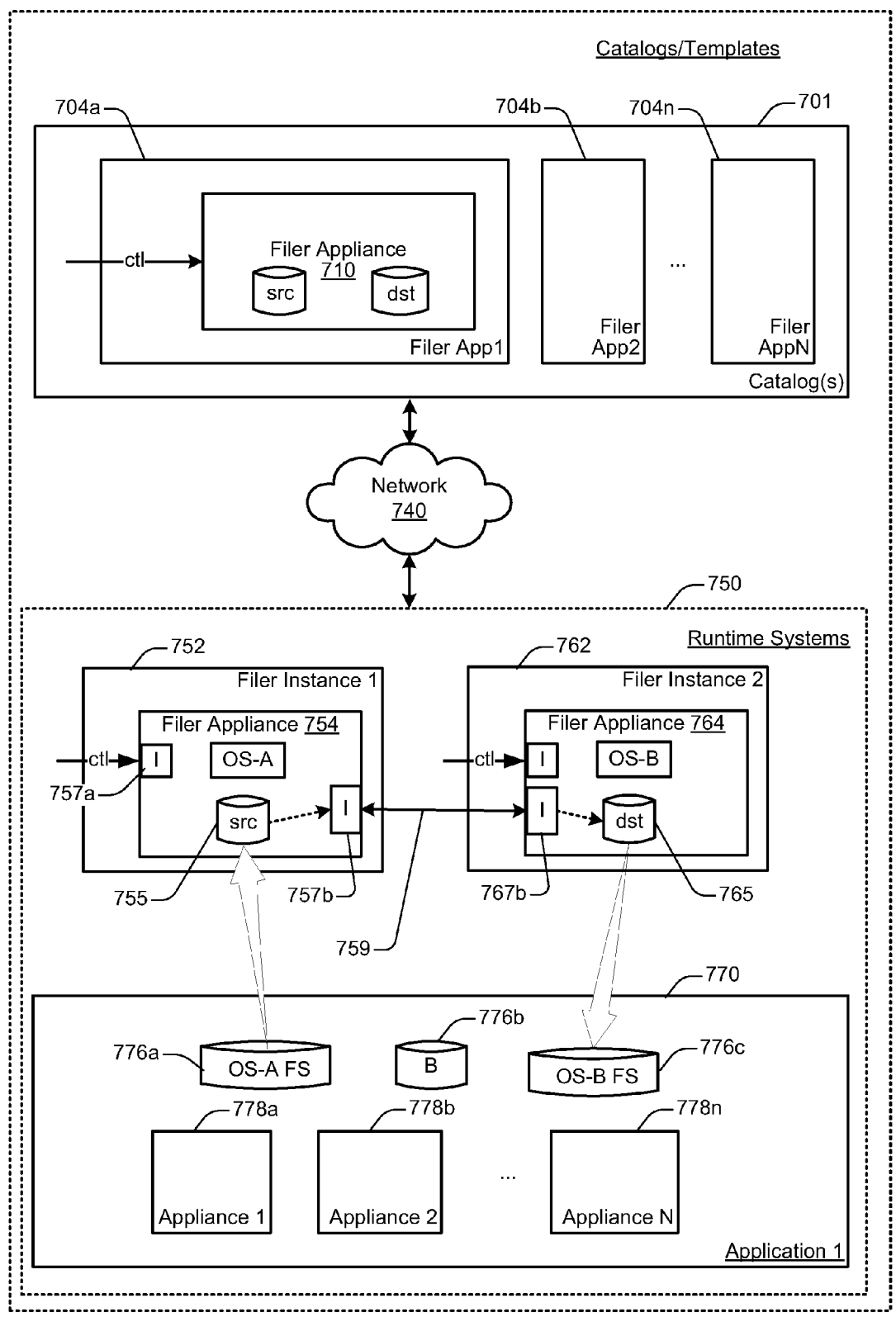
FIG. 7 illustrates an example embodiment of a virtualized distributed computing system 700 which may be used for implementing various aspects described herein.

Various aspects described or referenced herein are directed to different methods, systems, and computer program products for facilitating manipulation of a file system on a virtual storage volume of a distributed computing system. In at least one embodiment, the distributed computing system comprises a first plurality of virtual filer appliances including a first virtual filer appliance operable to perform at least one file system manipulation on at least one file system type, In at least one embodiment, manipulation of a file system on a virtual storage volume may include, but is not limited to, one or more of the following (or combinations thereof):

- identifying, for performing a first file system manipulation, a first virtual storage volume having a first file system, the first file system corresponding to a first file system type;
- identifying, from the first plurality of virtual filer appliances, a selected virtual filer appliance that is suitable for performing the first file system manipulation at the first virtual storage volume, the first virtual filer appliance including an image of an operating system (OS) operable to be loaded or booted in a first virtual machine to thereby enable a first running instance of the first virtual filer appliance to be created or instantiated at the distributed computing system;
- automatically starting an instance of the selected virtual filer appliance;
- automatically providing the instance of the selected virtual filer appliance with access to the first virtual storage volume.

Other aspects described or referenced herein are directed to different methods, systems, and computer program products for facilitating manipulation of a file system on a virtual storage volume of a distributed computing network, which, for example, may include, but is not limited to, one or more of the following (or combinations thereof):

- identifying a first file system type for use in accessing files at a first virtual storage volume of the distributed computing network;
- identifying, using the first file system type, a first virtual application suitable for manipulating a first file system at the first virtual storage volume corresponding to the first file system type, wherein the first virtual application includes at least one virtual appliance, the first virtual application including an image of an operating system (OS) operable to be loaded or booted in a first virtual machine to thereby enable a first running instance of the first virtual application to be created or instantiated at the distributed computing network;
- identifying a first running instance of first virtual application for use in manipulating the first file system on the first virtual storage volume;
- automatically providing the first instance of the first virtual application with access to the first virtual storage volume;
- automatically providing the first instance of the first virtual application with instructions for causing the first instance of the first virtual application to perform at least one file system operation at the first file system.

In at least one embodiment, one or more virtual appliances/applications may be utilized for facilitating remote file access to remotely located virtual storage volumes of a distributed computing network. For example, in one embodiment, remote file access to remotely located virtual storage volumes may include, but is not limited to, one or more of the following operations (or combinations thereof):

- receiving a first request to access a first remote virtual storage volume;
- automatically identifying a first type of file system at the first remote virtual storage volume;
- automatically identifying, using information relating to the first type of file system, a selected virtual application that is suitable for performing file system manipulations at the first remote virtual storage volume,
- remotely accessing, using the selected virtual application, one or more files at the first remote virtual storage volume.

In at least one embodiment, the file system manipulations may include various types of operations such as, for example, file system formatting operations, file read operations, and file write operations, etc.

In at least one embodiment, the volume resize operation(s) may be performed by one or more virtual appliances and/or virtual applications while preserving the file system on the virtual storage volume during the volume resize operation. In at least one embodiment, the resizing operations may include, for example, providing a virtual application with access to the source (e.g, original) virtual storage volume (having a first volume size) and a second (e.g., target) virtual storage volume (having a second volume size which differs from the size of the first storage volume). In one embodiment, the virtual application may be operable to copy all (or selected) files from the source virtual storage volume to the target virtual storage volume.

In at least one embodiment, one or more virtual appliances/applications may be utilized for facilitating automated conversion of a file system of a virtual storage volume from a first file system type to a second file system type. For example, in one embodiment, the automated conversion of a file system of a virtual storage volume from a first file system type to a second file system type may include, but are not limited to, one or more of the following operations (or combinations thereof):

- identifying a first file system type of a first file system of a first virtual storage volume;
- automatically identifying a first virtual appliance operable to read files from the first file system type;
- automatically providing the first virtual appliance with access to the first virtual storage volume, for example, by attaching the first virtual storage volume to the first virtual appliance;
- identifying a second file system type of a second file system of a second virtual storage volume;
- automatically identifying a second virtual appliance operable to write files to the second file system type;
- automatically providing the second virtual appliance with access to the second virtual storage volume;
- providing a first communication link between the first virtual appliance and the second virtual appliance, for example, by attaching the second virtual storage volume to the second virtual appliance;
- performing, using the first virtual appliance and second virtual appliance, file system conversion operations for converting the first file system from a first file system type to the second file system of the second file system type;

In one embodiment, the performing of the file system conversion operations may include, for example:

- operating the first virtual appliance to read a first plurality of files from the first virtual storage volume;
- sending, via use of the first communication link, file information relating to the first plurality of read files to the second virtual appliance;
- operating the second virtual appliance to receive the file information via the first communication link;
- operating the second virtual appliance to write at least a portion of the received file information to the second virtual storage volume.

In some embodiments, running instances of the first and/or second virtual appliances may be automatically and dynamically created, on demand (e.g., as needed), in response to real-time condition and/or events. In some embodiments, running instances of the first and/or second virtual appliances may be automatically and dynamically created (e.g., on demand) using one or more virtual appliance templates and/or virtual application templates. Some of the virtual appliance/application templates may be dynamically generated (e.g., in real-time) using information relating to the first file system type and the second file system type. Other virtual appliance/application templates may be pre-configured, and selection of a desired pre-configured template may be based, at least in part, using information relating to the first file system type and the second file system type.

In at least one embodiment, one or more virtual appliances/applications may be utilized for facilitating file access to online (e.g., in use, mounted, attached, etc.) virtual storage volumes as well as off-line virtual storage volumes (e.g., virtual storage volumes which are not currently in use, mounted or attached to a device). For example, in at least one embodiment, such file or volume access operations may include, but are not limited to, one or more of the following (or combinations thereof):

- receiving a first access request for performing a first file access operation at the first virtual storage volume;
- determining whether the first virtual storage volume is currently in use, mounted or attached to a virtual machine;

in response to determining that the first virtual storage volume is currently in use, mounted or attached:
  identifying a first virtual machine which has current access to first virtual storage volume; and
  forwarding the first access request to the first virtual machine to thereby cause the first virtual machine to perform at least one file access operation at the first virtual storage volume; and
in response to determining that the first virtual storage volume is not currently in use, mounted or attached:
  automatically identifying a first type of file system at the first virtual storage volume;
  automatically identifying, using information relating to the first type of file system, a selected virtual appliance that is suitable for performing file access operations at the first virtual storage volume;
  automatically attaching the first virtual storage volume to the selected virtual appliance for providing the selected virtual appliance with file access to the virtual storage volume;
  forwarding the first access request to the selected virtual appliance to thereby cause the selected virtual appliance to perform at least one file access operation at the first virtual storage volume;
providing file access to at least one online virtual storage volume which is currently in use, mounted or attached to a first device of the distributed computing network;
providing file access to at least one offline virtual storage volume which is not currently in use, mounted or attached to a any device in the distributed computing network;
etc.

Other aspects described or referenced herein are directed to different methods, systems, and computer program products for configuring one or more virtual appliances in a distributed computing network. For example, in at least one embodiment, a virtual appliance configuration system may be provided for configuring one or more virtual appliances in a distributed computing network. In some embodiments the system may include, for example:

a first virtual appliance including an image of an operating system (OS) operable to be loaded or booted in a first virtual machine to thereby enable a first running instance of the first virtual appliance to be created or instantiated at the distributed computing network;

a DHCP server, operable to provide at least one IP address to the first virtual appliance in response to a DHCP request received from the first virtual appliance;

an appliance configuration server, operable to facilitate access to a first appliance configuration file associated with the first virtual appliance an agent (or the appliance), operable to request the first appliance configuration file; and/or a web server, operable to provide the first virtual appliance with access to the first appliance configuration file in response to a request received from the first virtual appliance.

In at least one embodiment, the first virtual appliance includes an appliance configurator operable to automatically and dynamically configure at least one network interface of the virtual appliance using information obtained from the first appliance configuration file.

In at least one embodiment, the first virtual appliance includes a network address map resolver operable to resolve host names to remote network hosts using information obtained from the first appliance configuration file.

In at least one embodiment, the first virtual appliance includes a configuration file manipulator operable to automatically update information in at least one appliance configuration file using information obtained from the first appliance configuration file.

In at least one embodiment, the first virtual appliance includes a property extractor operable to automatically extract individual configuration parameters from the first appliance configuration file, and operable to provide access to at least a portion of the configuration parameters as separate configuration parameters for use in configuration of software operating in the virtual appliance.

In at least one embodiment, the first virtual appliance includes a volume configurator operable to automatically mount at least one virtual storage volume into file system mountpoints using volume configuration information obtained from the first appliance configuration file.

Additional objects, features and advantages of the various aspects described or referenced herein will become apparent from the following description of its preferred embodiments, which description may be taken in conjunction with the accompanying drawings.

Specific Example Embodiments

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It may be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s), Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

U.S. patent application Ser. No. 11/522,050, entitled "APPARATUS, METHOD AND SYSTEM FOR RAPID DELIVERY OF DISTRIBUTED APPLICATIONS", discloses various techniques for visually constructing and rapidly delivering distributed applications. A commercialized grid operating system referred to as AppLogic™ (developed by 3Tera, Inc., www.3Tera.com) illustrates an example embodiment of one such technique. It may be noted that the following discussion of AppLogic™ and its features is in no way to be construed as an admission of prior art.

At least one example embodiment described herein comprises an application model, a visual method and a system for rapid delivery of distributed applications. In at least one embodiment, the application model defines several abstractions which, taken together, make it possible to express the structures and behavior of complete distributed applications. In at least one embodiment, those abstractions can be grouped in the following way: virtual resources, virtual appliances, composite appliances, catalogs of appliances, and applications.

Virtual Resources

Various embodiments described herein may utilize resource virtualization to abstract the underlying hardware system and to make it possible to define the rest of the application in a hardware-independent way. At least one embodiment described herein defines various types of virtual resources, such as, for example: virtual machines, virtual volumes and virtual network interfaces.

In an example embodiment described herein, the hardware system comprises computing and/or storage nodes interconnected through a suitably fast network, with at least one node acting as a system controller. Each node on the network may preferably expose one or more pools of virtual resources, one pool for each resource type. For each resource type, the system controller aggregates multiple discrete resource pools, exposed by the various nodes in the system, into a single, distributed resource pool. As a result, there is a single system-wide resource pool for each type of virtual resource.

In at least one embodiment, virtual resources are allocated/created from their respective system pools and carry a system-wide identification which makes it possible to access a given instance of a virtual resource in a uniform fashion independent of where the resource is actually located. In at least one embodiment, at least some virtual machines may be implemented by a virtual machine management system. Each virtual machine may be capable of booting a general-purpose operating system, and any other software that it may be configured to run.

Typically, virtual machine managers virtualize access to at least two types of peripheral devices, namely network interfaces and block storage devices. When configuring an individual virtual machine, one can specify a set of virtual network devices and a set of virtual storage devices for that virtual machine, and define how those virtual devices should be mapped to the actual physical devices of the host. In addition, some virtual machine managers make it possible to map a virtual device of a given virtual machine to a logical device (network interface or disk volume) implemented by an operating system in another virtual machine. Virtual machine managers may also allow individual virtual machines to be migrated from one host to another, transparently to the software that runs inside the virtual machine. One type of virtual machine manager is available from Xen (www.xen.org).

In at least one embodiment, virtual machines may be assigned a set of execution attributes that determine the minimum and maximum amounts of processing power, memory and network bandwidth that can be allocated to a given instance of a virtual machine, as well as to permit or prohibit the migration of the virtual machine.

Virtual storage volumes are logical block devices exposed by one or more hosts on the system and accessible from virtual machines running on the same or on other hosts. Virtual volumes are persistent, named objects, the size of which is defined at the time of creation and which reside on the system until explicitly destroyed. In an example embodiment, a virtual volume defined and exposed by one node is accessible from any node in the system, thereby allowing a virtual machine that uses the volume to be migrated freely to any node. One way to implement virtual volumes is by configuring a network block device (NBD) so that each individual virtual volume is stored in a file on one of the hosts, shared on the network as an NBD volume and accessed from the other hosts using the NBD client.

In an example embodiment, a virtual volume is typically accessed exclusively by a single virtual machine. This makes it possible and desirable to cache volume contents aggressively on the host on which the virtual machine accessing the volume is being executed. Such caching is easily accomplished, for example, by layering on top of the NBD client a block device driver that uses a file on a local physical disk to store copies of blocks recently accessed by the virtual machine.

Another aspect described herein is the ability to create multiple instances of the same virtual volume, Those are useful whenever there is a need to share a large set of data among multiple virtual machines in such a way as to permit each virtual machine to make relatively small number of modifications to the common set of data for its own use. Instantable virtual volumes can be implemented by simply replicating the common volume for each virtual machine.

In an example embodiment, however, an instantiable volume is implemented by a combination of a "master" virtual volume which is common to all instances and contains the common data, and a "differential" virtual volume for each virtual volume instance, which accumulates the modifications made to the specific instance. The master volume and the differential volume are presented to the client virtual machine as a single block device, for example, by layering an appropriate block device driver over an NBD client that can access both virtual volumes.

Virtual network interfaces may be used to abstract the structure of the network interconnect inside the distributed application. For example, a pair of virtual network interfaces may be used to create a "virtual wire" between virtual network adapters which belong to different virtual machines. The virtual wire operates in a manner equivalent to a crossover cable that connects two physical network interface cards directly: it transfers packets from one of the cards to the other and vice-versa.

Depending on the physical network used, a virtual wire can be implemented by tunneling application traffic (packets) between two virtual network interfaces through a TCP connection, UDP datagrams, InfiniBand reliable connection, or as direct memory-to-memory transfer, all of which may be completely transparent to the communicating virtual machines. Indeed, it is possible to move the virtual wire from, for example, a TCP connection over Gigabit Ethernet, to a reliable connection over 10 Gigabit InfiniBand on the fly, transparently to the communicating virtual machines.

Virtual Appliances

In at least one embodiment, a virtual appliance comprises a boundary, boot volume, and/or interior. The boundary may comprise the execution attributes, the terminals, the properties, and/or the content volume. The interior may comprise an operating system, configuration files, software services and/or the application service. In an example embodiment, virtual appliances are defined by building a descriptor such as the descriptor illustrated in FIG. of U.S. Pub. No. 20070078988, the entirety of which is incorporated herein by reference for all purposes. In an example embodiment, virtual appliances are created by first defining a virtual appliance class using one or more descriptors and then creating one or more virtual appliance instances that execute on the target system. The class may be used as a template for creating instances.

Using the various techniques described herein, it is also possible to define another type of virtual appliances called a Composite Appliance. In at least one embodiment, a composite appliance comprises a boundary and an interior. The boundary of a composite appliance may be defined in the same way as the boundary of a regular virtual appliance, and the interior of a composite appliance may comprise a structure of virtual appliances.

In at least one embodiment, one or more aspects and/or features described herein may be implemented in a manner which utilizes 3Tera's AppLogic™ grid operating system for providing a true distributed utility computing services. For example, in at least one embodiment, one or more techniques described and/or referenced herein may enable commodity servers to be converted into scalable grids on which users can visually operate, deploy and scale transactional Web applications, for example, without any modification of code. In addition, one or more techniques described and/or referenced herein may be used to enable Software-as-a-Service providers, Web 2.0 companies, enterprises and open source developers to rapidly deploy new online services, for example, by utilizing resources from commodity hosting providers on a pay-as-you-go basis, while maintaining complete control of applications including visual operation, scaling and on-demand resource provisioning.

In computing, a file system (often also written as filesystem) is a method for storing and organizing computer files and the data they contain to make it easy to find and access them. File systems may use a data storage device such as a hard disk or CD-ROM and involve maintaining the physical location of the files, they might provide access to data on a file server by acting as clients for a network protocol (e.g., NFS, SMB, or 9P clients), or they may be virtual and exist only as an access method for virtual data (e.g., procfs). It is distinguished from a directory service and registry.

More formally, a file system is a special-purpose database for the storage, organization, manipulation, and retrieval of data.

Categories of File Systems

File system categories can be classified into disk file systems, network file systems and special purpose file systems.

Disk File Systems

A disk file system is a file system designed for the storage of files on a data storage device, most commonly a disk drive, which might be directly or indirectly connected to the computer. Examples of disk file systems include FAT (FAT12, FAT16, FAT32, exFAT), NTFS, HFS and HFS+, HPFS, ext2, ext3, ext4, ISO 9660, ODS-5, ZFS and UDF. Some disk file systems are journaling file systems or versioning file systems.

Flash File Systems

A flash file system is a file system designed for storing files on flash memory devices. These are becoming more prevalent as the number of mobile devices are increasing, and the capacity of flash memories increase.

While a disk file system can be used on a flash device, this is suboptimal for several reasons:

Erasing blocks: Flash memory blocks have to be explicitly erased before they can be rewritten. The time taken to erase blocks can be significant, thus it is beneficial to erase unused blocks while the device is idle.

Random access: Disk file systems are optimized to avoid disk seeks whenever possible, due to the high cost of seeking. Flash memory devices impose no seek latency.

Wear levelling: Flash memory devices tend to wear out when a single block is repeatedly overwritten; flash file systems are designed to spread out writes evenly.

Log-structured file systems have many of the desirable properties for a flash file system. Such file systems include JFFS2 and YAFFS.

Database File Systems

A new concept for file management is the concept of a database-based file system. Instead of, or in addition to, hierarchical structured management, files are identified by their characteristics, like category of file, topic, author, or similar metadata.

Transactional File Systems

Each disk operation may involve changes to a number of different files and disk structures. In many cases, these changes are related, meaning that it is important that they all be executed at the same time. Take for example a bank sending another bank some money electronically. The bank's computer will "send" the transfer instruction to the other bank and also update its own records to indicate the transfer has occurred. If for some reason the computer crashes before it has had a chance to update its own records, then on reset, there will be no record of the transfer but the bank will be missing some money.

Transaction processing introduces the guarantee that at any point while it is running, a transaction can either be finished completely or reverted completely (though not necessarily both at any given point). This means that if there is a crash or power failure, after recovery, the stored state will be consistent. (Either the money will be transferred or it will not be transferred, but it won't ever go missing "in transit".)

This category of file system is designed to be fault tolerant, but may incur additional overhead to do so.

Journaling file systems are one technique used to introduce transaction-level consistency to filesystem structures.

Network File Systems

A network file system is a file system that acts as a client for a remote file access protocol, providing access to files on a server. Examples of network file systems include clients for the NFS, AFS, SMB protocols, and file-system-like clients for FTP and WebDAV.

Special Purpose File Systems

A special purpose file system is basically any file system that is not a disk file system or network file system. This includes systems where the files are arranged dynamically by software, intended for such purposes as communication between computer processes or temporary file space.

Special purpose file systems are most commonly used by file-centric operating systems such as Unix. Examples include the procfs (/proc) file system used by some Unix variants, which grants access to information about processes and other operating system features.

Deep space science exploration craft, like Voyager I & II used digital tape-based special file systems. Most modern space exploration craft like Cassini-Huygens used Real-time operating system file systems or RTOS influenced file systems. The Mars Rovers are one such example of an RTOS file system, important in this case because they are implemented in flash memory.

Crash counting is a feature of a file system designed as an alternative to journaling. It is claimed that it maintains consistency across crashes without the code complexity of implementing journaling.

File Systems Under Unix-Like Operating Systems

Unix-like operating systems create a virtual file system, which makes all the files on all the devices appear to exist in a single hierarchy. This means, in those systems, there is one root directory, and every file existing on the system is located under it somewhere. Unix-like systems can use a RAM disk or network shared resource as its root directory.

Unix-like systems assign a device name to each device, but this is not how the files on that device are accessed. Instead, to gain access to files on another device, the operating system must first be informed where in the directory tree those files should appear. This process is called mounting a file system. For example, to access the files on a CD-ROM, one must tell the operating system "Take the file system from this CD-ROM and make it appear under such-and-such directory". The directory given to the operating system is called the mount point—it might, for example, be /media. The /media directory exists on many Unix systems (as specified in the Filesystem Hierarchy Standard) and is intended specifically for use as a mount point for removable media such as CDs, DVDs and like floppy disks. It may be empty, or it may contain subdirectories for mounting individual devices. Generally, only the administrator (i.e. root user) may authorize the mounting of file systems.

Unix-like operating systems often include software and tools that assist in the mounting process and provide it new functionality. Some of these strategies have been coined "auto-mounting" as a reflection of their purpose.

In many situations, file systems other than the root need to be available as soon as the operating system has booted. All Unix-like systems therefore provide a facility for mounting file systems at boot time. System administrators define these file systems in the configuration file fstab or vfstab in Solaris Operating Environment, which also indicates options and mount points.

In some situations, there is no need to mount certain file systems at boot time, although their use may be desired thereafter. There are some utilities for Unix-like systems that allow the mounting of predefined file systems upon demand.

Removable media have become very common with microcomputer platforms. They allow programs and data to be transferred between machines without a physical connection. Common examples include USB flash drives, CD-ROMs, and DVDs. Utilities have therefore been developed to detect the presence and availability of a medium and then mount that medium without any user intervention.

Progressive Unix-like systems have also introduced a concept called supermounting; see, for example, the Linux supermount-ng project. For example, a floppy disk that has been supermounted can be physically removed from the system. Under normal circumstances, the disk should have been synchronized and then unmounted before its removal. Provided synchronization has occurred, a different disk can be inserted into the drive. The system automatically notices that the disk has changed and updates the mount point contents to reflect the new medium. Similar functionality is found on Windows machines.

A similar innovation preferred by some users is the use of autofs, a system that, like supermounting, eliminates the need for manual mounting commands. The difference from supermount, other than compatibility in an apparent greater range of applications such as access to file systems on network servers, is that devices are mounted transparently when requests to their file systems are made, as would be appropriate for file systems on network servers, rather than relying on events such as the insertion of media, as would be appropriate for removable media.

File Systems Under Linux

Linux supports many different file systems, but common choices for the system disk include the ext* family (such as ext2 and ext3), XFS, NS and ReiserFS.

File Systems Under Solaris

The Sun Microsystems Solaris operating system in earlier releases defaulted to (non-journaled or non-logging) UFS for bootable and supplementary file systems. Solaris (as most operating systems based upon open standards and/or open source) defaulted to, supported, and extended UFS.

Support for other file systems and significant enhancements were added over time, including Veritas Software Corp. (Journaling) VxFS, Sun Microsystems (Clustering) QFS, Sun Microsystems (Journaling) UFS, and Sun Microsystems (open source, poolable, 128 bit compressible, and error-correcting) ZFS.

Kernel extensions were added to Solaris to allow for bootable Veritas VxFS operation. Logging or Journaling was added to UFS in Sun's Solaris 7. Releases of Solaris 10, Solaris Express, OpenSolaris, and other open source variants of the Solaris operating system later supported bootable ZFS.

Logical Volume Management allows for spanning a file system across multiple devices for the purpose of adding redundancy, capacity, and/or throughput. Legacy environments in Solaris may use Solaris Volume Manager (formerly known as Solstice DiskSuite.) Multiple operating systems (including Solaris) may use Veritas Volume Manager. Modern Solaris based operating systems eclipse the need for Volume Management through leveraging virtual storage pools in ZFS.

File Systems Under Mac OS X

Mac OS X uses a file system that it inherited from classic Mac OS called HFS Plus. HFS Plus is a metadata-rich and case preserving file system. Due to the Unix roots of Mac OS X, Unix permissions were added to HFS Plus. Later versions of HFS Plus added journaling to prevent corruption of the file system structure and introduced a number of optimizations to the allocation algorithms in an attempt to defragment files automatically without requiring an external defragmenter.

Filenames can be up to 255 characters. HFS Plus uses Unicode to store filenames. On Mac OS X, the filetype can come from the category code, stored in file's metadata, or the filename.

HFS Plus has three kinds of links: Unix-style hard links, Unix-style symbolic links and aliases. Aliases are designed to maintain a link to their original file even if they are moved or renamed; they are not interpreted by the file system itself, but by the File Manager code in userland.

Mac OS X also supports the UFS file system, derived from the BSD Unix Fast File System via NeXTSTEP. However, as of Mac OS X 10.5 (Leopard), Mac OS X can no longer be installed on a UFS volume, nor can a pre-Leopard system installed on a UFS volume be upgraded to Leopard.

File Systems Under Plan 9 from Bell Labs

Plan 9 from Bell Labs was originally designed to extend some of Unix's good points, and to introduce some new ideas of its own while fixing the shortcomings of Unix.

With respect to file systems, the Unix system of treating things as files was continued, but in Plan 9, everything is treated as a file, and accessed as a file would be (i.e., no ioctl or mmap). Perhaps surprisingly, while the file interface is made universal it is also simplified considerably, for example symlinks, hard links and suid are made obsolete, and an atomic create/open operation is introduced. More importantly the set of file operations becomes well defined and subversions of this like ioctl are eliminated.

Secondly, the underlying 9P protocol was used to remove the difference between local and remote files (except for a possible difference in latency or in throughput). This has the advantage that a device or devices, represented by files, on a remote computer could be used as though it were the local computer's own device(s). This means that under Plan 9, multiple file servers provide access to devices, classing them as file systems. Servers for "synthetic" file systems can also run in user space bringing many of the advantages of micro kernel systems while maintaining the simplicity of the system.

Everything on a Plan 9 system has an abstraction as a file; networking, graphics, debugging, authentication, capabilities, encryption, and other services are accessed via I-O operations on file descriptors. For example, this allows the use of the IP stack of a gateway machine without need of NAT, or provides a network-transparent window system without the need of any extra code.

Another example: a Plan-9 application receives FTP service by opening an FTP site. The ftpfs server handles the open by essentially mounting the remote FTP site as part of the local file system. With ftpfs as an intermediary, the application can now use the usual file-system operations to access the FTP site as if it were part of the local file system. A further example is the mail system which uses file servers that synthesize virtual files and directories to represent a user mailbox as /mail/fs/mbox. The wikifs provides a file system interface to a wild.

These file systems are organized with the help of private, per-process namespaces, allowing each process to have a different view of the many file systems that provide resources in a distributed system.

The Inferno operating system shares these concepts with Plan 9.

File Systems Under Microsoft Windows

Windows makes use of the FAT and NTFS file systems.

The File Allocation Table (FAT) filing system, supported by all versions of Microsoft Windows, was an evolution of that used in Microsoft's earlier operating system (MS-DOS which in turn was based on 86-DOS). FAT ultimately traces its roots back to the short-lived M-DOS project and Standalone disk BASIC before it. Over the years various features have been added to it, inspired by similar features found on file systems used by operating systems such as Unix.

Older versions of the FAT file system (FAT12 and FAT16) had file name length limits, a limit on the number of entries in the root directory of the file system and had restrictions on the maximum size of FAT-formatted disks or partitions. Specifically, FAT12 and FAT16 had a limit of 8 characters for the file name, and 3 characters for the extension (such as .exe). This is commonly referred to as the 8.3 filename limit. VFAT, which was an extension to FAT12 and FAT16 introduced in Windows NT 3.5 and subsequently included in Windows 95, allowed long file names (LFN). FAT32 also addressed many of the limits in FAT12 and FAT16, but remains limited compared to NTFS.

NTFS, introduced with the Windows NT operating system, allowed ACL-based permission control. Hard links, multiple file streams, attribute indexing, quota tracking, compression and mount-points for other file systems (called "junctions") are also supported, though not all these features are well-documented.

Unlike many other operating systems, Windows uses a drive letter abstraction at the user level to distinguish one disk or partition from another. For example, the path C: \WINDOWS represents a directory WINDOWS on the partition represented by the letter C. The C drive is most commonly used for the primary hard disk partition, on which Windows is usually installed and from which it boots. This "tradition" has become so firmly ingrained that bugs came about in older versions of Windows which made assumptions that the drive that the operating system was installed on was C. The tradition of using "C" for the drive letter can be traced to MS-DOS, where the letters A and B were reserved for up to two floppy disk drives. Network drives may also be mapped to drive letters.

Various aspects described herein are directed to different methods, systems, and computer program products for manipulating volumes and/or file systems of one or more different types of operating systems (OSs) associated with various distributed computer systems such as, for example, one or more of the following (or combinations thereof): grid computing systems, cloud computing systems, utility computing systems, management systems, etc.

In at least one embodiment, it may be preferable to manipulate the file systems (e.g., via one or more of the following (or combinations thereof): formatting, copying, uploading files, downloading files, inspecting files, editing files, reorganizing files, checking and/or repairing file systems, etc.) while the appliance/servers for these volumes may be unavailable (e.g., not yet created, temporarily stopped, failing to start (e.g., due to a corrupted file system or configuration), etc.).

According to different embodiments, various aspects may be directed to different embodiments of filer appliances which may be used for manipulating volumes and/or file systems of one or more different types of operating systems (OSs) associated with various distributed computer systems.

In at least one embodiment, a filer appliance (herein referred to as "filer", "filer appliance", or "FA") may be implemented as a virtual appliance (e.g., a virtual machine with preconfigured OS and software) that includes functionality for performing automated file-level and/or volume-level operations for a selected set of file systems. In one embodiment, a filer appliance may be implemented as a virtual machine which is configured or designed to handle managing of one or more volumes. In one embodiment, the filer appliance may include one or more virtual interfaces (e.g., slots, ports, etc.) for interfacing with one or more virtual volumes. As shown, for example, in FIG. 9, in one embodiment, when specific events/conditions have been detected, one or more filer appliances may be dynamically and automatically instantiated for performing file operations at one or more virtual volumes. Once instantiated, one or more virtual volumes may be automatically attached, inserted or connected to a given filer appliance to be managed by the filer appliance. The filer appliance may dynamically and/or automatically carry out operations in connection with management of the virtual volume. In at least one embodiment, virtual volumes may also be automatically detached from one or more filer appliances, for example, when it has been detected that the desired file operations have been successfully completed.

By way of analogy, a least one embodiment of a filer appliance may be likened to a machine on which one is able to perform maintenance for disks. It may have one or more slots connection to one or more disks. If the desktop or server system fails, the disk may be detached from the system and plugged it into one of the filer's slots and repaired. In at least one embodiment, the files on the disk may be copied to a different disk.

In at least one embodiment, a filer appliance may be configured or designed to include an image of an operating system supporting at least one file system type. In at least one embodiment, the OS image may be operable to be loaded or booted in a virtual machine (and/or other type of virtual device) to thereby create a first running instance of the virtual appliance. In at least some embodiments, the virtual appliance may also include various drivers and/or tools for performing specific file system operations and/or manipulations. In at least one embodiment, a filer application may include one or more different filer appliances.

Figure 9:
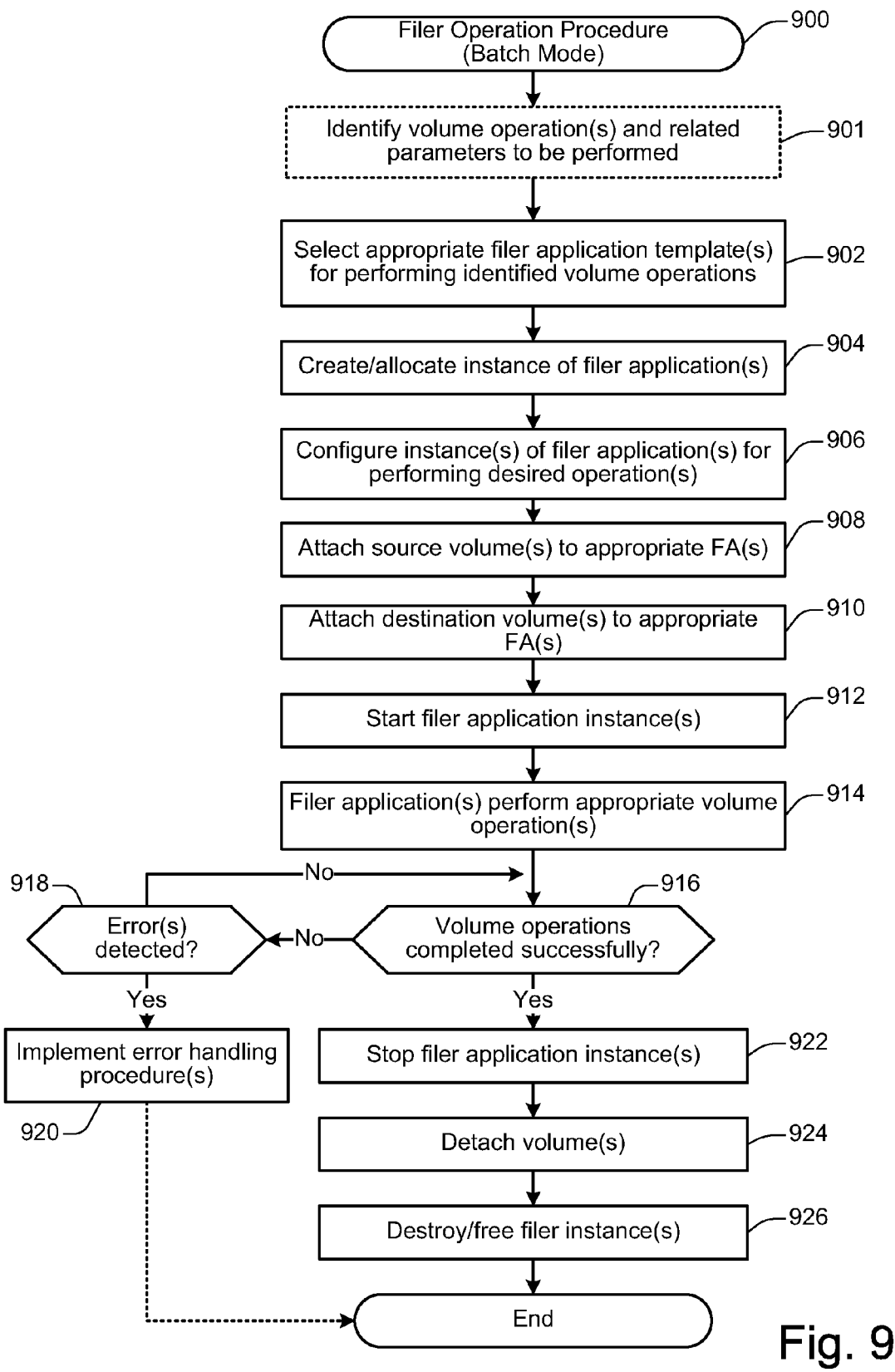
FIG. 9 shows an example flow diagram of a Filer Operation Procedure (Batch Mode) 900 in accordance with a specific embodiment.

According to various embodiments, one or more filer appliances (and/or filer applications) may be configured or designed to operate in one or more different modes of operation. For example, in one embodiment, a filer appliance may be operable to facilitate file system manipulation operations according to a batch mode of operation, wherein the filer appliance may be engaged to perform file system manipulation operations on individual files of the virtual storage volume, and/or may be engaged to perform file system manipulation operations on the file system as a whole. Examples of various types of batch mode file system manipulation operations may include, but are not limited to, one or more of the following (or combinations thereof): create file system (e.g., format volume), file system copy, file system consistency check, file system repair, block copy, stream files out, stream files in, backup, restore, upload, download, wipe, etc.). In at least one embodiment utilizing the batch mode of operation, a new running instance of a virtual filer appliance may be dynamically and/or automatically created (e.g., on demand and/or in real-time) to perform desired file system manipulations on one or more virtual storage volumes. Once the virtual filer appliance has successfully completed its tasks, the specific running instance of that particular virtual filer appliance may be automatically released, freed or otherwise deleted or destroyed. An example flow diagram of a Filer Operation Procedure operating in batch mode is illustrated in FIG. 9 of the drawings.

In other embodiments, a filer appliance may be operable to facilitate file system manipulation operations according to an interactive mode of operation, wherein, for example, a filer appliance may be utilized to provide file system access to one or more external system(s) and/or entities (e.g., a human operator) for performing one or more file system operations/manipulations on the FS. In at least one embodiment, the interactive mode of operation may be employed to enable an external entity to perform file system manipulation operations on individual files of the virtual storage volume and/or on the file system as a whole. In at least one embodiment, such file system manipulation operations may be accomplished, for example, by the external entity providing appropriate instructions or commands to one or more selected virtual filer appliances, whereupon the virtual filer appliance(s) perform specific file system manipulations in accordance with the received instructions. In this way, the interactive mode of operation enables an external entity to interact with the entire file system and/or to change content of the file system.

In one embodiment, such interactive operation may be performed using a graphical user interface for exploring and manipulating files, directories and symbolic links in the filesystem of the virtual storage volumes. In another embodiment, an operator may use secure shell to invoke various operating system commands and tools to modify files in the filesystem; or use secure copy (scp), file transfer protocol (ftp) and/or network protocols such as NFS and CIFS to manipulate the contents of the virtual storage volume through the filer appliance. In yet another embodiment, the interactive mode may be used to provide access over a network file system (network file protocol) such as CIFS or NFS to have a computer program access the file system on the storage volume, for example, to perform an upgrade of the contents or software versions on the storage volume in an automated fashion, and/or check it for computer viruses, perform an automated backup, etc.

Figure 10:
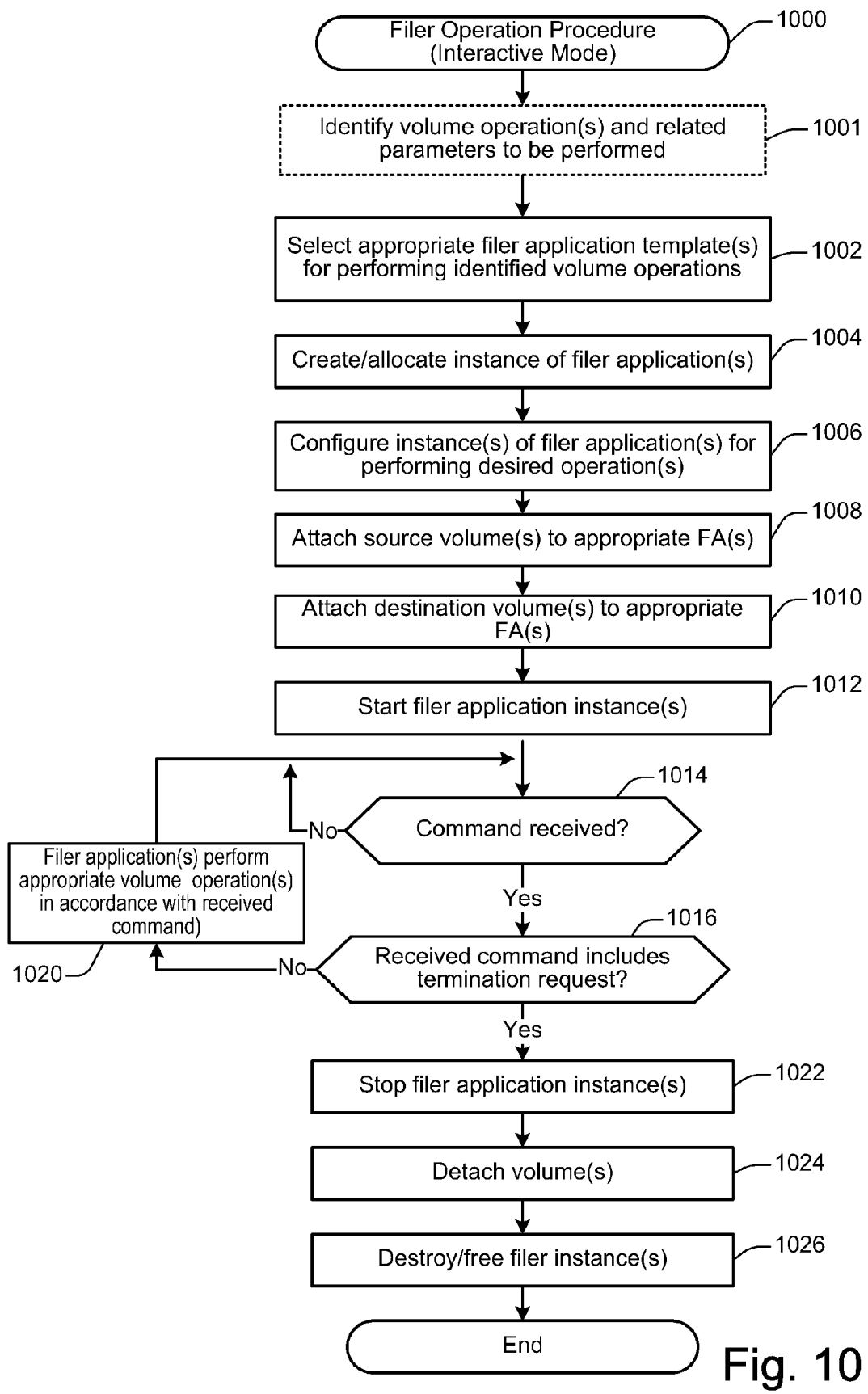
FIG. 10 shows an example flow diagram of an alternate example of a Filer Operation Procedure (Interactive Mode) 1000 in accordance with a specific embodiment.

In at least one embodiment utilizing the interactive mode of operation, the running instance(s) of the filer appliance(s) used to perform the file system manipulations may be dynamically and/or automatically created (e.g., on demand and/or in real-time) to perform desired file system manipulations on one or more virtual storage volumes. In at least one embodiment, once a particular virtual filer appliance has successfully completed its specific tasks, the specific running instance of that particular virtual filer appliance may be automatically released, freed or otherwise deleted or destroyed. In other embodiments, once a specific virtual filer appliance has successfully completed its task(s), rather than being automatically deleted, the specific running instance of that particular virtual filer appliance may remain active to await additional instructions from the external entity. In at least one embodiment, an external entity may provide appropriate commands and/or instructions to cause a specific running instance of a virtual filer appliance to be released, freed or otherwise deleted or destroyed. An example flow diagram of a Filer Operation Procedure operating in interactive mode is illustrated in FIG. 10 of the drawings. In at least one embodiment, a filer appliance may be configured or designed to operate in both batch mode and interactive mode.

In at least one embodiment, the filers may be operable to be dynamically provisioned whenever a file system operation is desired or required, may be operable to automatically perform or initiate specific tasks or operations relating to the file system operation, and/or may be operable to be automatically terminated or disposed of once the filer appliance has completed the operations and/or tasks to be performed. One advantage of this technique is that each filer can have or be associated with one or more different operating systems, thereby allowing one to choose the preferred OS for manipulating a given file system natively (e.g., Linux for ext3, Windows for NTFS, OpenSolaris for ZFS, etc.).

Included in the description below are various details relating to embodiments of filer appliances, including for example, properties/characteristics of filer appliances, implementation design details for Linux and Solaris operating systems, a list of volume-level commands which may be enabled and/or utilized in connection with one or more filer appliances, etc.

Other aspects described herein are directed to various techniques for providing OS-independent support for file systems associated with one or more grids (e.g., utility computing grids).

For example, in at least one embodiment, a framework may be provided for supporting different OS types on AppLogic™, along with their associated OS-specific file system formats. Such a framework may provide, for example, for substantially equal levels of support to all OS types that can theoretically be run within AppLogic™ (e.g., those that can be executed in a XEN VM) and/or other virtualization software.

In at least one embodiment, a new method for providing file-level access to volumes may be defined, which may be operable to be utilized within such a framework, and may replace the OS-specific method(s) of mounting the file systems on the controller.

Benefits/Features/Advantages

Described below are various benefits, features, and/or advantages which may be realized or enabled using one or more embodiments which are operable to provide OS-independent support for file systems associated with one or more grids (e.g., utility computing grids). Examples of such benefits, features, and/or advantages, may include, but are not limited to, one or more of the following (or combinations thereof):

Operation independent of OS type & volume format: file-level access to volumes may have all (or selected) features supported by current versions of AppLogic™, for any file format that may be declared as "supported" in a given version of AppLogic™.

Full set of current operations supported, including, for example, one or more of the following (or combinations thereof):

formatting a new volume with any file system that may be used on one of the supported OS types;

copy of volume data at file level, such as, for example, volume resize;

read and write access to volume data at file level and at block level;

etc.

Avoidance of excessive usage of grid resources, which, for example, may include one or more of the following (or combinations thereof):

no permanent allocation of any memory and CPU resource;

use of dynamically-allocated resource (e.g., to run a VM with an OS kernel that has drivers for a given file system) may be limited to the minimum necessary and may be de-allocated if not actively used (for example, in one embodiment, 'helper' VMs started for such purposes may be left idle to avoid re-start delays when multiple operations might be requested; but they can be treated as 'discardable' and shut down if the memory/CPU may be needed);

Portable and extendable: In one embodiment, the implementation of volume access may not be limited to a fixed set of file system types, and may be extendable to volume types supported by any OS that can be run under XEN. In one embodiment, all interfaces related to volume access may be open and documented, so as to allow customers or third parties to add support for new OS types and new file system formats.

Readily-useable and validated prior to implementation for the UFS (e.g., sun_x86 variety) and NTFS (e.g., Windows) file systems.

In at least one embodiment, implementation of OS-neutrality functionality in connection with file-level access(es) may be accomplished, for example, by running a VM with the OS to which the file system may be 'native', or has the same level of support as in its native environment. For example, according to different embodiments, Linux file systems like ext2/3, ReiserFS, etc. may be supported by a Linux VM; UFS may be supported by a Solaris or a FreeBSD VM, depending on the UFS flavor; NTFS may be supported by a Windows VM, etc.; FAT file systems may be supported by either Linux or Windows, depending upon implementation specific preferences, for example.

Further, given that an assembled application may be heterogeneous, in one embodiment, application startup may be implemented, for example, without requiring volume access beyond the level that can be achieved by Linux-based FS drivers. In this way, use of "helper" VMs to obtain the file-level access (which, for example, may take unacceptable amount of resources and/or a lot of time, if they're started one by one) may be avoided.

In at least one embodiment, current volume access implementation using mounts into the controller's file space may be replaced with one or more of the following (or combinations thereof):

In at least one embodiment, for controller-driven file level operations and/or for user access to volume data: a special "filer" application template (e.g., containing a single 'filer' appliance) may be designed and implemented for each OS type(s) that is/are being added as 'supported' to AppLogic™, which, for example, may include, but are not limited to, one or more of the following characteristics (or combinations thereof):

Fast start and small memory footprint. For example, in one embodiment, the "filer" may be able to run with very little memory (e.g., 16-32 MB for Linux, may vary by OS).

Multiple modes of operation such as, for example, one or more of the following (or combinations thereof): (a) automatic execution of a single volume operation that preferably includes file system-level access (format, copy, file system check (fsck), fsck+repair); (b) manual mode, for user-level file access. According to specific embodiments, the filer may be implemented as a 'one-shot' appliance, started for a specific source and target volume (or just a target volume) and stopped once its purpose has been served.

Single-purpose. In at least one embodiment, where minimum resource waste and maximum security is preferable, the "filer" appliance may be implemented as a bare-bones installation which has not deadweight services in memory that might present a security risk. For example, in at least one embodiment, an filer appliance may be running from a read-only root file system and may be configured or designed to use only a ramdisk or a small instantiable volume for writable data.

Includes various features/functionality including for example, one or more of the following (or combinations thereof): (a) volume mount/unmount functionality; (b) backup level (full attribute preservation) cross-volume copy functionality (e.g., cpio for Unix-style file systems or the ntbackup utility for NTFS); (c) tools for user access to volume data; etc.

In at least one embodiment, for configuration of appliances at startup time, it may be preferable that no file access at all be used. For example, in one embodiment, appliances may receive IP configuration via DHCP and complete their setup by retrieving the rest of the configuration data directly from the controller (which, for example, in one embodiment, may be arranged for in a secure manner).

In one embodiment, the controller-resident appliance configuration script (which, for example, may be part of ABS—the AppLogic™ build system) may reside in the appliance itself and run in the appliance's native environment.

Dom0 access may be provided for retrieval of kernel and initrd image(s):

For example, in one embodiment, the support for Linux may be retained to support existing appliances; it can also be used for OpenSolaris and FreeBSD (e.g., read-only access to UFS may be available and may be stable).

In at least one embodiment, different boot mechanisms may be added or provided in a manner avoids various requirements (such as, for example, a requirement that the boot images be available outside the VM's boot disk). In one embodiment, an XEN-ified version of GRUB resident on the boot disk may be used to load the images into memory and start up the OS. In at least one embodiment, this may not limit the functionality in any way, since, for example, the XEN's boot-loader (which preferably includes the boot images in Dom0) and GRUB both operate exclusively on ELF binaries, therefore whatever XEN can load, can also be loaded by GRUB.

In at least one embodiment, operating systems that may be supported as HVMs may use their own built-in boot loader in all (or selected) cases and may not require Dom0 access to their volumes at boot time.

According to different embodiments, the one or more embodiments of the configuration mechanism(s) described herein may provide faster operation and more flexibility. Additionally, it may also be possible and advantageous to use one or more filer appliance(s) to modify (e.g., "volfix") the appliance boot volumes before the appliances start (e.g., by using currently available AppLogic™-style appliance configuration(s), while providing OS-independent support).

According to specific embodiments, currently existing versions of AppLogic™ may be modified to include additional components and/or functionality for facilitating implementation of one or more of the inventive features, techniques, and/or embodiments described herein. Examples of at least some of such modifications are described below.

Filer Appliance Example

FIG. 1 shows an example embodiment of a filer appliance 100 in accordance with what at least one embodiment. In one embodiment, the filer appliance may be implemented as a virtual machine which includes virtual interfaces (e.g., "slots") for interfacing with one or more (e.g., two, as illustrated in the example of FIG. 1) "installable" volumes. As illustrated in the example of FIG. 1 the volumes include a source volume 104 (src) and a destination volume 102. (dst). In addition, as illustrated, the filer appliance may include one or more control interface(s) 103 for receiving input information from other appliances/systems such as, for example, control information, status information, etc. Additionally, in at least one embodiment, the filer appliance may include one or more information output interfaces (which, for example, may be implemented using a bi-directional control interface embodiment) for providing various information to other appliances/systems such as, for example, responses to queries, status information, etc.

In one embodiment, the filer appliance may include a single appliance of class "filers.ostype" (e.g., where the appliance has no terminals).

Filer Application Example

FIG. 2 shows an example embodiment of a filer application 200 which includes a filer appliance (e.g., 100). In at least one embodiment, the filer application 200 is a higher-level construct built upon the basic filer appliance 100 of FIG. 1. In environments like AppLogic™, the filer application may be operable to provide the necessary filer appliance infrastructure in a programmatic and uniform manner, regardless of the particular filer appliances used inside (e.g., whether a single filer or multiple filers are needed to perform the operation). In at least one embodiment, this allows the instantiation of the filer application to be common, while the filer applications can vary to provide the necessary compatibility and functionality.

In one embodiment, the boundary 202 of the application 200 is preferably the same as for the appliance (e.g., the application is a 1:1 wrapper for the single appliance inside). For example, the src and dst volumes are exposed, as is the control interface and any configuration properties (such as IP addresses).

Composite Filer Application Example

FIG. 3 shows an example embodiment of a composite filer appliance 300 in accordance with a specific embodiment. In at least one embodiment, the composite filer application 300 may be implemented as a structure of connected filer appliances, where each appliance is responsible for accessing a respective volume.

In one embodiment, the filer appliance 121 has the source volume attached, and may be operable to feed file data out its "file access" interface 303, to the filer appliance 125, which has the destination volume attached.

Some benefits of using a composite filer application include, for example:

the ability to copy files between file systems for which no single operating system has proper drivers (e.g., REIS-ERFS to NTFS), the ability to dedicate resources and use caching and asynchronous operations for better performance, the ability to resolve device naming issues as typically may arise with LVM and ZFS, where the volumes carry the name of the device. In one embodiment it may be preferable to mount both the source and the destination volumes under the same device name, which is possible to do when each volume is attached to a separate appliance.

etc.

In at least one embodiment, data transfer between the appliances can be arranged in many ways; including, for example, one or more of the following (or combinations thereof):

having the appliance 121 read its locally attached volume and write over a network file system to the appliance 125, using a protocol like nfs, ftp, or cifs, the appliance 121 having a network file system client and the appliance 125 having a network file system server, etc.

In at least one embodiment, an alternative method for transfer may be for the appliance 121 to write the data to a network pipe, (e.g., in tape archive format (.tar)) and the appliance 125 to read the data and store it on the destination volume.

For example, in one embodiment, the filer appliance 121 may be a Linux appliance that has a source volume attached, with the REISERFS file system; and the filer appliance 125 may be a Windows appliance that has the destination volume attached, with the NTFS file system.

In at least one embodiment, the composite filer applications can be pre-existing for all meaningful combinations. In some embodiments, one or more filer appliance(s) and/or filer application(s) may be automatically and/or dynamically generated for each particular case, prior to provisioning or starting. For example, in one embodiment, if using VMware™, each filer may be created as a virtual machine (VM), and configured to talk to each other.

In one embodiment, the boundary 302 of the application 300 is preferably similar to the boundary 202 of the application 200. This allows for application-independent instantiation(s). In one embodiment, the source volume defined on the boundary 302 may be redirected to the source volume of the filer appliance 121; the destination volume defined on the boundary 302 may be redirected to the destination volume of the filer appliance 125. Properties and other configuration data may be replicated to both the appliances and/or provided to the appropriate appliance(s), as needed (e.g., the target file system may be provided to the appliance 125). Further, in at least one embodiment, the appliances 121 and 125 may have a set of preconfigured parameters, such as, for example, which of them is the source appliance (e.g., 121 in the example of FIG. 3) and which of them is the destination appliance (e.g., 125 in the example of FIG. 3).

Example of Appliance with Disk Arrays

FIG. 4 shows an example embodiment of a filer appliance 400 in accordance with a specific embodiment. In the example embodiment of FIG. 4, filer appliance 130 may include a plurality of different disk arrays (e.g., virtual disk arrays 402, 404). In at least one embodiment, one or more of the volumes (e.g., source volume 402 and/or destination volume 404), may be implemented as a composite volume comprising an array of volumes (e.g., array of virtual volumes).

For example, as illustrated in the example of FIG. 4, the filer appliance 130 may include multiple (e.g., 4) slot interfaces for source volumes 402 (e.g., src_stream1, src_stream2, src_stream3, src_stream4), and may also include multiple (e.g., 4) slot interfaces for destination volumes 404 (e.g., dst_stream1, dst_stream2, dst_stream3, dst_stream4).

In at least one embodiment, the multiple slot interfaces of an filer appliance enables use of composite volumes (e.g., volume arrays or volume pools), where a single logical volume may be built or represented by combining multiple volumes, such as, for example, in the case of RAID0 or volume-span configurations (e.g., where multiple volumes are concatenated sequentially to form a larger volume). In at least one embodiment, such a utility may be used to facilitate increased capacity and/or performance.

In at least one embodiment, the filer appliance may be configured with any number of volumes (e.g., "streams") for each of the composite volumes (e.g., 1 source volume and 4 destination volumes). In at least one embodiment, different property configuration(s) or parameter(s) may be used to specify the type of composite volume (RAID0, span, etc.) and/or other associated parameters/characteristics. Alternatively, in at least one implementation the filer appliance may retrieve this data automatically from the volumes' content.

Example of Filer Appliance with Network Transfers

FIG. 5 shows an example embodiment of a filer appliance 500 in accordance with a specific embodiment. In the example embodiment of FIG. 5, filer appliance 140 may include network transfer/communication functionality. In at least one embodiment, filer appliance 500 may be configured or designed to be compatible for use with non-composite filer application(s) (e.g., as shown in FIG. 2, for example) and/or for use with composite filer application(s) (e.g., as shown in FIG. 3, for example).

In at least one embodiment, the appliance filer appliance 140 may include one or more of the following (or combinations thereof):

a control interface 503 operable for submitting control requests and/or for obtaining status,
an input interface 501 operable for receiving file data;
an output interface 505 operable for sending file data;
and/or other desired interfaces for exchanging various types of information with other appliance is, applications, and/or systems.

In some embodiments, the input interface 501 and the output interface 505 (and, optionally the control interface 503) may be implemented via the use of a single interface (e.g., a physical or virtual network card).

In at least one embodiment, where the filer appliance 500 is used in a non-composite filer application, its network file server and client interfaces may be omitted or may not be used. In at least one embodiment, it is also possible to create a filer appliance which includes single volume slot (or single array slot) interface, and which also uses the client and/or the server interface(s).

Example of Filer Application with Network Transfers and Large Disk Arrays

FIG. 6 shows an example embodiment of a filer application 600 in accordance with a specific embodiment. As shown in the example of FIG. 6, the filer application may include functionality for performing network transfers in connection with multiple disk arrays. In at least one embodiment, the filer application 600 may be configured or designed as a composite filer application variant, in which each volume array (or selected volume arrays) is configured to interface with a separate or respective filer appliance. Additionally, in at least one embodiment, the filer appliances may be connected through interfaces in order to transfer data from the source to the destination volume(s).

In at least one embodiment, the filer application may include various components (e.g., virtual components) such as, for example, one or more of the following (or combinations thereof):

a control interface 601 (which, in the example of FIG. 6, is redirected to the filer appliance 161);
a boundary 600;
a file transfer interface 605 between the two subordinate filer instances;
a slave control interface 603, from which the source appliance (161) may control the destination appliance (163);
etc.

In one embodiment, the source filer appliance (e.g., 161) has the source volume array slot(s) 602 and the destination filer (e.g., 163) has the destination volume array slot(s) 604.

According to different embodiments, one or more of the filer appliances may be the same class (e.g., an OpenSolaris filer appliance) and/or of different classes (e.g., one is OpenSolaris, the other is Linux or Windows).

FIG. 7 illustrates an example embodiment of a virtualized distributed computing system 700 which may be used for implementing various aspects described herein. In at least one embodiment, system 700 may include a catalog/template system (or portion) 701 which includes one or more catalogs of different filer application templates. Additionally, as illustrated in the example of FIG. 7, system 700 may also include a runtime system (or portion) 750 where non-template (e.g., instantiated) applications run or are held.

When using virtualized storage—from logical volume manager (LVM) partitions, to storage area networks (SAN), to virtual volumes on fully virtualized systems (like AppLogic™)—it may be desirable to be able to perform maintenance operations on the volumes' file systems.

Examples of volume maintenance operations may include, but are not limited to, one or more of the following (or combinations thereof):
- copying the files from one volume to another;
- changing the file system from one type to another (e.g., FAT32 to NTFS, or even ext3 to UFS);
- resizing the volume while preserving the content;
- moving the file system from a single disk logical volume to a RAID or other type of multi-disk volume (volume array), as well as from one type of array to another (e.g., RAID1 to RAID5), and/or back to a single disk logical volume;
- checking the file system for consistency;
- repairing a damaged file system (e.g., repairing the metadata, replaying the journal);
- backing up and/or restoring files;
- changing the compression, security and/or other attributes of the files and file systems present on the volume;
- moving to and from single partition to multiple partition volumes;
- allowing programmatic or interactive access to the volume (e.g., for file transfers such as ftp and rsync);
- using a web browser interface to browse the volume content, upload and download files, such as, for example, upload and/or downloading archives;
- reorganizing the file system structure, such as, for example, changing attributes (e.g., the largefiles attribute of ext3, journal levels of reiserfs, etc.);
- performing check or configuration procedure over files in the file system (e.g., setting the network configuration on a Linux volume from which a Linux OS will be booted);
- etc.

In one embodiment, a virtual machine may be automatically/or dynamically assigned, on demand (and/or in real-time), to perform the desired maintenance action(s) or operation(s) over a particular volume or set of volumes. After the operation(s) have been completed, the virtual machine may be released. In one embodiment, the virtual machine may be automatically and dynamically created or instantiated on demand for each operation and destroyed after the operation completes. In another embodiment, there may be a pool of virtual machines from which one may be allocated to perform a given operation and released back to the pool whenever the operation completes.

In at least one embodiment, virtual machines (e.g., representing one or more filer appliances) may be operable to run one or more different types of operating systems such as, for example, Linux, Windows, FreeBSD, Solaris, etc., and may include the requisite or associated file system drivers and/or maintenance utilities for one or more of the file systems supported natively by these operating systems. For example, in one embodiment, a Linux operating system based filer appliance ("Linux filer") may be configured or designed to include file system drivers and utilities for the ext2, ext3 and REISERFS file systems. In another embodiment, for example, a Windows operating system based filer appliance ("Windows filer") may be configured or designed to include file system drivers and utilities for the FAT32 and NTFS file systems.

In one embodiment, a filer appliance can access a single volume and perform the maintenance operation over it. In other embodiments, a filer appliance can access two or more volumes (e.g., a source volume and a destination volume), and perform the operation across the multiple volumes (e.g., copy files from a smaller to a larger volume). In some embodiments, the filer appliance may also provide a file transfer interface, through which it can exchange file system data with other filer appliance(s) and/or filer applications. It will be appreciated that one benefit of such features is that it enables transfers between file systems supported by different operating systems (e.g., by employing the use of different filer appliances, wherein each filer appliance is configured or designed to be compatible for use with a different respective one of the operating systems).

In one embodiment, there may be provided an automated entity (e.g., runtime system, management system, etc.) that accepts user-initiated and/or system-initiated commands (such as, for example, a resize volume command which involves a volume resize operation). Responsive to such command, the managing entity may automatically select the appropriate filer appliance (or appliances) to perform the desired volume operation(s) (e.g., volume resize operation), may automatically and dynamically configure the selected filer appliance(s) to access the selected volume(s), and may direct the filer appliance(s) to perform the desired operation(s).

In at least one embodiment, the volume resize operation(s) may be performed by one or more virtual filer appliances and/or virtual filer applications while preserving the file system on the virtual storage volume during the volume resize operation. In at least one embodiment, the resizing operations may include, for example, providing a virtual filer application with access to the source (e.g, original) virtual storage volume (having a first volume size) and a second (e.g., target) virtual storage volume (having a second volume size which differs from the size of the first storage volume). In one embodiment, the virtual filer application may be operable to copy all (or selected) files from the source virtual storage volume to the target virtual storage volume.

In at least one embodiment, the managing entity may monitor or track the status of the volume operation(s), and collect status information from the filer appliance(s). When it has been detected that the volume operation(s) have been successfully completed, the managing entity may automatically release the filer appliance(s) and the volumes, and may also communicate the operation status to the initator.

In one embodiment, one or more filer appliances and/or filer application(s) may be implemented as AppLogic™ based catalog appliances. In at least one embodiment, the AppLogic™ catalog(s) may also include a number of differently configured filer applications, each including one or more filer appliances, wherein each different filer application is configured or designed to perform actions between volumes of any (or specifically selected) supported type(s) of file system(s).

For example, in one embodiment, the AppLogic™ runtime system, in response to a user-provided command (or system initiated command) regarding one or more volumes, may select one or more appropriate filer application(s) suitable for performing operations relating to the received command(s). Further, in at least one embodiment, the runtime system may provision instance(s) of the selected filer application(s) for the selected volume(s), may configure the selected filer application(s) with the desired operation and resources, and may initiate starting of the selected filer application(s). The runtime system may also periodically monitor the completion status of the operation(s) being performed by the filer application(s). In at least one embodiment, when it has been detected a desired operation has been successfully completed (e.g., that a particular filer application instance has successfully completed the operations it was created to perform) the runtime system may destroy that filer application instance.

In another embodiment, one or more filer appliances may be implemented as virtual machines created from pre-configured volume templates (e.g., as implemented by virtual machine managers such as VMware VI3, Citrix XenServer, Microsoft Virtual Server, or cloud computing services such as Amazon EC2, etc.).

For example, in one embodiment, a user (or a program, appliance or application) may request a maintenance operation to be performed on a given volume. In one embodiment, such a request may be provided via a management interface (e.g., visual, command-line, API, etc.). The management system may process the request, and select an appropriate template (e.g., filer appliance template) which is suitable for implementing the requested maintenance operation for the identified volume. In at least one embodiment, the management system may facilitate and/or initiate creation of a virtual machine instance from the template, and automatically and/or dynamically configure the initiated virtual machine instance (e.g., filer appliance instance) to access the identified volume. In at least one embodiment, the management system may wait until the virtual machine (filer appliance instance) completes its operations before destroying the virtual machine. In yet another embodiment, the management system may maintain a pool of one or more ready-to-run or running virtual machines (e.g., filer appliances), so that it can quickly allocate an instance when a maintenance operation may be required. In yet another embodiment, the management system provides multiple virtual machines (e.g., filer appliances) for performing operations between volumes with different file systems.

In at least one embodiment, one or more filer appliances/applications may be utilized for facilitating automated conversion of a file system of a virtual storage volume from a first file system type to a second file system type. For example, in one embodiment, the automated conversion of a file system of a virtual storage volume from a first file system type to a second file system type may include, but are not limited to, one or more of the following operations (or combinations thereof):

identifying a first file system type of a first file system of a first virtual storage volume;
automatically identifying a first virtual filer appliance operable to read files from the first file system type;
automatically providing the first virtual filer appliance with access to the first virtual storage volume, for example, by attaching the first virtual storage volume to the first virtual appliance;
identifying a second file system type of a second file system of a second virtual storage volume;
automatically identifying a second virtual filer appliance operable to write files to the second file system type;
automatically providing the second virtual filer appliance with access to the second virtual storage volume;
providing a first communication link between the first virtual filer appliance and the second virtual filer appliance, for example, by attaching the second virtual storage volume to the second virtual appliance;
performing, using the first virtual filer appliance and second virtual filer appliance, file system conversion operations for converting the first file system from a first file system type to the second file system of the second file system type;
etc.

In one embodiment, the performing of the file system conversion operations may include, for example:
operating the first virtual filer appliance to read a first plurality of files from the first virtual storage volume;
sending, via use of the first communication link, file information relating to the first plurality of read files to the second virtual filer appliance;
operating the second virtual filer appliance to receive the file information via the first communication link;
operating the second virtual filer appliance to write at least a portion of the received file information to the second virtual storage volume.

In some embodiments, running instances of the first and/or second virtual appliances may be automatically and dynamically created, on demand (e.g., as needed), in response to real-time condition and/or events. In some embodiments, running instances of the first and/or second virtual appliances may be automatically and dynamically created (e.g., on demand) using one or more virtual appliance templates and/or virtual application templates. Some of the virtual appliance/application templates may be dynamically generated (e.g., in real-time) using information relating to the first file system type and the second file system type. Other virtual appliance/application templates may be pre-configured, and selection of a desired pre-configured template may be based, at least in part, using information relating to the first file system type and the second file system type.

For purposes of illustration, the example embodiment of FIG. 7 will be described by way of illustration with reference to a specific example scenario. More specifically, in this specific example, it is assumed that it is desired to perform a volume maintenance operation which includes copying the files from a first volume (e.g., 776a) which utilizes a first file system type (e.g., Linux-based ext3) to a second volume (e.g., 776c) which utilizes a different file system type (e.g., Windows-based NTFS).

As illustrated in the example of FIG. 7, system 700 may include, for example, a catalog portion 701, a network portion 740 (e.g., WAN or LAN), and a runtime system portion 750.

In one embodiment, the catalog 701 may be used to store and/or provide access to templates (e.g., classes) of appliances 710 (e.g., virtual machines) and/or applications (e.g., 704a, 704b, 704n). In at least one embodiment, structures of one or more virtual machines may be combined and/or used together.

In at least one embodiment, runtime system 750 may be configured or designed to manage multiple applications in a virtual machine infrastructure. For example, the application (e.g., Application 1) 770 may include multiple appliances (virtual machines), including, for example, appliances 778a, 778b and 778n. In this specific example it is further assumed that the application 770 includes volumes 776a, 776b and 776c, wherein volume 776a utilizes a first file system associated with a first operating system type (e.g., OS-A), and wherein volume 776c utilizes a second file system associated with a second operating system type (e.g., OS-B). In alternate embodiments, the volumes 776a, 776b and 776c may be located or deployed external to the runtime system 750 (e.g., on a FibreChannel or iSCSI SAN). Additionally, in at least some alternate embodiments all (or selected) portions of application 770 may be deployed or instantiated outside (e.g., remotely from) runtime system 750.

In at least one embodiment, one or more filer appliances/applications may be utilized for facilitating remote file access to remotely located virtual storage volumes of a distributed computing network. For example, in one embodiment, remote file access to remotely located virtual storage volumes may include, but is not limited to, one or more of the following operations (or combinations thereof):

- receiving a first request to access a first remote virtual storage volume;
- automatically identifying a first type of file system at the first remote virtual storage volume;
- automatically identifying, using information relating to the first type of file system, a selected virtual filer application that is suitable for performing file system manipulations at the first remote virtual storage volume;
- remotely accessing, using the selected virtual filer application, one or more files at the first remote virtual storage volume.

In at least one embodiment, the file system manipulations may include various types of operations such as, for example, file system formatting operations, file read operations, and file write operations, etc.

Figure 8:
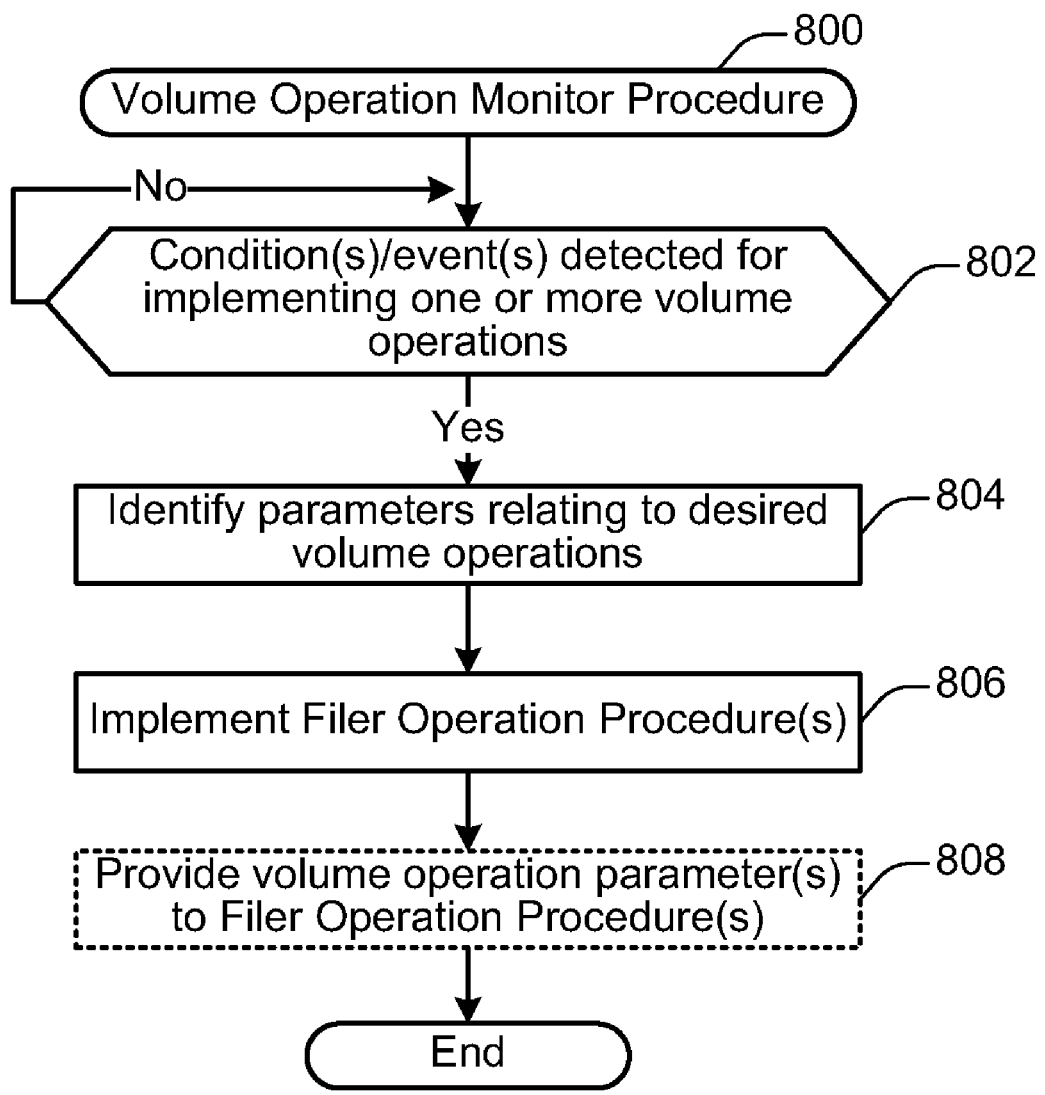
FIG. 8 shows an example flow diagram of a Volume Operation Monitor Procedure 800 in accordance with a specific embodiment.

FIG. 8 shows an example flow diagram of a Volume Operation Monitor Procedure 800 in accordance with a specific embodiment. For purposes of illustration, the Volume Operation Monitor Procedure 800 of FIG. 8 will now be described by way of example with reference to the system illustrated in FIG. 7 of the drawings. In at least one embodiment, at least a portion of the Volume Operation Monitor Procedure may be implemented at runtime system portion 750 of FIG. 7.

In this example it is assumed that it is desired to perform a volume maintenance operation which includes copying the files from a first volume (e.g., 776a) which utilizes a first file system associated with a first operating system type (e.g., OS-A), to a second volume (e.g., 776c) which utilizes a second file system associated with a second operating system type (e.g., OS-B).

At 802 a determination may be made as to whether one or more condition(s) and/or event(s) have been detected for implementing one or more volume operations. For example, according to different embodiments, such a condition or event may be detected by receiving a command from a human user, a programmatic API request, as a scheduled operation, etc.

In this particular example, it is assumed that a condition/event has been detected relating to a request to perform a volume maintenance operation which includes copying the files from volume 776a to volume 776c.

At 804 one or more parameters relating to the requested volume maintenance operation may be identified. Examples of such parameters may include, for example, one or more of the following (or combinations thereof):
- volume operation(s) to be performed;
- volume identifier information (e.g., relating to the identities of volumes 776a, 776c);
- file system parameter information (e.g., type of file system utilized at each volume, associated operating system information, etc.);
- and/or other parameters which may be useful in identifying and/or selecting the appropriate filer appliance(s) to be used for carrying out the requested volume operation(s).

At 806, one or more threads of a Filer Operation Procedure (illustrated, for example, in FIG. 9) may be initiated. In this particular example it is assumed that a single threat of the Filer Operation Procedure is initiated.

Additionally, in at least one implementation, as shown, for example, at 808, information relating to at least a portion of the identified volume operation parameters may be passed to (or made accessible to) the Filer Operation Procedure.

Returning to the example of FIG. 7, in at least one embodiment, upon recognizing that a volume maintenance operation is desired (e.g., by receiving a command/request from a human user, a programmatic API request, or as a scheduled operation), the runtime system 750 takes appropriate action to carry out the desired volume maintenance operations. For example, in this example it is assumed that the runtime system issues a volume maintenance command and/or other instructions for causing all files to be copied from a Linux file system on the volume 776a to an NTFS file system on the volume 776c.

In at least one embodiment, the system 750 may inspect the metadata of the volume 776a, and find it to contain a file system OS-A FS (e.g., Linux ext3); it may also inspects the metadata on the volume 776c, and find it to contain a file system OS-B FS (e.g., Windows NTFS).

In another embodiment, such as, for example, where the volume 776c does not yet have a file system assigned (e.g., it may be blank), the system 750 may use parameters of the maintenance command to instruct that OS-B FS may be created on the volume 776c. In yet another embodiment, the file system type information may be provided to the system 750, without it having to inspect the volumes.

In at least one embodiment, the system 750 may use the file system types discovered/identified to choose one or more appropriate structure(s) of filer appliances that can perform the requested maintenance operation. In one embodiment, the choice may be provided with (or embedded in) the maintenance command (e.g., use filer application template "ext3-to-ntfs").

In at least one embodiment, the system 750 may create an instance of the selected filer structure (e.g., an application in AppLogic™, a set of virtual machines in VMware, etc.). In the example in FIG. 7, it is assumed that the system 750 creates a filer application instance 752 which includes filer appliance 754, and another filer application instance 762 which includes filer appliance 764.

In an alternate embodiment, rather than creating separate file instances 752 and 762, a composite filer application instance (as illustrated, for example, in FIG. 3) may be created wherein the filer appliance 754 and the filer appliance 764 are both be included within the boundary of the same application template. Thus, for example, in one embodiment, the filer appliances 754 and 764 may be created together as a single AppLogic™ application and included with a common filer application boundary (similar to that illustrated, for example, in FIG. 3). One benefit of such an embodiment is that the runtime system 750 is not required to distinguish whether it is creating a single-appliance filer application (e.g., similar to that illustrated in FIG. 2), or whether it is creating a multi-appliance application (e.g., similar to that illustrated in FIG. 3). Rather, in at least one embodiment, the system may simply provide information about the source and destination volumes to the application, and allow the application to determine which volume may be attached to what appliance.

Returning to the example of FIG. 7, it is assumed that the filer appliance 754 has a virtual machine executing the OS-A operating system that can access the file system on volume 776a (in this example, OS-A may be Linux and the file system may be ext3). The filer appliance 764 has a virtual machine executing the OS-B operating system that can access the file system for volume 776c (in this example, OS-B may be Microsoft Windows and the file system may be NTFS).

In at least one embodiment, the runtime system 750 may configure the filer appliance 754 to access the volume 776a as the filer's source volume. It may further configure the filer appliance 764 to access the volume 776c as its destination volume. The system 750 may further configure the filer instances to perform or carry out the desired maintenance operation(s) (e.g., in this example, copy files from the source volume to the destination volume), The configuration may be performed through various mechanisms and/or information such as, for example, one or more of the following (or combinations thereof): properties, executing commands, submitting control requests to the filers, etc.

In one embodiment, once the filer application configuration has been completed, the runtime system 750 submits a "start" request to the control interface 757a of the appliance 754. In another embodiment, the appliance 754 may be configured or designed to automatically initiate the operation.

In one embodiment, in performing its functions, the appliance 754 may perform one or more of the following operations (or combinations thereof):
  begins read the file system from the volume 776a (e.g., visible inside the appliance 754 as its volume 755);
  convert or package all or selected files in a suitable format which allows the files to be migrated to the new volume/file system (e.g., files may be packaged using a serialized tape archive format (tar));
  send the packaged information to the appliance 764 through its outgoing interface 757b.

Thorough the network connection 759, the tar data may be received by the appliance 764 though its interface 767b, and written (e.g., through the native file system) to the volume 776c (which may be visible in the appliance 764 as its volume 765). During the operation, the appliance 754 may send all (or selected) files, with their associated metadata (such as, for example, directory name, filename, timestamp, permissions, streams, etc.) and data, to the filer appliance 764, so that all (or selected) files from the volume 776a are effectively copied to the volume 776c.

In one embodiment, the system 750 may periodically inquire the progress and status of the operation, through the control interface 757a. It may receive the status of the operation (e.g., ready or pending), progress (e.g., 50% done, 1 hr remaining), as well as other information (such as, for example, the name of the directory or file currently being copied, disk space left, etc.). In another embodiment, the system 750 receives a notification from the filer appliance 754 when the operation completes.

In one embodiment, when the system 750 receives indication that the volume maintenance operation has been successfully completed, it may deactivate the filer appliance 754 and 764. In another embodiment, the system 750 may destroy one or both of the appliances 754 and/or 764, releasing all their resources. In yet another embodiment, the runtime system may provide the volume 776c to an appliance or application that uses the files as the target file system format.

As discussed previously, in at least one embodiment, one or more filer appliances (and/or filer applications) may be configured or designed to operate in one or more different modes of operation, such as, for example, a batch mode of operation, an interactive mode of operation, etc. An example flow diagram of a Filer Operation Procedure operating in batch mode is illustrated in FIG. 9 of the drawings. An example flow diagram of a Filer Operation Procedure operating in interactive mode is illustrated in FIG. 10 of the drawings.

FIG. 9 shows an example flow diagram of a Filer Operation Procedure (Batch Mode) 900 in accordance with a specific embodiment. In at least one embodiment, a least a portion of the filer operation procedure may be implemented at runtime system portion 750 of FIG. 7.

At 900 it is assumed that the Filer Operation Procedure is initiated. For example, in at least one embodiment, one or more Filer Operation Procedure(s) may be initiated by the volume operation monitor procedure (e.g., 806).

As shown in the example embodiment of FIG. 9, at 901 the Filer Operation Procedure identifies the volume operation(s) to be performed and any parameters associated with the identified operation(s). Examples of such parameters may include, but are not limited to, one or more of the following (or combinations thereof):
  identifiers of the source and/or target volumes (e.g., LUN, volume name, iSCSI target, etc.)
  operation(s) to be performed (e.g., interactive; format, file-system copy, file system consistency check, file system repair, block copy, stream files out, stream files in, backup, restore, upload, download, wipe, etc.)
  operation attributes, such as whether to wipe the disk blocks prior to writing files, whether to fill the unallocated volume blocks as to cause allocation in the virtual storage system, volume name/label to assign to the volume (e.g., for lvm groups and/or zfs pools), RAID-type options, etc.
  file system attributes for the destination file system, such as the allocation cluster size, journaling options (e.g., whether to journal metadata, data or both), small/large files content, flavor of file system (e.g., Solaris-type UFS or FreeBSD UFS), percentage of volume to reserve for writeable snapshots, etc.
  network interface parameters, such as the IP address and other network settings to use for the filer(s), for example, so that the filer can be accessed from an external system (e.g., the operator's notebook) and/or so that the filer can access external systems (e.g., download server, backup service location, etc.)
  etc.

As shown in the example embodiment of FIG. 9, at 902 the Filer Operation Procedure selects the suitable or appropriate filer application template(s) that may be capable of performing the identified operation(s). The selection can be performed by a combination of one or more of the following criteria:
  user-provided identifier (e.g., user specified the name/location of the filer application to use)
  constructed name (e.g., by combining the name and/or other attribute of the source and target file systems: ext3-ntfs, ext3, ntfs-ntfs, etc.)
  table lookup (e.g., by looking up the names of the source/destination filesystems in a table and retrieving the application name
  selecting two or more instances, e.g., one based on the source volume file system type and one based on the destination file system type (e.g., a linux appliance for the ext3 source file system and a Windows appliance for the ntfs file system)
  requesting the name from an external system (e.g., via an API or a webservice)

enumerating the available filer appliances and/or application, and inspecting metadata (descriptions) associated with each, and finding the best match for the requested file system(s) (e.g., a Linux filer appliance may support ext3 file system with score of 10 (native) and FAT32 file system with score of 3 (non-native), while a Windows file system can support both NTFS and FAT32 with a score of 10 (native) and ext3 with a score of 0 (not supported)

etc.

In at least one embodiment, a list or database of filer appliances may be provided in which each (or selected) filer appliance of the database includes associated metadata (and/or other types of associated information) characterizing associations between that particular filer appliance and one or more different file system types. In at least one embodiment, such filer appliance metadata may be used to identify and/or select suitable filer appliances for use with a given file system type. One or more tables of selected filer appliances may then be automatically and dynamically generated using the filer appliance metadata information, and subsequently used when performing table lookups for suitable or appropriate filer application template(s). In other embodiments, a table or database may be provided which includes predefined associations between specific file system types and specific filer appliances. For example, in one embodiment, the database may include a list of different file system types and associated filer appliances which may be suitable for performing various different file system operations for each given file system type. In one embodiment, the runtime system may utilize a map (e.g., lookup table) for use in selecting suitable or appropriate filer application template(s) that may be capable of performing the identified operation(s). In yet another embodiment, the runtime system may identify and select multiple different filer appliances for performing desired tasks.

As shown in the example embodiment of FIG. 9, at 904 the Filer Operation Procedure assigns an instance of a filer to perform the identified operation(s). In at least one embodiment, various operations or activities which may be performed at block 904 may include, but are not limited to, one or more of the following (or combinations thereof):

- provision/create a new instance of the filer application from a template
- create one or more virtual machines based on images (e.g., as selected in block 902)
- allocate a filer application from a pool of available filer applications
- bind to an external service that provides filer service
- etc.

As shown in the example embodiment of FIG. 9, at 906 the Filer Operation Procedure configures the filer instances and/or application for performing the desired operations. In at least one embodiment, various operations or activities which may be performed at block 906 may include, but are not limited to, one or more of the following (or combinations thereof):

- configure properties of the filer appliance/application
- provide configuration data to the filer virtual machine instance (e.g., an XML configuration file)
- execute a command or send data to the filer instance, containing the desired configuration options
- the filer appliance automatically discovers the required configuration
- etc.

As shown in the example embodiment of FIG. 9, at 908 the Filer Operation Procedure attaches the source volume to the appropriate filer appliance. The Block may be optional and skipped if the operation does not use a source volume (e.g., file system format does may require a source volume), In at least one embodiment, various operations or activities which may be performed at block 908 may include, but are not limited to, one or more of the following (or combinations thereof):

- providing a volume identification (e.g., during configuration at block 906)
- connecting the desired volume to the filer appliance instance (e.g., connecting to the volume via iSCSI interface)
- instructing the system in which the filer appliance operates to provide the appliance with access to the volume
- creating a symbolic link to the volume
- presenting the volume (or its symbolic link) as a volume to be used with the filer instance
- place a lock the source volume, so that the volume will not be modified during the operation (e.g., a shared lock allowing other applications to only read the volume but not write to it)
- etc.

As shown in the example embodiment of FIG. 9, at 910 the Filer Operation Procedure attaches the destination volume to the appropriate filer appliance. In at least one embodiment, the operations and/or activities implemented at block 910 may be performed in a manner similar to those described with respect to block 908. It may also include placing an exclusive lock on the destination volume, preventing other applications from accessing the volume (for read and/or write), so that other applications don't read data that may be in the process of being written and may be in inconsistent state.

As shown in the example embodiment of FIG. 9, at 912 the Filer Operation Procedure starts the filer application instance. In at least one embodiment, various operations or activities which may be performed at block 912 may include, but are not limited to, one or more of the following (or combinations thereof):

- creating a virtual machine with a selected operating system (e.g., by using a template or pre-configured volume with the operating system, or by using an ISO CD or DVD)
- powering on virtual machines
- creating a virtual application with the filer appliances, containing a separate instance of one or more desired operating systems (such as Linux, Windows, etc.)
- unpausing (resuming) an already created but paused (suspended) virtual machine
- starting (booting) a virtual machine, appliance or application
- etc.

As shown in the example embodiment of FIG. 9, at 914 the Filer Operation Procedure performs the requested maintenance operation on the already running filers. In at least one embodiment, various operations or activities which may be performed at block 908 may include, but are not limited to, one or more of the following (or combinations thereof):

- reading files from the source volume
- writing files to the destination volume
- reading files and file system structure metadata for a volume
- creating or repairing file system structures for a volume
- writing data to all or selected blocks of a volume
- packaging files read into an archive for transfer (e.g., tar for backup or sending to another filer)
- unpackaging files from an archive (e.g., tar received from a backup or from another filer)

reading or writing files from another appliance or another system over a network file transfer protocol, such as ftp, nfs or pipe.

copying directories, files and other metadata from one volume to another creating RAID and other logical volume structures on the volumes provided to the appliance(s)

modifying the file system superblock and other metadata to adjust the file system options etc.

As shown in the example embodiment of FIG. 9, at 916 a determination is made as to whether the identified operation(s) have completed successfully, If it is determined the identified operation(s) have not completed successfully, at 918, a determination is made as to whether any errors have been detected. If one or more errors have been detected, one or more appropriate error handling procedure(s) may be implemented (920). Examples of such error handling procedures may include, but are not limited to, one or more of the following (or combinations thereof):

cleanup and release the filer (e.g., by performing operations associated with blocks 922, 924 and 926)

reconfigure the filer application and/or change operation options retry the whole operation, restarting from any of the preceding steps send notification or record the failure attempt alternate operation (e.g., file system repair prior to copying files from a damaged file system)

select different filer application template and repeat one or more of the steps perform cleanup and/or other recovery procedures provide additional time for the identified operation is to be completed restart the Filer Operation Procedure generating an error notification message continue the Filer Operation Procedure from a specific step or block executing additional procedures or subroutines etc.

As shown in the example embodiment of FIG. 9, at 922 the Filer Operation Procedure releases the filer application instance. In at least one embodiment, various operations or activities which may be performed at block 922 may include, but are not limited to, one or more of the following (or combinations thereof):

stop the virtual machine(s) that were performing the requested operations stop and destroy the filer application stop, pause or suspend the filer appliances (virtual machines)

release the filer appliances/applications to a pool shutdown the operating system in each of the filer appliances created for this operation etc.

As shown in the example embodiment of FIG. 9, at 924 the Filer Operation Procedure detaches the volumes. In at least one embodiment, various operations or activities which may be performed at block 924 may include, but are not limited to, one or more of the following (or combinations thereof):

releasing any shared locks that were placed on the volumes, thus allowing the volumes to be modified releasing any exclusive locks that were placed on the volumes, thus allowing the volumes to be accessed (e.g., for reading and/or writing)

releasing any other locks on the volumes destroying any symbolic links to the volumes that were created during the steps 908 and 910 marking the destination volume as ready-to-use (e.g., with a valid file system)

recording the file system type of the destination volume in a database or system metadata locks that may have been placed on them during the operation etc.

As shown in the example embodiment of FIG. 9, at 926 the Filer Operation Procedure destroys the filer instances. In at least one embodiment, various operations or activities which may be performed at block 926 may include, but are not limited to, one or more of the following (or combinations thereof):

releasing instances to the pool powering off virtual machines stopping and destroying virtual machine instances destroying the filer application instance etc.

In at least one embodiment, the operation of attaching the source volume may be optional (some operations may not use a source volume—e.g., format or repair—those need only a target/destination volume). In one embodiment, the operation may include creating a link to the desired volume and configuring the filer instance to use the link as its source volume. For example, in at least one embodiment, the operation of attaching the volume may include configuring a reference to an external storage device (physical or virtual), including specifying a device address (e.g., IP address), logical unit number (LUN), disk target, RFC-1737 universal resource name, etc. Further, in at least one embodiment, the operation of attaching the destination volume may be optional (some operations may not need a dst volume—e.g., the source filer appliance in a dual-filer appliance (see figure to come).

In one embodiment, a separate instance of a 'filer' appliance may be started based on detection of one or more specified conditions and/or events (or combinations thereof). Examples of such conditions and/or events may include, for example, detection of one or more events/conditions relating to one or more volume operation(s) to be performed. Examples of such volume operations may include, but are not limited to, one or more of the following (or combinations thereof):

a file system-level access operation (e.g., format, copy, fsck, fsck+repair);

user-requested access to a volume;

volume resize operation;

volume restripe operation;

volume copy operation;

data access operation;

data migration operation;

etc.

In one embodiment, the filer application instances may be reused. In other embodiments, it may be preferable that the filer application instances not be reused. For example, in one embodiment, once the task for which a given filer appliance instance was started has been successfully completed or accomplished done, that specific filer appliance instance may be stopped and/or destroyed.

In at least one embodiment, one or more filer application templates may be used for handling one or more of the volume operations to be performed. In at least one embodiment, one or more of the filer application templates may be preconfigured to perform specific tasks and/or operations. In at least one embodiment, one or more filer application templates may be named in a manner which connotes an association with one or more OS-type(s).

FIG. 10 shows an example flow diagram of a Filer Operation Procedure (Interactive Mode) 1000 in accordance with a specific embodiment. In at least one embodiment, a least a portion of the filer operation procedure may be implemented at runtime system portion 750 of FIG. 7.

In at least one embodiment, as illustrated in the example embodiment of FIG. 10, many of the operations of the Filer Operation Procedure (Interactive Mode) 1000 may be similar to corresponding operations of the Filer Operation Procedure (Batch Mode) 900 which have been previously illustrated and described respect to FIG. 9. Accordingly, a detailed description of such similar features will not be described again in the description of FIG. 10.

At 1000 it is assumed that the Filer Operation Procedure is initiated. For example, in at least one embodiment, one or more Filer Operation Procedure(s) may be initiated by the volume operation monitor procedure (e.g., 806).

As shown in the example embodiment of FIG. 10, at 1001 the Filer Operation Procedure identifies the volume operation(s) to be performed and any parameters associated with the identified operation(s).

As shown in the example embodiment of FIG. 10, at 1002 the Filer Operation Procedure selects the appropriate filer application template(s) that may be capable of performing the identified operation(s).

As shown in the example embodiment of FIG. 10, at 1004 the Filer Operation Procedure assigns an instance of a filer to perform the identified operation(s).

As shown in the example embodiment of FIG. 10, at 1006 the Filer Operation Procedure configures the filer instances and/or application for performing the desired operations.

As shown in the example embodiment of FIG. 10, at 1008 the Filer Operation Procedure attaches the source volume to the appropriate filer appliance. The Block may be optional and skipped if the operation does not use a source volume (e.g., file system format does may require a source volume).

As shown in the example embodiment of FIG. 10, at 1010 the Filer Operation Procedure attaches the destination volume to the appropriate filer appliance. In at least one embodiment, the operations and/or activities implemented at block 1010 may be performed in a manner similar to those described with respect to block 1008. It may also include placing an exclusive lock on the destination volume, preventing other applications from accessing the volume (for read and/or write), so that other applications don't read data that may be in the process of being written and may be in inconsistent state.

In at least one embodiment, the various operations described at steps 1006, 1008, and/or 1010 may be performed as part of step 1004.

As shown in the example embodiment of FIG. 10, at 1012 the Filer Operation Procedure starts the filer application instance.

As shown in the example embodiment of FIG. 10, at 1014, the Filer Operation Procedure may wait to receive a command or instructions (e.g., from an external entity such as, for example, a human operator, an external device or system, etc.).

In the example embodiment of FIG. 10, it is assumed at 1014 that the Filer Operation Procedure receives a command. Accordingly, as shown in the example embodiment of FIG. 10, at 1016 a determination is made as to whether the received command includes a termination request, such as, for example, a termination request for terminating or destroying one or more runtime instance(s) of specific filer appliances.

As shown in the example embodiment of FIG. 10, if it is determined that the received command does not include a termination request, the Filer application(s) may perform (1020) their appropriate volume operation(s) in accordance with the received command/instructions.

As illustrated in the example embodiment of FIG. 10, if it is determined (1016) that the received command does not include a termination request, the Filer Operation Procedure may initiate procedures for terminating or releasing one or more filer application instance(s), in accordance with the received command/instructions. In at least one embodiment, various operations or activities which may be performed at block 1022 may include, but are not limited to, one or more of the following (or combinations thereof):

stop the virtual machine(s) that were performing the requested operations stop and destroy the filer application stop, pause or suspend the filer appliances (virtual machines)

release the filer appliances/applications to a pool shutdown the operating system in each of the filer appliances created for this operation etc.

As shown in the example embodiment of FIG. 10, at 1024 the Filer Operation Procedure detaches the volumes. In at least one embodiment, various operations or activities which may be performed at block 1024 may include, but are not limited to, one or more of the following (or combinations thereof):

releasing any shared locks that were placed on the volumes, thus allowing the volumes to be modified releasing any exclusive locks that were placed on the volumes, thus allowing the volumes to be accessed (e.g., for reading and/or writing)

releasing any other locks on the volumes destroying any symbolic links to the volumes that were created during the steps 1008 and 1010 marking the destination volume as ready-to-use (e.g., with a valid file system)

recording the file system type of the destination volume in a database or system metadata locks that may have been placed on them during the operation etc.

As shown in the example embodiment of FIG. 10, at 1026 the Filer Operation Procedure destroys the filer instance(s). In at least one embodiment, various operations or activities which may be performed at block 1026 may include, but are not limited to, one or more of the following (or combinations thereof):

releasing instances to the pool powering off virtual machines stopping and destroying virtual machine instances destroying the filer application instance etc.

In at least one embodiment, the various operations described at steps 1022 and 1024 may be performed as part of step 1026.

In at least one embodiment, the operation of attaching the source volume may be optional (some operations may not use a source volume—e.g., format or repair—those need only a target/destination volume). In one embodiment, the operation may include creating a link to the desired volume and configuring the filer instance to use the link as its source volume. For example, in at least one embodiment, the operation of attaching the volume may include configuring a reference to an external storage device (physical or virtual), including specifying a device address (e.g., IP address), logical unit number (LUN), disk target, RFC-1737 universal resource name, etc. Further, in at least one embodiment, the operation of attaching the destination volume may be optional (some operations may not need a dst volume—e.g., the source filer appliance in a dual-filer appliance (see figure to come).

In one embodiment, a separate instance of a 'filer' appliance may be started based on detection of one or more specified conditions and/or events (or combinations thereof). Examples of such conditions and/or events may include, for example, detection of one or more events/conditions relating to one or more volume operation(s) to be performed. Examples of such volume operations may include, but are not limited to, one or more of the following (or combinations thereof):

- a file system-level access operation (e.g., format, copy, fsck, fsck+repair);
- user-requested access to a volume;
- volume resize operation;
- volume restripe operation;
- volume copy operation;
- data access operation;
- data migration operation;
- etc.

In one embodiment, the filer application instances may be reused. In other embodiments, it may be preferable that the filer application instances not be reused. For example, in one embodiment, once the task for which a given filer appliance instance was started has been successfully completed or accomplished done, that specific filer appliance instance may be stopped and/or destroyed.

In at least one embodiment, one or more filer application templates may be used for handling one or more of the volume operations to be performed. In at least one embodiment, one or more of the filer application templates may be preconfigured to perform specific tasks and/or operations. In at least one embodiment, one or more filer application templates may be named in a manner which connotes an association with one or more OS-type(s).

In at least one embodiment, one or more filer appliances/applications may be utilized for facilitating file access to online (e.g., in use, mounted, attached, etc.) virtual storage volumes as well as off-line virtual storage volumes (e.g., virtual storage volumes which are not currently in use, mounted or attached to a device). For example, in at least one embodiment, such file or volume access operations may include, but are not limited to, one or more of the following (or combinations thereof):

- receiving a first access request for performing a first file access operation at the first virtual storage volume;
- determining whether the first virtual storage volume is currently in use, mounted or attached to a virtual machine;
- in response to determining that the first virtual storage volume is currently in use, mounted or attached:
    - identifying a first virtual machine which has current access to first virtual storage volume; and
    - forwarding the first access request to the first virtual machine to thereby cause the first virtual machine to perform at least one file access operation at the first virtual storage volume; and
- in response to determining that the first virtual storage volume is not currently in use, mounted or attached:
    - automatically identifying a first type of file system at the first virtual storage volume;
    - automatically identifying, using information relating to the first type of file system, a selected virtual filer appliance that is suitable for performing file access operations at the first virtual storage volume;
    - automatically attaching the first virtual storage volume to the selected virtual filer appliance for providing the selected virtual filer appliance with file access to the virtual storage volume;
    - forwarding the first access request to the selected virtual appliance to thereby cause the selected virtual appliance to perform at least one file access operation at the first virtual storage volume.
- providing file access to at least one online virtual storage volume which is currently in use, mounted or attached to a first device of the distributed computing network;
- providing file access to at least one offline virtual storage volume which is not currently in use, mounted or attached to a any device in the distributed computing network;
- etc.

In at least one embodiment, the first virtual machine may correspond to (or may be configured to function as) a specific virtual appliance (such as, for example, a virtual filer appliance).

Properties

In at least one embodiment, one or more filer appliances may have associated therewith one or more different types of properties. Examples of such properties may include, but are not limited to, one or more of the following (or combinations thereof):

- mode (string, enum): valid values: manual, format, fscopy, fsck, fsrepair;
- fs_type (string): A mnemonic name for the system type. The name may be globally unique and for file systems already supported by AppLogic™, it may be the same name that may be currently documented in the AppLogic™ manuals—e.g., ext2, ext3. In at least one embodiment, it may be preferable to match the name to the one used by the -t option of 'mount'. In other embodiments it may be preferable to use a different name such as, for example, when using the UFS file system, which has different flavors that may be all supported by '-t ufs' but still may require an extra option to differentiate them.
- etc.

In at least one embodiment, a map of fs_type string(s) to filer appliance template(s) may be tracked, recorded, and/or managed using AppLogic™ (e.g., .conf) and/or other suitable mechanisms. In one embodiment, the map may be built automatically from info collected from the filers themselves. In at least one embodiment, the map can be generated automatically, for example, by extracting attributes from the available filers (e.g., users can create/install a new filer, the system collects from the filer's boundary the list of supported file systems and/or other attributes).

Additional filer appliance and/or filer application properties may also be employed, such as, for example, properties relating to file system-specific attributes (e.g., largefiles for ext3), and/or other properties relating to various types of filer appliance and/or filer application features and/or characteristics described herein.

Placeholder Volumes:

In at least one embodiment, an filer appliance may include one or more "placeholder" volumes such as, for example:

- src (default="src")
- dst (default="dst")

In at least one embodiment, the names of the data volumes need not be re-configured when provisioning an instance of the filer. In one embodiment, the "sym-link" mechanism (described herein) may be used to take care of this.

Interface:

The filer appliance may be configured or designed to include one or more interfaces (e.g., virtual interfaces) such as, for example, an HTTP interface on its 'default' interface, with the following functions available (by URI):

/or/index.html—interactive file access to the 'dst' volume (Web GUI).

/api/* reserved, to be extended to support starting file operations dynamically, rather than creating a new filer for each.

/api/status?op=X—returns command status (if started in a non-interactive mode—see Properties above). The "op=" parameter may be an operation ID, and may be used when filer appliances start supporting multiple operations. The values returned may be, for example: progress (integer, 0 ... 100), poll (integer, recommended status poll interval), status (integer status, valid only on completion, 0=OK) errortxt (string status, if an error occurred), etc. In one embodiment, a data format (such as, for example, UDL) may be specified (which, for example, may be returned with text/plain mime type, making it displayable by a browser for testing). Below is an example:

status progress=50, poll=10, status=0, errortext="completion pending"

In at least one embodiment, other formats may be supported (e.g., controlled by a fmt=xxx parameter in the URI), for example, to allow programmatic control from user-created scripts. Examples of such other formats may include one or more of the following (or combinations thereof):

URL-encoded (e.g.: progress=35&poll=10& status=&errortxt=)
XML
JSON
plain text

"Symbolic Link" Volumes:

In at least one embodiment, symbolic links (e.g., "sym-links") may be desirable to allow "wiring" volumes from any application (e.g., data and/or class volumes) into the name space of the filer application, so that it may be started with the current ABS build procedure (which, for example, may specify that any placeholder volumes are to be configured as data volumes in the application instance).

In at least one embodiment, to avoid the need for implementing symlink volumes, the ABS limitation may be addressed, for example, by modifying ABS itself to accept 'absolute' volume names. In other embodiments, alternative approaches may be utilized which do not necessarily require the use of symlink volumes.

In at least one embodiment, symlink volumes may be implemented as virtual volumes and configured or designed to function in a manner substantially identical to real, physical volumes in some or all operations.

In at least one embodiment, one or more symlink volumes may be configured or designed to respond to various types of commands, instructions and/or other input. Examples of such commands/input may include, but are not limited to, one or more of the following (or combinations thereof):

create may be initiated by using an option to the 'vol create' command (e.g. vol create --link=realvolume);
destroy destroys just the link, not the volume;
info (returns that it may be a link and the name of the real volume).

In at least one embodiment, broken links may be allowed, volume check operations may report errors (e.g. broken link errors), volume clean operations may remove them (e.g., just like orphans).

Volume Access
CLI Commands

Example of different volume operation related commands for use filer appliances and/or filer applications may include, but are not limited to, one or more of the following (or combinations thereof):

vol create
vol resize
vol copy [--fscopy]

In one embodiment, depending on the particular commands given, AppLogic™ CLI (and/or other managing software/appliance/application/system) may perform one or more of the following actions (or combinations thereof):

provision an instance of the appropriate filer template, with no user volumes; the application name may be based on the target volume name, so if two volume ops may be going on in parallel, there may be two separate instances;

create user volumes for the application as symlinks to the real volume(s) it needs. The symlinks may be named filer_instance.src and filer_instance.dst as needed for the operation that may be executed.

set the mode and target_fs_type/size, as needed
start the appliance
start collecting status from the appliance, via its default interface; the appliance reports progress and completion status
once the appliance says it's complete, it shuts it down, destroys the instance (destroying the volume links, too)

In at least one embodiment, one or more of the above described actions may involve a new filer appliance instance being provisioned, started, stopped and destroyed for each operation. In other embodiments, a new filer appliance instance being provisioned for performing multiple different operations, started, stopped and then destroyed once all of the operations have been completed.

Manual User Access
CLI:

The 'vol mount' and 'vol unmount' commands may be discontinued. Instead a new command may be introduced—vol manage, to do the following:

when the user requests access to a volume ('vol manage myapp:myvol'), a filer application may be provisioned and configured in manual mode, with the specified volume set up as the target data volume (like for a CLI command—see above).

once the filer starts, the '3t ssh' command may be executed internally and the user ends up at the command prompt of the filer appliance.

when the user exits the session to the filer, the filer may be stopped and destroyed; the vol manage command completes and control returns to the 3tshell command prompt.

vol manage --abort from another CLI session instantly terminates the matching SSH session to the filer and destroys the corresponding filer application to release the volume. This may be intended mostly for GUI use (see below). Users may rarely need to invoke this command.

GUI:

When the user requests access to a volume via the GUI, the back-end on the controller executes the vol manage command (like for CLI access above) and provides the user with proxy access to the home page of the filer's interactive interface. The 'proxied' page coming from the filer may be displayed inside a controller-provided GUI page, providing "context frame" that matches the overall GUI look of AppLogic™ and the necessary control buttons (e.g., like "unmount", to dismiss the file access GUI and release the volume).

In at least one embodiment, we can use the fact that the /monitor URL may be forwarded to the appliance named 'mon' in the application, and exploit this to provide the user with a way to open the filer GUI, without integrating it into a frame. All that may be done to achieve this may be to name the filer appliance 'mon'. An example implementation uses a generic proxy mechanism.

The SSH session associated with the vol manage command may be left open and may be destroyed upon user request (e.g., with the 'unmount' button on the controller-provided portion of the GUI page). The GUI "mount" (which started the vol manage) may survive closing the browser and/or logging out and the user may be able to return to the file manager page for a previously-mounted volume.

In addition, while the file manager GUI may be open, the user can request a Web-shell window, which opens a second SSH session to the filer. This second session may be naturally terminated when 'unmount' may be requested from the GUI, as this may terminate the 'vol manage' command and cause the filer to shut down.

The GUI file manager may be implemented using any web technology; for example the PHP eXtplorer available from http://extplorer.sourceforge.net/, or any of the number of free/open-source or commercially available web-based file managers. Support for browsing files, adding/removing/editing files, as well as for uploading and downloading files and archives may be desired.

File System Type Detection

Solaris volumes, as well as volumes used by HVM-supported operating systems (e.g., Windows) have a partition table. Also, the UFS magic number may be not enough to distinguish between the flavors of UFS. Therefore the default magic file that comes with the 'file' utility may be not suitable for reliably detecting file system type.

A custom descriptor file may be prepared for the 'file' utility, which detects all supported file system types. For the first version, this may be a read-only file prepared and installed with the Dom0 software (or on the controller, if that may be where FS detection may be done). This may be later modified to support assembling the 'magic' file from individual descriptors collected from the filer appliances, so that installing a new filer also brings the associated file system detection capability into the grid.

Access Synchronization

The single-use application instances pose a problem of synchronizing operations when multiple requests may be made for the same volume. Normally, when the volume was mounted in the controller space, this was resolved by not allowing two read/write mounts for the same volume. With the filer applications, the volume may become 'locked' only after the filer may be started, meaning that two commands for the same volume can clash by each one trying to set up and start an application with the same name.

With the new volume access approach, the fact that the operation to create a new application may be atomic (and may definitely fail if someone else may be trying to create the same application—no matter at what state of readiness the first one may be), may be used as a critical section mechanism, as follows—each CLI command that needs to start a 'filer' may perform one or more of the following (or combinations thereof):

create a filer application, report an 'in use' error if this fails. From this point on, the volume may be 'owned' by the CLI command that created the filer, no one else can access the volume.

configure the application as needed to perform the operation start the application wait for the op to complete destroy the filer application instance (the volume may be now released, because another instance of a filer for it may be created)

Appliance Configuration

The appliance configuration may support two modes:

"volfix"—the current method of fixing up the appliance's boot volume. An existing component descriptor (as found in currently used appliances) may always default to this method.

"dynamic" (aka "dhcp")—network-based configuration, based on DHCP. This may be to be used for new appliances (preferred for any OS type except Linux). This config method may be indicated by an attribute in the component descriptor or by a spe a cial value for the "os_type" attribute (also, the "os_type" attribute may be renamed, see Appendix for details).

When using the "dynamic" mode, the appliance configuration may be done in the following phases:

initial network configuration—at least the 'default' interface may be configured, maybe also the IP address of all interfaces, using DHCP.

configuration readout—the appliance configuration may be retrieved via the 'default' interface.

final configuration—terminal interfaces may be configured, the appliance properties may be set and the grid SSH key may be installed.

In at least one embodiment, the terminal interfaces cannot be configured fully in the initial net config because DHCP uses a simple IP/netmask/gateway setup, which may not be able to express point-to-point routes used for terminals.

Implementation

A new entity may be added (preferably to the controller, but it can run elsewhere too), an "appliance configuration server" (ACS). It has the following interfaces:

(A) Accessible to the entire grid:
DHCP server (UDP socket, listening on the 'private' NIC)
HTTP server (non-standard port, listening on the 'private' NEC)
DNS server (TBD, see Wish List in the Appendix)

(B) Accessible to the controller:
'configure' command: takes an appliance instance descriptor (UDL) as input and stores it, but does not make it available on the network. This command may be invoked by ABS at the end of a build (in place of the current vol fix).
'enable' and 'disable' commands: take an application name as input. 'enable' exposes the application configuration on the DHCP and HTTP interfaces in a form suitable for being retrieved by the appliance (see the exact format in the original proposal). These commands may be invoked by the application start/stop handlers in CTLD (probably the best place to add the calls may be the 'event' scripts invoked by CTLD on start/stop).

The appliance's 'AppLogic™_appliance' initscript requests the configuration from the server that provided the DHCP response (e.g., the controller) and configures the appliance accordingly.

The controller-facing ACS interfaces may be designed as proxies to the back-end (which serves the configuration to the grid) and be capable of distributing it to multiple back-ends, if necessary. In the extreme, each Dom0VM can own a config server back-end instance (which serves the appliances on that server only).

Appliance Startup

For new para-virtualized appliances, the currently used boot loader may be replaced by the XEN-style embedded boot-loader (pygrub), which does not require the kernel and initial ramdisk to be available in Dom0. Existing appliances may still be supported with the current boot method (but, in at least one embodiment, may be phased out, as appliances may be updated). For HVM appliances, XEN's hvmloader may be used, which also does not require anything to be read from the boot volume. This (along with not using vol fix in the controller) means that all file-level volume access during configuration may be phased out, when all appliances may be updated.

Example Embodiments of Potentially Affected Components in AppLogic™

Controller: modify the appliance start/stop event scripts to invoke enable/disable commands in ACS.ABS—add support for specifying bootloader type (pygrub or hvm)—when bootloader may be specified, ABS assumes dynamic config for the instance and does not do vol fixup, instead it sends the instance descriptor to the 'config' command of ACS. When no bootloader specified, but the old '.os_type=(linuxlraw) may be used, the current vol fixup mechanism may be used. This makes the change backward-compatible (see Appendix for ADL syntax change details).

Controller (UI): "mounting" of volumes may be discontinued, (Assembling 'md' arrays in the controller may be kept for block-level copy, but this may be replaced with Dom0-resident code, to allow better scheduling of such jobs and optimizing them by running them where the data source may be local).

Controller (UI): a new command may be added: "vol manage".

Controller (UI and backend): add symlink support: CLI option to create symlink (vol create --link=realvolume) and modification of all commands that use volume names to accept symlinks.

Controller (GUI): interface to the 'vol manage' command and access to the filer application GUI.

Controller (backend): add the ACS service (although for now we may run ACS entirely on the controller, note that only the ACS control interface may preferably to reside on the controller, the actual daemons that serve configuration may run elsewhere and exist in more than one instance).

Controller (backend): re-implementation of all commands that use file-level volume access, to use a filer application instance instead of mounting the volume on the controller. Affected commands: vol copy (when used with --fscpy), vol create, vol resize (also, file system check/preen may use the same mechanism).

Dom0 scripts: modify volume type detection, to use a custom 'magic' descriptor for the 'file' command, instead of using 'file' with the default magic desc and parsing its verbose output. Add proper detection of the different flavors of UFS volumes (Solaris, Solaris x86, BSD, etc.).

VRM/Dom0 scripts: support VM startup with pygrub (in addition to the xen loader and hvm).

In at least one embodiment, the changes below may be only needed if pygrub support cannot be used for some reason:

Dom0 scripts: add support for 'partitioned' volumes (for reading kernel & ramdisk images).

XEN: build Dom0 with UFS and advanced partitioning options enabled.

Other Considerations for Different Example Embodiments

In at least one embodiment, there may be various considerations for supporting locked appliances and user-provided filers.

For example, filers that may be certified (e.g., by a certification authority) may be allowed to perform operations on volumes of locked appliances or applications (locked appliances/applications prevent user's access to the data on the volume in order to (a) prevent disclosure of intellectual property/licensed product code/data, and (b) preserve the integrity of a particular appliance/application by preventing modification of the certified/official version). This may include operations like resize; operations that provide access (read-only or modify), such as "vol manage" may be disallowed over locked appliances.

It may be possible to allow users to define their own filer appliances and extend the file system mapping (e.g., to support custom file systems or a variety of disk construct, such as RAID, snapshots and differential file systems). These file appliances can provide the full functionality defined for filers, thus allowing users to easily extend the system to support other OS and file systems.

Such appliances, however, may be disallowed from performing any operations over volumes of locked appliances, because it may be possible for such custom appliance to perform additional operations (e.g., transfer out to the Internet a copy of the volume being resized). A certification process may be available to allow such appliances to manipulate locked volumes; it may be recommended that absent such certification, custom filer appliances may be not given volumes of locked apps or appliances.

Additional Functionality

In some embodiments, filer appliances my include other features and/or push now that such as, for example, one or more of the following (or combinations thereof).

"Hide" the filer application templates and instances from view (by prefixing their names with a '.' or some other symbol that identifies a 'hidden' application), or use the alternative below to avoid filer applications altogether.

Add a DNS service to the Appliance Config Server, to replace modifications to the /etc/hosts file in appliances. The service may be not a regular DNS server that matches a name to single IP address. Instead, it resolves the terminal names to IP addresses, depending on which appliance may be sending the request. The mapping may be updated dynamically from the information provided in the appliance instance descriptors (as given to the 'configure' command of the application config server).

Extension of the ' vol manage' command may be provided to enable a user to configure a public IP address & settings, as well as root password—all optional. They may be non-mandatory properties on the filer appliance; may be specified on 'vol manage' as variables (ip_addr=1.2.3.4 root_pwd=secret, etc., —just like application provision). If set, the appliance may enable its external interface. One immediate benefit may be that it may allow the user to download things from the 'net. In at least some embodiments utilizing Cloudware-based systems and/or including automatic IP allocation (e.g., in AppLogic™), this may become the default/easy. This allows users who log into the appliance to have network access, including possibly to the intranet or Internet, so files may be downloaded easily using tools like wget and the standard OS-specific tools, like rpm, yum, etc. It also allows for file upload/download to/from the appliance, using standard file protocols, such as ftp, scp, cifs, etc. (the same way as if the filer appliance was a physical server).

Alternative Embodiment(s) to the Filer Applications and Symbolic Links

Instead of having filer application templates and swarms of applications copied from them, abolish the filer apps in favor of a 'system appliance' that runs without being inside an application (like the controller does, for example). This approach also takes care of the need for volumes that may be 'symbolic links'—a 'system appliance' may be not bound by the ABS-inflicted rules of name locality and may be run with absolutely any volumes connected to it. In addition, this provides a degree of protection to the filer instances, as they're no longer exposed to user meddling (not being full-blown applications that may be visible/editable via the GUI). Achieving the same at the application level may require additional infrastructure to give different apps a different status in the system.

In an alternate embodiment, the filers may also provide block-level copy operations, thus allowing to "outsource" the I/O intensive operation to an appliance/VM with its resources and resource quota. This may be a separate appliance (e.g., block-level appliance, that may be file system and OS-independent); or one or more of the other appliances may support block-level operations. Block-level operations may include: copy, wipe/erase, import/export from external storage, encrypt/decrypt, compress/decompress, migrate to/from another system, synchronize with remote volume, etc.

In one embodiment, the filer may be implemented using a Live-CD or similar version of the operating system that provides the necessary file system drivers, using only read-only boot volumes. This allows the filer to be started quickly, without provisioning a read-write volume. In addition, the filer OS configuration may be optimized (e.g., using JeOS—"just enough OS") to remove services that may be not used by the filer operations, so that the filer appliance/VM can start and shutdown faster and require less resources.

In another embodiment, an open-source OS may be used to support filer operations for a file system that may be native to a licensed OS. For example, Linux with NTFS-3G driver (from http://www.ntfs-3g.org/) may be used to provide filer operations over NITS volumes, without requiring a license for a Windows appliance/VM. In another example, a free and open source implementation of an OS, such as ReactOS (http://www.reactos.org) may be used in order to reduce license costs or improve another aspect of the operation (e.g., faster boot, less resources).

Other Features, Benefits, Advantages

In at least one embodiment, one or more different filers can have drivers for foreign file systems (e.g., a Linux filer can have NTFS drivers).

More than one filer can support the same file system; the system can pick the fastest or the most appropriate. It may be also possible to provide read-only file system drivers for foreign file systems (e.g., an ntfs driver in Linux, or an ext3 driver in Windows), allowing appliances to copy files from a foreign file system to a file system they fully support It may be possible to create assembled filer applications, in which there may be two or more filers. This may be used, for example, to mount a source file system volume on a Windows-based filer and a destination file system volume on a Linux-based filer; the filers can then copy files from one to the other, using a standard network file system protocol, such as nfs or cifs, or a file transfer protocol, such as ftp, rsync, bittorent.

The filers can provide multiple volume stream slots for each volume, allowing a filer to mount a composite volume including of multiple streams (e.g., RAID-5, RAID-Z, or simply volume spanning (concatenation of volumes to increase total capacity). To do this, instead of having a single source volume, for example, the filer may have src_stream1, src_stream2, etc.; the filer can then inspect which volume streams were provided to it and construct the composite volume (aka, volume pool, volume set, raid array) and access the file system that spans the multiple streams. Can also be used for recovering mirror and checksum streams (e.g., in RAID1 and RAID5).

The filers may allow dynamical addition and removal of volumes. This may allow the system to keep a filer running at all times, and attaching to it volumes dynamically, performing the desired operations, and detaching the volumes. This allows for a faster operation (i.e, without having to provision and start a new filer for every operation). A modification of this approach may have a system keep a dynamic pool of filer appliances of various types, adding and removing "worker" filers to the pool as need for file operations arise (sizing the pool down to 0 if, e.g., no filer ops were performed in an hour; starting multiple filers, of the same or different types, for as long as multiple file system operations may be performed concurrently); when choosing the number of filers in the pool, the system can take into account how much resources may be available in the system (e.g., to still leave resources available for other applications.)

Various techniques described herein may be used on any system (not only AppLogic™. For example, in Amazon EC2, a filer may be a virtual machine instance; in VMware, Xen or Parallels, the filer may be a VM that may be started on demand (automatically or on request) when volume access may be required. All the variations apply, including the composite filers (e.g., starting two VMs that transfer files between each other over a network file system protocol or a file transfer protocol).

Mapping File Systems to Filer Application Templates

In at least some embodiments, there may be a mapping between file system type and the name of the filer application to use when performing operations over a volume of that type.

Description:

1. Add the following new attributes for each file system type:
    a. filer—name of the filer application template to use
    b. label—human-readable name for file system, displayed by GUI
    c. comment—optional comment describing the type of file system 2. The file system section of AppLogic™.conf may have the following format:
file systems

```
{
ext2 : min_size=1M, filer=apl_3t_filer_linux, label=ext2 , comment="ext2 file system"
ext3 : min_size=5M, filer=apl_3t_filer_linux, label="ext3 (journal)" , comment="ext3 file system"
fat32 : min_size=40M, filer=apl_3t_filer_linux, label=fat32 , comment="FAT32 file system"
reiserfs : min_size=40M, filer=apl_3t_filer_linux, label=reiserfs , comment="reiserFS file system"
swap : min_size=32M, filer=apl_3t_filer_linux, label=swap , comment="swap"
raw : min_size=1M, label=raw , comment="Unrecognized file system"
solufs : min_size=50M, filer=apl_3t filer_solaris, label="Solaris ufs, comment="Solaris UFS file
system"
ext3-snapshot : min_size=50M, filer=apl_3t_linux, label="ext3 Snapshot", comment="ext3 snapshot
(backup)"
}
```

3. Whenever the system needs to provision a new filer application from the template specified in the "filer" field, for manipulating a particular volume, it can choose a randomly assigned temporary name (e.g., a globally unique identifier/random number), or a name produced from the name of the target volume (e.g., filer_linux-sample_application-web_server-boot_volume).

4. Some pseudo-file system types, like swap, may also use a filer that may prepare the volume for a particular OS.

Generic File System Operations

AppLogic™ may be being modified to perform all file-level volume operations using a new Filer application so as to provide OS-independent support. In addition, the following new volume commands may be being added: manage, fscheck, and fsrepair.

Description:

1. For all operations, the name of the filer application instance may be comprised of a prefix "AppLogic™_Filer_" followed by the destination volume name with all dots replaced by dashes.

2. When an error occurs due to inability to create, configure, provision, create symbolic links, or start the filer application, an error message may be displayed to the user stating that the operation failed and specifies the reason for the error. In addition, the error message may be logged to the system log.

3. Modify vol_mkfs( ) helper to perform the following:
   a. Read AppLogic™.conf to retrieve mapping between file system types and filer applications.
   b. Determine the name of the filer application.
   c. If the filer application already exists, display the error message 'Failed to install file system on volume '<vol>'—the volume may be currently being managed" and fail the operation.
   d. Provision an instance of the filer application and configure mode=format and fs_type properties (specifies --skipstart on the 3t application provision command)
      i. If it fails, fail the operation with "Failed to install file system on volume <vol>—failed to provision filer application." and write the reason for the failure to the system log.
   e. Create a symbolic link to the volume that may be to be formatted with a name of '<filer_application>.user.dst'. If the symbolic link already exists, then reuse the link.
   f. start the application
      i. if it fails, destroy the link and the application and fail the operation with "Failed to install file system on volume <vol>—Failed to start the filer application possibly due to insufficient resources."
   g. Collect status from the filer application by executing wget '/application/status?op=format' on the default interface of the filer appliance once every poll interval returned by the filer.
   h. If an error occurs, display message containing the error text returned by the filer.
   i. When done, stop and destroy the application which also destroys the link.

4. Modify the vol_fscpy( )helper to perform the following
   a. Read AppLogic™.conf to retrieve mapping between file system types and filer applications.
   c. If the application already exists, display the error message "Failed to copy volume <vol>—the volume may be currently being managed" and fail the operation.
   d. Provision an instance of the filer application and configure mode=fscopy, fs_type, and fs_options properties (specifies --skipstart on the 3t application provision command)
      i. If it fails, display error message "Failed to copy volume <vol>—Failed to provision filer application" and write message to the system log stating the reason for the failure, and fail the operation.
   e. Create a symbolic link to the source volume—name may be '<filer_application>.user.src'—if fails, display error message to user, write message to the system log, destroy the application and fail the operation. If the symbolic link already exists, then reuse the link.
   f. Create a symbolic link to the destination volume—name may be '<filer_application>.user.dst'—if it fails, display error message to user, write message to the system log, destroy the source symbolic link and the application. If the symbolic link already exists, then reuse the link.
   g. Start the application
      i. If it fails, destroy the links and the application and fail the operation with "Failed to copy volume <vol>—Failed to start the filer application possibly due to insufficient resources." and write a message to the system log stating the real reason for the failure.
   h. Collect status from the filer application by executing wget '/application/status?op=fscopy' on the default interface of the filer appliance once every poll interval returned by the filer.
   i. If an error occurs, display message containing the error text returned by the filer.

j. When done, stop and destroy the application (which also destroys the links)

5. Add a new helper—vol_manage
   a. Read AppLogic™.conf to retrieve mapping between file system types and filer applications.
   b. Determine the name of the filer application.
   c. if abort may be specified
      i. Retrieve IP of running filer appliance and execute ps to find all ssh sessions related to the appliance and execute 'kill -9' for each ssh session found.
      ii. Stop and destroy the filer application and return
   d. If the filer application already exists, display the error message 'Failed to manage volume '<vol>'—the volume may be currently being managed." and fail the operation.
   e. Provision an instance of the filer application and configure mode=manual, fs_type, read_only, and optionally the IP-related settings (ip_addr, netmask, gateway, dns1, and dns2) properties (specifies --skipstart on the 31 application provision command)
      i. If it fails, fail the operation with "Failed to manage volume <vol>—Failed to provision filer application." and writes the reason for the failure to the system log.
   f. Create a symbolic link to the volume that may be to be managed with a name of '<filer_application>.user.dst'. If the symbolic link already exists, then reuse the link.
   g. start the application
      i. If it fails, destroy the link and the application and fail the operation with "Failed to manage volume <vol>—Failed to start the filer application possibly due to insufficient resources." and writes the reason for the failure to the system log.
   h. Display URL for volume access (http://<dflt_ip>/monitor)
   i. If 'nossh' was provided, and return success
   j. Retrieve the IP address of the running filer component and execute '3t ssh' into the component.
   k. When the ssh session terminates, stop and destroy the filer application (which destroys the symbolic link) and return the status of the ssh command.

Add new helpers vol_fscheck and vol_fsrepair whose operation may be identical to vol_mkfs with the exception of the parameterization of the filer application—mode=fschk or mode=fsrepair and the error message that may be displayed.

The volume management commands preferably invoke the above helpers as follows: create:
Validate arguments, etc.
create volume—call clihlp::vol_create( )—this invokes Red to create the volume
If file system type may be not raw, call clihlp::vol_mkfs( )
format
Validate arguments, etc.
Invoke clihlp::vol_mkfs( )
resize
Validate arguments, etc.
invoke clihlp:::vol_fscopy passing source & destination volumes
destroy the old volume & rename the temporary volume to the old volume
copy
Validate arguments, etc.
If—fscopy not specified, invoke clihlp::vol_copy which performs block-level copy
If—fscopy may be specified, invoke clihlp::vol_fscopy( )
manage
validate arguments, etc.
invoke clihlp::vol_manage( )
fscheck
Validate arguments, etc.
invoke clihlp::vol_fscheck( )
fsrepair
Validate arguments, etc.
invoke clihlp::vol_fscheck( )

It will be appreciated that one or more of the various techniques described herein may be adapted for use with respect to one or more different standardized specifications, protocols, customized or proprietary systems, etc. Accordingly, at least some of the embodiments disclosed or contemplated in this application have been described in a manner which is intended to help facilitate standardization and/or compatibility with various different standardized specifications, protocols, customized or proprietary systems, etc. Accordingly, the language used to describe the least a portion of such embodiments may include narrowly-defined, absolute and/or unambiguous terms (such as, for example, the terms "must", "shall", "required", etc.). However, it will be appreciated, that the descriptions of such embodiments are merely intended to provide descriptions of specific example embodiments (e.g., Filer Linux filer appliance, Filer Solaris filer appliance, Filer Windows filer appliance, etc.), but are not intended to limit the scope of the disclosure of this application only to such embodiments as explicitly described. Moreover, it is contemplated that alternative embodiments of those explicitly described herein may be derived by modifying one or more of the various features or aspects described herein, as would readily be appreciated by one having ordinary skill hi the art.

Filer_Linux, Filer_Solaris, Filer_Windows03: Filer Appliances

Functional Overview

Filer_Linux may be an appliance that provides filesystem-level access to a volume with a Linux file system. Filer_Linux supports the following Linux file systems: ext2, ext3, fat16, fat32, reiserfs, swap, and ext3-snapshot (ext3 over LVM with snapshots) and supports the following modes of operation:
format: format the volume to the specified filesystem (e.g., execute mkfs)
fscopy: perform a filesystem-level copy from one volume to another, the destination volume may be formatted prior to the copy
fsck: check the file system on the volume
fsrepair: check and repair the file system on the volume
manual: provide interactive, user-level access to the volume through both a Web GUI and root shell (through SSH), as well as programmatic access over a communications link, such as network interface (e.g., using ssh, scp access protocols and/or a network file system protocol such as CIFS or nfs).

In manual mode, Filer_Linux provides GUI access and root shell to the volume through its default interface. In this mode, Filer_Linux also optionally provides external network access in order for the user to copy files to and from the volume (manually or programmatically).

Filer_Solaris may be a filer appliance that provides filesystem-level access to a volume with a Solaris file system. Filer_Solaris supports the following file systems: ufssol and zfs. It supports the same modes of operation as the Filer_Linux appliance.

Filer_Windows03 may be a filer appliance that provides filesystem-level access to a volume with a Windows file system. Filer_Windows03 supports the following file systems: ntfs and ntfs03. It supports the same modes of operation as the Filer_Linux appliance.

The Filer appliances may be used internally by AppLogic™, e.g., in response to a volume operation request, or may be provisioned as a regular appliance or application and may not be used in regular AppLogic™ applications.

Filer_Windows03 may be distributed without the windows placeholder volume which may be required for it to boot and perform its operations.

In at least one embodiment, one or more filers support manual access mode with both single volume AppLogic™ 2.4.7+ supports manual mode operations over and two volumes.

| Name | Latest Version | Notes |
|---|---|---|
| Filer_Linux | 2.0.1 | |
| Filer_Solaris | 2.0.1 | 64-bit only |
| Filer_Windows03 | 1.0.0 | |

Boundary Resources

| Resource | Minimum | Maximum | Default |
|---|---|---|---|
| Filer_Linux resources | | | |
| CPU | 0.05 | 0.05 | 0.05 |
| Memory | 128 MB | 1 G MB | 512 MB |
| Bandwidth | 1 Mbps | 1 Mbps | 1 Mbps |
| Filer_Solaris resources | | | |
| CPU | 0.05 | 0.05 | 0.05 |
| Memory | 256 MB | 1 GB | 512 MB |
| Bandwidth | 1 Mbps | 1 Mbps | 1 Mbps |
| Filer_Windows03 resources | | | |
| CPU | 0.10 | 0.10 | 0.10 |
| Memory | 384 MB | 1 GB | 512 MB |
| Bandwidth | 1 Mbps | 1 Mbps | 1 Mbps |

Terminals

| Name | Dir | Protocol | Description |
|---|---|---|---|
| None | | | |

The external interface may be enabled. It may be used for incoming and outgoing traffic and its network settings may be configured through properties. It may be preferably may be only used in the manual mode and may not be configured in one or more other modes.

The default interface may be enabled. It may be used for maintenance, ssh shell access and for submitting requests for file system operations. Also, in the manual mode, it may be used for accessing the Web GUI that may be preferably provided in the filers.

User Volumes

| Volume | Description |
|---|---|
| src | Source volume for filesystem-level volume copy or management of two volumes in AppLogic(TM) 2.4.7+. Always mounted read-only (except may be mounted read-write by the Windows03 filer as may be needed to update the partition unique ID). May be left unattached (e.g., for operations that utilize a single volume, such as, for example fsck). |
| dst | Volume that Filer_Linux provides access to. One or more operations may be executed on this volume. Preferably mounted for read-write access, except it may be mounted read-only preferably when (a) filer may be started in Mounted read-only in fsck mode and (b) filer may be started in manual mode with if read_only property set to may be yes, otherwise mounted read-write. Mandatory in one or more modes. |

Properties

| Property name | Type | Description |
|---|---|---|
| mode | enum | Mode of operation for the filer. Valid values may be: manual, format, fscopy, fsck, fsrepair. This property may be mandatory. |
| fs_type_src | enum | AppLogic(TM) 2.4.7+ only. File system on the src volume when two volumes may be being managed. See fs_type_dst for valid values. This property may be mandatory when two volumes may be being managed; otherwise, it may be ignored. |
| fs_type_dst | enum | File system on the dst volume. Depending on mode, it may be either the file system currently on the dst volume or the file system to format on the dst volume. For Filer_Linux valid values may be: ext2, ext3, fat16, fat32, reiserfs, swap, ext3-snapshot. For Filer_Solaris valid values may be: ufssol and zfs. For Filer_Windows03 valid values may be: ntfs and ntfs03. This property may be mandatory. |

| Property name | Type | Description |
|---|---|---|
| fs_options | string | Additional file system options used to format the dst volume, in options=val pairs. This property may be file system specific and may be valid only in the format or fscopy modes. See below for the options that may be valid for at least one file system. Default: (empty) |
| read_only | enum | Restrict dst volume access to read-only (yes or no). Filer_Windows03 may ignore this value and always provides read-write access. Default: yes |
| ip_addr | IP Address | Defines the IP address of the external interface in manual mode. If set to 0.0.0.0, the external interface may not be used. Default: 0.0.0.0 (not used). |
| netmask | IP address | Defines the network mask of the external interface in manual mode. This property may be specified if ip_addr may be specified. Default: 0.0.0.0. |
| gateway | IP address | Defines the default network gateway for the external interface in manual mode. It may be left blank only if the remote host may be on the same subnet; may be specified otherwise. Default: (empty). |
| dns1 | IP address | Defines the primary DNS server used in manual mode to resolve domain names. This allows the user to specify hostnames when uploading/downloading files to/from a volume. Default: 208.67.222.222 (OpenDNS.org address). |
| dns2 | IP address | Defines the secondary DNS server, which will be used if the primary DNS server does not respond. Default: 208.67.220.220 (OpenDNS.org address). |
| vol_name_src | string | Name of the src volume being accessed by the filer when two volumes may be being managed. Default: (empty) |
| vol_name_dst | string | Name of the dst volume being accessed by the filer. Default: (empty) |

Operation Modes

The following table lists the supported modes depending on the file system type:for at least one of the supported file systems:

| | format | fscopy | fsck | fsrepair | manual |
|---|---|---|---|---|---|
| ext2 | yes | yes | yes | yes | yes |
| ext3 | yes | yes | yes | yes | yes |
| fat16 | yes | yes | yes | yes | yes |
| fat32 | yes | yes | yes | yes | yes |
| reiserfs | yes | yes | yes | yes | yes |
| swap | yes | no | No | no | yes |
| ext3-snapshot | yes | yes | yes | yes | yes |
| ufssol | yes | yes | yes | yes | yes |
| zfs | yes | yes | No | yes | yes |
| ntfs | yes | yes | yes | yes | yes |
| ntfs03 | yes | yes | yes | yes | yes |

In manual mode:
  for one or more file systems, but swap, the volume may be mounted on /mnt/vol.
  for a swap volume, the block device may be accessible on /dev/hda4.

Filesystem Options

This section lists the preferred file system options (as specified on fs_options) for at least one the file systems supported by Filer_Linux.
  ext2
    None
  ext3
    None
  fat16
    None
  fat32
    None
  reiserfs
    None
  swap
    None
  ext3-snapshot
    vol_group_name: string, name of the LVM volume group to create on the dst volume. If empty, randomly generate a volume group name. Default: (empty).
    data percentage: integer, percentage of the volume that may be used to store data, remaining portion of the volume may be for snapshots. Default: 80 (80% of the volume may be for data).
  ufssol
    None
  zfs
    pool_name: name of the zpool to create on the dst volume. If omitted, the vol_name property value may be used instead.
    mountpoint: mountpoint of the root dataset of the created zpool. Valid values may be: an absolute path, e.g. /mnt/mypool, legacy and none. Datasets with legacy mounts may not be automatically managed by zfs but may be specified desirable with entries in /etc/vfstab or used with manual mounting. Datasets with mountpoint of none may not be mountable. Default: /pool_name.
    autoreplace: controls automatic device replacement. If set to off device replacement may be manually initiated using zpool replace; if set to on any new device found in the same physical location may be automatically formatted and replaced. Default: off.
    delegation controls whether a non-privileged user may be granted access based on permissions defined on datasets. Valid values may be off and on. Default: on.
    failmode: controls behavior in the event of failure. Valid values may be wait, continue and panic. Default: wait.
    version: zpool version. Valid values may be 1-10. Default: 10 (current).
  ntfs and ntfs03
    volume_label: the volume label for the cast volume. If empty, the vol_name property value may be used instead.

active: create the new partition as active (bootable). Valid values may be yes and no. If omitted, the default value of no may be used during format while the value defaults to the src volume type during fscopy Interface The Filer appliances may provide an HTTP interface on their default interface in order to collect status on non-manual volume operations and to access the Web GUI when in manual mode. The following functions may be available by URL:

/: interactive access to the dst volume through the Web GUI, only available in manual mode /api/status: returns the status for the current volume operation, only available in non-manual mode The format of the output may be the following:
[progress=w, ]poll=X, status=Y, errortxt=Z progress: integer, 0 . . . 100, progress of the current operation. If progress cannot be reported, then the progress field may not be returned. Progress may not be reported for the following modes:

format for one or more file systems fsck and fsrepair for one or more file systems, but ext2, ext3, ext3-snapshot, and ufssol poll: integer, recommended status poll interval, in seconds.

status: integer, status of the volume operation. See below for the list of statuses that may be returned by Filer_Linux.

errortxt: string, error message, if an error occurred (e.g., non-zero status)

The following may be the list of statuses that Filer_Linux may return in the status field for a specific volume operation:

0—success
100—operation failed
101—operation not supported
102—operation not implemented
103—operation canceled
104—I/O error
200—no space left on volume
201—file system errors detected
300—out of memory
400—pending Web GUI In at least one embodiment, the Filer appliances may use a web-based file manager named eXtplorer (e.g., from http://extplorer.sourceforge.net/) to provide the Web GUI access to a volume (accessible preferably only in manual mode), eXtplorer may be released under the GNU GENERAL PUBLIC LICENSE Version 2. The version of eXtplorer used in the filers may be preferably have been modified; t. The following may be the changes to eXtplorer:

1. Removed the login.
2. Updated eXtplorer not to display its own files.
3. Changed the file list to show the target for one or more links under the "Type" column.
4. Changed the tooltip generated when the mouse is may be over a directory in the directory list to show the symlink target if the directory may be may be a symlink.
5. Changed symlink creation through the GUI to support orphaned links.
6. Changed delete file through the GUI to support deletion of symlinks.
7. Added an interface for editing the volume base path for any available volume (e.g., for presenting the symlinks as they will appear in the appliance that may access the volume).
8. Changed the generation of file & directory lists to support links.
9. Resolve relative & absolute links which include ' . . . '.
10. Add UI for chgrp/chown, allowing numeric entries only.
11. Add owner/group to the file display.

Figure 12:
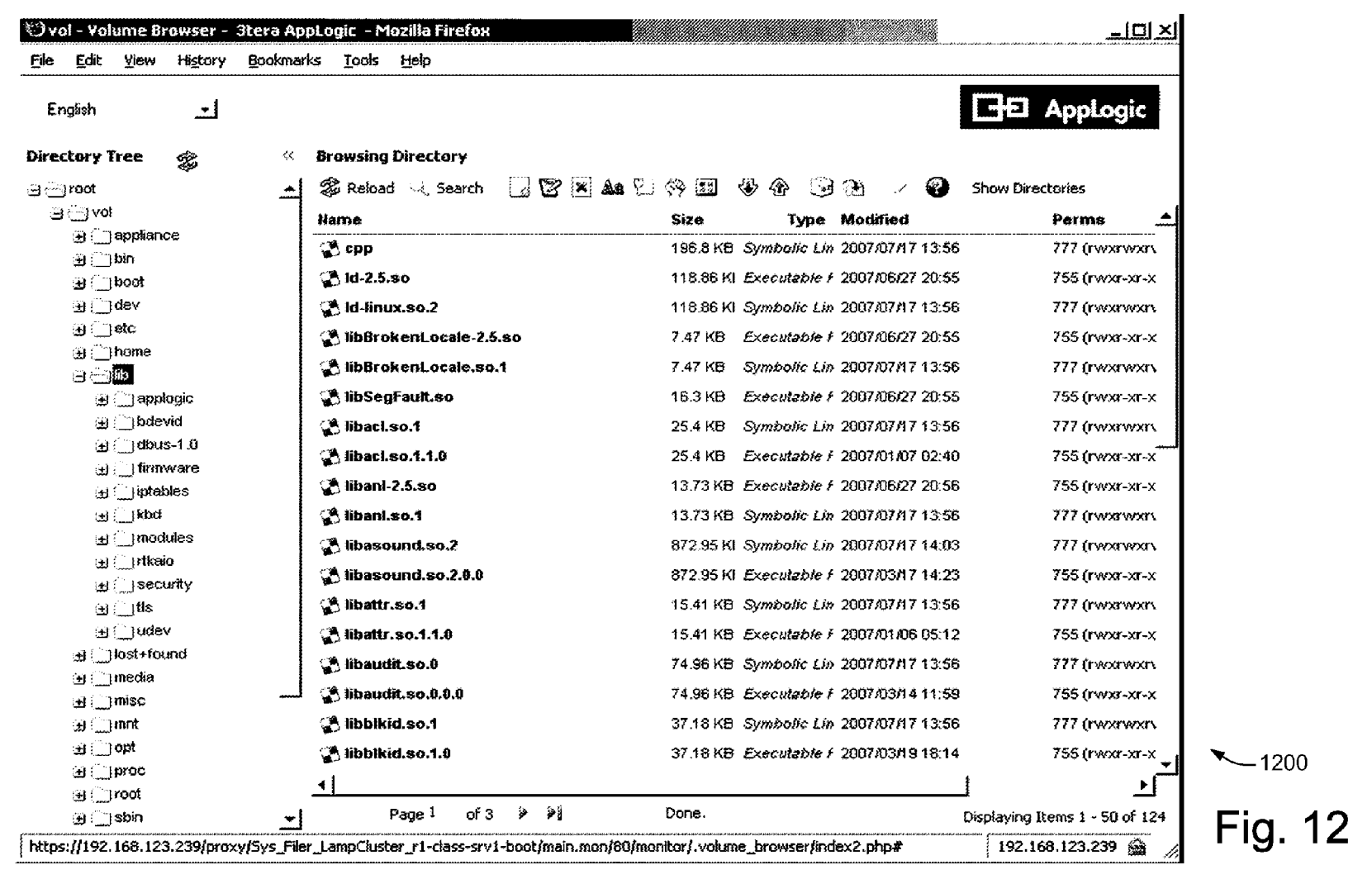

A specific example embodiment of an eXtplorer Volume Browser GUI as illustrated in FIG. 12 of the drawings.

In at least one embodiment, the user interface may have 3 sections: a directory tree, a button bar and a detail object list.

The directory tree may represent the directory structure of the user virtual storage volume. The button bar may include buttons that may be operated to invoke various filesystem operations. The detail object list may show the contents of the selected directory.

Symbolic links may be resolved as follows:

A link whose target may be defined as a relative path (e.g., /example) may be shown in the directory tree if the target resolves onto the volume; otherwise it may be shown in the file list as an orphaned link.

A link whose target may be defined as an absolute path (e.g., /mnt/content/example) may be shown in the directory tree if the target resolves onto the volume using the volume basepath; otherwise it may be shown in the file list as an orphaned link. The volume base path indicates the path to the volume when it may be in use within an appliance (where the volume may be mounted within the appliance). For example, if the volume may be normally mounted as /rant/content/ within the appliance, then setting the volume basepath to /rant/content/ allows the Volume Browser to resolve absolute links which target /rant/content/. The volume basepath may be set using the toolbar button for setting the basepath.

In at least one embodiment, the button bar may include various buttons representing functions (operations) to be performed, such as, for example, one or more of the following (or combinations thereof):

| Button | Function |
| --- | --- |
|  | Re-load/Refresh the file list |
|  | Search the contents of the root directory. If include subdirectories may be selected, the search includes the entire volume. Symbolic links may be not followed during search. |
|  | Create a new file, directory or symbolic link. |
|  | Edit the currently selected file. |
|  | Delete the currently selected files or directories. |
|  | Rename the currently selected file or directory. |
|  | Chmod (change read, write and execute permissions) on the currently selected files or directories. |

| Button | Function |
|---|---|
| | Chown/chgrp (change owner or group) on the currently selected files or directories. |
| | View the currently selected file. |
| | Download the currently selected file. |
| | Upload files to the currently selected directory. Files may be selected from the local machine. Files may also be transferred from a remote server. Below may be example URL's for transferring files from a remote server:<br>http://example.com/file.txt<br>ftp://example.com/pub/file.txt<br>ftp://user:password@example.com/pub/file.txt<br>ftps://example.com/pub/file.txt<br>ftps://user:password@example.com/pub/file.txt<br>There may be a 10 MB file size limit for uploads. In order to upload larger files, execute the vol manage command from the shell, configure the external IP settings, and transfer the files by executing the appropriate command from within the filer shell. |
| | Archive the currently selected files. The archive may be .zip, .tar, .tar.gz or .tar.bz2. |
| | Extract the currently selected archive file into the currently selected directory. |
| | Edit the volume basepath for the volume. The volume base path indicates the path to volume when it may be mounted in an appliance. For example, if the volume may be normally mounted as /mnt/content/ in an appliance, then setting the volume basepath to /mnt/content/ allows the Volume Browser to resolve absolute links which target /mnt/content/. |
| | Help (a link to this document). |
| Show Directories | Show sub-directories in the file list. |
| Filter | Filter the file display to show only those items whose names begin with characters matching the user-supplied filter. The filter string may be at least two characters to change the file list. Setting the filter to the empty string causes filtering to be turned off. |

The eXtplorer licenses and the source to the original un-modified eXtplorer may be found on the Filer appliances in /rant/monitor/.volume_browser/LICENSES/.

ZFS Implementation Specifics

Filer_Solaris may supports zfs pools containing a single virtual device to allow users access to zfs volumes in the same manner as volumes using other file systems such as ufssol. More complex pools using multiple devices may be created manually using raw volumes within an AppLogic™ appliance, but such volumes may not operate cannot be used with Filer_Solaris. ZFS filer operations may be constrained to the following behaviors.

Pools may be created using the altroot property. As a result the mountpoint of the root dataset may be explicitly set, rather than defaulting to the pool name. This may be due to a bug in the current zpool command which sets the default mountpoint to /altroot rather than /altroot/pool_name.

fsrepair preferably executes zpool scrub and returns a single line of status on completion; either success or failure. However, zpool scrub may be executed live on any pool within a running appliance and displays much more information in the event of a problem.

fscopy supports only file system datasets (volume, snapshot and clone datasets may not be copied). Administrative permissions may not be preserved by fscopy.

While the zpool version may be set with fs_options on create, the zfs version of the root dataset may be 2, which may not be backwards compatible with version 1. Solaris 10 appliances use zfs version 1. To use zfs pools with Solaris 10 appliances, create the pools manually from raw volumes rather than using Filer_Solaris.

The Solaris filer does may be disabled not to support root zpools (zfs boot volumes) in order to avoid a possible bug. There may be a bug in OpenSolaris 2008.05 which renders a root zpool un-bootable once it has been imported into another Solaris OS.

NTFS Implementation Specifics

Please carefully note the following implementation specifics and behaviors of Filer_Windows03:

Filer_Windows03 operations may be limited to:
 basic disks only (not dynamic disks)
 MBR based pardons only (not GUID based partitions)
 exactly one primary partition per disk
Short names may be enabled.
fscopy operations may be performed with the robocopy utility. As a result, compressed source files may be un-compressed on the destination volume. When performing a filesystem-level copy of a volume, be certain to leave enough room on the destination volume to account for this. If you copy the boot volume of a Windows appliance and the destination volume does not have sufficient free space, Windows will fail to boot (even though the copy operation proceeded without error). The recommended minimum free space for a Windows 2003 Server Standard Edition appliance may be 1.25 GB, although in practice the OS will boot with less. robocopy does not support circular junction point references. If such references exist, the fscopy operation will fail.

If, during vol manage, you want access to the console but do not know the Administrator password, ssh to the appliance from a 3T shell and execute net user Administrator new-password to set a new Administrator password.

Local user account SID's on a volume mounted on Filer_Windows03 may not be recognized by Filer_Windows03. In manual mode, files owned by local user accounts may will display without a recognized user name.

Filer_Windows03 may boots from a small ext3 volume with GNU GRUB installed. Grub may be used to hide the first primary partition of the src volume during fscopy and of the src and dst volumes during manual operation. The Windows bootloader ntldr may not be equipped to discriminate among multiple active (bootable) partitions, and so grub may be used to prevent Filer_Windows03 from possibly booting from the wrong active partition. Upon successful start, the hidden partition, if any, may be un-hidden so that filer operations may proceed.

If Filer_Windows03 abnormally terminates after grub has hidden a partition but before it has been un-hidden, the partition will may be left in a hidden state. While it may be very unlikely that this may occur, if it does, simply vol manage the affected volume and exit. This will restore the partition to its normal state. To avoid this potential problem, do not ctrl-c to terminate a filer operation while the filer may be early in the boot process.

Unlike other ext3 volumes under AppLogic™, the small ext3 boot volume of Filer_Windows03 has an MBR. As such, it cannot may not be manageabled with Filer_Linux, and filesystem level copy operations over it using Filer_Linux may also will also fail. If you would like to use this volume as the basis for your own custom grub-based appliance, you may access this volume as follows:

Create a new application including a branched LUX5 with a placeholder volume.

Copy the Filer_Windows03 grub volume to this application: vol copy Sys_Filer_Windows03:mon.grub application-name:volume-name Start the new application and open a shell on the branched LUX5: mkdir /mnt/tmp; mount -text3-oloop=/dev/loop0,offset=32256 /dev/hda3/mnt/tmp. You may now access the filesystem of the copy of the grub volume at /mnt/tmp.

Example Usage

The following sections describe the configuration of Filer_Linux in several typical use cases:

Formatting a Volume

Example:

| Property name | Value | Description |
|---|---|---|
| mode | format | format volume |
| fs_type_dst | reiserfs | format volume with reiserfs |

Filer_Linux preferably executes mkfs over the dst volume, specifying a filesystem type of reiserfs.

Formatting an Ext3-Snapshot Volume

Example:

| Property name | Value | Description |
|---|---|---|
| mode | format | format volume |
| fs_type_dst | ext3-snapshot | format volume with ext3 over LVM with snapshots (e.g., 2 partitions) |
| fs_options | vol_group_name=VGVOL data_percentage=75 | 75% of the volume may be data |

Filer_Linux creates a volume group named VGVOL on the dst volume. It then creates a partition named data in the volume group. This partition uses 75% of the space on the dst volume and may be formatted with ext3. The remaining partition may be for snapshots and may be named snap.

Filesystem-Level Volume Copy

Example:

| Property name | Value | Description |
|---|---|---|
| mode | fscopy | filesystem-level copy |
| fs_type_dst | ext3 | format destination volume with ext3 |

Filer_Linux formats the dst volume to ext3 with mkfs. It then mounts the src volume read-only and mounts the dst volume read-write. Finally, Filer_Linux copies the contents of the src volume to the dst volume using cp and unmounts both volumes.

File System Check

Example:

| Property name | Value | Description |
|---|---|---|
| mode | fsck | file system check |
| fs_type_dst | fat32 | volume to be checked has fat32 |

Filer_Linux executes fsck on the dst volume.

File System Check with Repair

Example:

| Property name | Value | Description |
|---|---|---|
| mode | fsrepair | file system check with repair |
| fs_type_dst | fat32 | volume to be checked and repaired has fat32 |

Filer_Linux executes fsck with the repair option on the dst volume.

User-Level Access to Volume

Example:

| Property name | Value | Description |
|---|---|---|
| mode | manual | provide user-level access to volume |
| fs_type_dst | ext3 | volume has ext3 |
| read_only | no | read-write access to the volume |
| ip_addr | 192.168.123.100 | IP address for external interface |
| netmask | 255.255.255.0 | netmask for external interface |
| gateway | 192.168.123.1 | gateway for external interface |
| dns1 | 192.168.123.254 | DNS server |

Filer_Linux mounts the dst volume read-write at /rant/vol. It then starts the eXtplorer GUI and starts sshd, which gives the user root access to the volume. The GUI may be accessible through the default interface and any file transfers to/from the volume may be through the external interface.

Notes

The Linux Filer may be based on Ubuntu 7.04

The Solaris Filer may be based on OpenSolaris Build 2008.05

The Windows Filer may be based on Windows Server 2003 Standard Edition R2 32-bit The Windows Filer preferably by default uses a random Administrator password for security purposes. If this may not be may be not desired, change the password as described in the Windows Appliance Notes.

In non-manual mode, there may be no SSH or GUI access for improved security of the operation (e.g., without allowing user access)

Filer Linux_Linux Filer_Implementation Design

Base Class

The Linux Filer may be based on an Ubuntu LUX-like appliance, based on Ubuntu 7.04.

Class Volume

The volume configuration for the Linux Filer appliance may be determined by the base class image from which it may be created.

The Linux Filer appliance preferably uses a read-only, shared boot volume in order to reduce the startup time. One possible embodiment may use a boot volume may not be sensitive to the volume configuration and will work on most any setup. The setup chosen for the 1.2. release may be as follows:

boot volume:of 225 MB, mounted as "/", read-only, common

The base class image preferably contains a minimum Ubuntu installation.

Packages

The Linux Filer may contains the following additional packages:
apache-2.2.3-3.2ubuntu2
ftp-0.17-16
lftp-3.5.6-1build1
ncftp-3.2.0-1
lvm2-2.02.06-2ubuntu9
eXtplorer-2.0.0_RC1-1

Scripts

The Linux Filer contains the following scripts, which implement the functionality of the filer. In the appliance, these scripts may be stored at /usr/local/appliance/scripts/.

format.sh—setup the filer to operate in format mode (e.g., execute mkfs on the dst volume)

fscopy.sh—setup the filer to operate in fscopy mode (e.g., mount both src and dst volumes and cp contents from src to dst)

Lack.sh—setup the filer to operate in Lack mode (e.g., execute fsck on the dst volume)

fsrepair.sh—setup the filer to operate in fsrepair mode (e.g., execute fsck with repair option on the dst volume)

manual.sh—setup the filer to operate in manual mode (e.g., mount the dst volume, start ssh, setup external interface)

get_cp_progress.sh—estimates and returns the current progress for cp, in percentage, Called by the fscopy.sh script.

setenv.sh—sets various environment variables used by other scripts

The scripts corresponding to the mode property may be invoked by /etc/sysconfig/appliance.sh.

Contents of the Release Directory

Exported appliance image
filer_linux-1.2.1-1.tar.bz2
Appliance sources
filer_linux-1.2.1-1-src.tar.bz2: tar of one or more the scripts used to recreate the appliance
Tests
filer_linux-tst.tar.bz2: Linux Filer test scripts Re-Install Procedure Here may be the following steps may be used to create a Linux Filer appliance from an Ubuntu LUX appliance on an AppLogic™ grid (This may require maintainer access to the grid):

1. Copy and uncompress filer_linux-1.2.1-1-src.tar.bz2 on the grid controller.
2. Execute the mklinux.sh script: sh mklinux.sh, which performs the following:
   imports the Ubuntu LUX (ULUX) to the /proto catalog
   rename the ULUX appliance to Filer_Linux
   mount the boot volume of Filer_Linux for read-write
   remove one or more unnecessary services (e.g., syslog, cron, etc.)
   copy eXtplorer to the boot volume
   copy one or more mkfs and fsck scripts to the boot volume
   copy filer-specific scripts to the boot volume
   unmount the boot volume
   export the Filer_Linux class
   tar and zip the Filer_Linux class export
   NOTE: One or more operations may be logged to mklinux.log. Check the log in case of any failures.
3. Find the Linux Filer release tar, Filer_Linux-1.2.1-1.tar.bz2, under /vol/_impex.

Theory of Operation

Filer_Linux may be a standalone appliance that provides filesystem-level access to a volume with a Linux file system.

Configuration

External Network Setup

Filer_Linux has an may have external interface which allows the appliance to communicate with the outside world. When the external interface needs to be configured, Filer_Linux may invokes the /usr/local/appliance/appliance_netsetup.sh script to configure the external interface (similar to the script with the same name found in one or more AppLogic™ gateway appliances).

The /usr/local/appliance/appliance_netsetup.sh script assigns ip_addr (if one is may be specified) to the external interface. This script also sets the netmask and gateway, as well as setting the DNS servers.

Log Files

Filer_Linux does not create any additional logs. One or more logging services may be disabled.

Filer_Solaris—Solaris Filer—Implementation Design

Base Class

The Solaris Filer may be based on OpenSolaris build 2008.05 or 2008.11. It has no base class.

Class Volume

The Solaris Filer preferably has a single volume with the following parameters:
boot volume: 900 MB, mounted as "/", read-write Packages The Solaris Filer may contains the following additional packages;
apache-2.2.8
php-5.2.5
eXtplorer-2.0.0_RC1-8

Scripts

The Solaris Filer contains the following scripts, which implement the functionality of the filer. In the appliance, these scripts may be stored at /appliance/scripts/.

format.sh—setup the filer to operate in format mode (e.g., execute mkfs on the dst volume)

fscopy.sh—setup the filer to operate in fscopy mode (e.g., mount both src and dst volumes and cp contents from src to dst)

fsck.sh—setup the filer to operate in fsck mode (e.g., execute fsck on the dst volume)

fsrepair.sh—setup the filer to operate in fsrepair mode (e.g., execute fsck with repair option on the dst volume)

manual.sh—setup the filer to operate in manual mode (e.g., mount the dst volume, start ssh, setup external interface)

get_cp_progress.sh—estimates and returns the current progress for cp, in percentage. Called by the fscopy.sh script get_scrub_progress.sh returns the current progress of scrub as a percentage. Called by the fsrepair_zfs sh script setenv.sh—sets various environment variables used by other scripts zfs_copy.php—copies filesystem datasets from src to dst pools zfs_cpio.sh—cpio helper script for filesystem dataset copy zpool_size.php prints pool size, used and available space in Kb to stdout The scripts corresponding to the mode property may be invoked by /appliance/appliance.sh Contents of the Release Directory
  Exported appliance image
    filer_solaris-1.1.0-1.tar.bz2
  Appliance sources
    filer_solaris-1.1.0-1-src.tar.bz2: tar of one or more the files used to recreate the appliance
  Tests
    filer_solaris-tst.tar.bz2: Solaris Filer test scripts Re-Install Procedure The following Here may be the steps may be used to create a Solaris Filer appliance on an AppLogic™ grid (In one embodiment, this may require maintainer access to the grid):

Preparation
  Copy and uncompress filer_solaris-1.1.0-1-src.tar.bz2 on the impex volume of the grid controller. The archive extracts its contents into the directory work_Filer_Solaris.
  Include the current eXtplorer and Solaris APK in this directory. Edit the file setenv.sh to use current version settings.
  On dom0 of srv1 create a directory /var/AppLogic™/osol_filer_build. From /vol/_impex/work_Filer_Solaris on the controller, scp the archive filer_solaris_dom0.tar.gz to this directory and unpack it. The archive contains configuration files for xm create.
  Download os.200805.iso from http://www.opensolaris.org to the impex volume, and then push it using scp to the dom0 working directory.

Create an Installed ZFS Image
  On dom0, in /var/AppLogic™/osol_filer_build:
  Get the kernel and ramdisk used to boot the cd image onto the local filesystem:
    mkdir tmp
    mount -o loop os200805.iso tmp
    cp tmp/boot//platform/i86xpv/kernel/amd64/unix.
    cp tmp/boot/x86.microoot.
    umount tmp
    rmdir tmp
    dd if=/dev/zero of=disk-image bs=1k seek=3071k count=1k
    losetup/dev/loop0 disk-image
    xm create -c osol-2008.05-install
  patch the kernel at the kmdb prompt:

Welcome to kmdb
Loaded modules: [unix krtld genunix]
[0]> gnttab_init+0xce/W 403
gnttab_init+0xce: 0x3=0x403
[0]> :c
Login as user jack with password jack and start a vnc server:
  mkdir.vnc;cp.Xclients.vnc/xstartup
  vncserver
Use ifconfig xnf0 to get the IP address of the VM and point a vnc client at IP:5901. (you may obtain TightVNC viewer at hap://www.tightvnc.com/)
Perform the install. Set a root password. Do not create an additional user. Do NOT reboot. Open a root terminal session and make the kernel patch on the installed image:
mdb -w /a/platform/i86xpv/kernel/amd64/unix
> gnttab_init+0xce?W 403
unix'gnttab_init+0xce: 0x403=0x403
>$q
Copy the patched kernel and ramdisk to a remote location:
/usr/bin/scp -S/usr/bin/ssh
  /a/platform/i86xpv/kernel/amd64/unix REMOTE-IP:/unix-patched-amd64-osol.2008.05
/usr/bin/scp -S /usr/bin/ssh /a/platform/i86pc/amd64/boot_archive REMOTE-IP: /boot_archive-amd64-osol.2008.05
Use scp to pull these files to the grid controller and then push them to the dom0 working directory.
In the VM console shutdown -y -i0 -g0

Create a UPS Image from the ZFS Image
  On dom0, in /var/AppLogic™/osol_filer_build:
  dd if=/dev/zero of =disk-image-ufs bs=1k seek-3071k count=1k
  dd if=/dev/zero of =disk-image-filer bs=1k seek=899k count=1k
  losetup /dev/loop1 disk-image-ufs
  losetup /dev/loop2 disk-image-filer
  xm create -c osol-2008.05-copy
  Login as root and perform the following:
    TERM=xterm
    export TERM
    tput reset
    echo 'set xnf:xnf_cksum_offload=0'>>/etc/system
    svcadm disable svc:/network/physical:nwam
    svcadm enable svc:/network/physical:default
    cp /etc/nsswitch.dns fetc/nsswitch.conf
    edit/etc/ssh/sshd_config and set PermitRootLogin yes (use::% s/PermitRootLogin no/PermitRootLogin yes/g)
    /lib/svc/method/sshd resart
    scp ufs-create-image.sh from /vol/_impex/work_Filer_Solaris on the controller to/on the running ZFS VM and execute it. This script performs the following operations:
      create a UFS volume on c4d1s0 and mount it on /ufs
      copy the root filesystem, /devices and /dev to /ufs
      fix the device names on /ufs
      create additional needed directories in /ufs
    Edit /ufs/etc/vfstab and replace the existing entries for/ and /tmp with:
    /dev/dsk/c0d0s0/dev/rdsk/c0d0s0/ufs 1 no noatime
    swap-/tmp tmpfs-yes
    bootadm update-archive -R /ufs
    shutdown -y -g0 -i0

Modify the UFS image in Preparation for Making the Appliance
   On dom0, in /var/AppLogic™/osol_filer_build, boot the newly created UFS image
      xm create -c osol-2008.05-ufs-pygrub—run
   In /vol/_impex/work_Filer_Solaris on the controller execute./ufs-modify.sh IP where IP may be the IP address of the running VM. This script performs the following operations:
      install the Solaris APK, Apache, PHP, and eXtplorer
      disable initrd ramdisk creation
      disable unnecessary services
      uninstall unnecessary packages
      bootadm update-archive
      disable boot-archive-update service
      disable ssh service
      Check the log file ufs-modify.log in case of any failure.
      In the VM console, shutdown -y -g0-i0.
Resize the UFS Image
   To accomplish the resize, boot the ZFS image and copy the UFS filesystem to a smaller volume. On dom0, in /var/AppLogic™/osol_filer_build:
      xm create -c osol-2008.05-copy
      scp ufs-resize-image.sh from /vol/_impex/work_Filer_Solaris on the controller to/on the running VM and execute it. This script performs the following operations:
         mount the modified UFS image on /src
         create a UFS volume on c4d2s0 and mount it on /dst
         copy /src to /dst
         umount /src and /dst
         In the VM console, shutdown -y -g0 -i0
         In the dom0 work directory:
         losetup -d /dev/loop0
         losetup -d /dev/loop1
         losetup -d /dev/loop2
Turn the UFS Image into a Filer Appliance
   Use scp to pull the prepared image disk-image-filer from dom0 to /vol/_impex/work_Filer_Solaris/ on the controller.
   In /vol/_impex/work_Filer_Solaris/, execute the script appliance-create.sh, which performs the following:
      rename and gzip the prepared image
      generate appropriate descriptor files
      create the release tar Filer_Solaris-1.1.0-1.tar.bz2 under /vol/_impex
   Check the log file appliance-create.log in case of any failure.
Theory of Operation
   Filer_Solaris may be a standalone appliance that provides filesystem-level access to a volumes with a ufs and/or zfs file systems.
Configuration
External Network Setup
   Filer_Solaris may have has an external interface which allows the appliance to communicate with the outside world. When the external interface needs to be configured, Filer_Solaris invokes the /appliance/appliance_netsetup.sh script to configure the external interface (found in one or more AppLogic™ gateways).
   The /appliance/appliance_netsetup.sh script assigns ip_addr (if one may be may be specified) to the external interface. This script also sets the netmask and gateway, as well as setting the DNS servers.
Log Files
   Filer_Solaris preferably does not create any additional logs. One or more logging services may be disabled.

Filer_Windows—Windows Filer—Implementation Design

Base Class
   The Windows Filer may be based on Windows Server 2003 32-bit Standard Edition, SP2. It has no base class.

Volumes
   The Windows Filer may have a has a single class volume with the following configuration:
      boot volume, named grub, with GNU GRUB installed, 8 MB
   The Windows Filer may includes a placeholder volume for the actual Window OS
      placeholder volume, named windows, 3 GB, mounted as drive "c", read-write
Packages
   The Windows Filer windows volume may contains the following additional packages:
      apache-2.2.9 (Apache License v2.0)
      php-5.2.6 (PHP License v3.01)
      eXtplorer-2.0.0_RC1-10 (GNU General Public License)
      cygwin 1.5.25-14 (GNU General Public License)
Scripts
   The Windows Filer windows volume contains the following scripts, which implement the functionality of the filer. In the appliance, these scripts may be stored at c:/appliance/scripts/.
      format.sh—setup the filer to operate in format mode (e.g., execute mkfs on the dst volume)
      fscopy.sh—setup the filer to operate in fscopy mode (e.g., mount both src and dst volumes and cp contents from src to dst)
      fsck sh—setup the filer to operate in fsck mode (e.g., execute fsck on the dst volume)
      fsrepair.sh—setup the filer to operate in fsrepair mode (e.g., execute fsck with repair option on the dst volume)
      manual.sh—setup the filer to operate in manual mode (e.g., mount the dst volume, start ssh, setup external interface)
      get_cp_progress.sh—estimates and returns the current progress for cp, in percentage. Called by the fscopy.sh script
      setenv.sh—sets various environment variables used by other scripts
   The scripts corresponding to the mode property may be invoked by c:/appliance/appliance.sh
Contents of the Release Directory
   Exported appliance image:
      filer_windows-1.0.0-1.tar.bz2
   Self-extracting executable
      Filer_Windows-1.0.0-1.msi self-extracting archive which transforms a clean Windows Server 2003 install into a the windows volume of Filer_Windows msi Build Environment
      filer_windows_msi_build-1.0.0-1.zip: zip of one or more the files used to create the self-extracting executable. This may be the build environment which may be unzipped on a Windows Server 2003 guest in order to create the msi file. It includes:
      the files which may be installed by Filer_Windows-1.0.0-1.msi
      Filer_Windows.aip the Advanced Installer project file used to create Filer_Windows-1.0.0-1.msi
   Install Environment
      filer_windows_install-1.0.0-1.tar.bz2: tar of one or more the files used to assist in creating Filer_Windows.
   Tests
      filer_windows_test.tar.bz2: Windows Filer test scripts
Install Procedure
Create the Grub Boot Volume
   The boot volume of Filer_Windows may be an 8 MB ext3 volume with GNU GRUB installed in the MBR and on the filesystem. The following procedure may be used to create this volume (This may require maintainer access to the grid):

Copy and uncompress filer_windows-1.0.0-1-install-.tar.bz2 on the impex volume of the grid controller. The archive extracts its contents into the directory work_Filer_Windows.

From this directory, scp the archive grub_boot_volume_dom0.tar.gz to /var/AppLogic™/ on dom0 of srv1 and unpack it.

Install a vnc viewer on your local machine (for example TightVNC viewer available at http://www.tightvnc.com/)

In dom0 of your grid, /etc/init.d/iptables stop.

Download the Fedora Live CD to the _impex volume of your grid; scp it to the directory /var/AppLogic™/grub_boot_volume/ in dom0.

In the dom0 working directory dd if=/dev/zero of=grub-image bs=1k count=8192 losetup /dev/loop0 grub-image

Edit the file run-fedora-livecd to include the IP address of srv1 for vnclisten, e.g. vnclisten='192.168.100.100'. Also verify that the correct name may be used for the livecd iso image.

xm create run-fedora-livecd

Access the VM using a vnc client and create the grub boot volume:

/sbin/fdisk /dev/sda

Use the commands o, n, a and w to create an MBR and a new active partition. Execute /sbin/fdisk -l -u /dev/sda. The result may be:

device boot start end blocks id system

/dev/sda1 * 63 16064 8001 83 Linux

/sbin/mkfs.ext3/dev/sda1 to create a new ext3 filesystem on the first primary partition of /dev/sda.

mkdir /mnt/tmp; mount /dev/sda1 /mnt/tmp; /sbin/grub-install root-directory=/mnt/tmp /dev/sda to install grub.

In /mnt/tmp/boot/grub/ create the desired menu.1st file and 1n -s menu.1st grub.conf. For reference, the menu.1st file used with the Filer_Windows boot volume may be included in the grub_boot_volume_dom0.tar.gz archive.

umount /mnt/tmp; shutdown -y -i0 -g0

In dom0 of your grid, /etc/init.d/iptables start.

If you need to access the filesystem of the created ext3 grub based boot volume, it may not be necessary to use the livecd again. Instead, mount the filesystem with the correct offset:

mkdir tmp; mount -text3-oloop=/dev/loop1,offset=32256 grub-image tmp

Create a Windows Filer Appliance Including the Grub Boot Volume

Use scp to pull the prepared image grub-image from dom0 to /vol/_impex/work_Filer_Windows/ on the controller.

In /vol/_impex/work_Filer_Windows/, edit the file setenv.sh to use current version settings. Execute the script appliance-create.sh, which performs the following:

Rename and gzip the prepared image

Generate appropriate descriptor files

Create the release tar filer_windows-1.0.0-1.tar.bz2 under /vol/_impex

Check the log file appliance-create.log in case of any failure.

Creating the Windows Placeholder Volume

The Windows placeholder volume may be created using the standard procedure for creating virtual volumes with the Windows OSPlease see the Windows Installation Reference for instructions on how to create this volume and incorporate it into the Sys_Filer_Windows application.

Preparing the Self-Extracting Executable

In one embodiment, a self-extracting executable may be created to facilitate the creation of Windows-based filer appliances by customers who have their own license for Windows and may need to use their own copy of Windows for the installation due to licensing constraints.

The self-extracting executable may be prepared on a Windows Server 2003 VM which includes a licensed copy of Advanced Installer. Copy the archive filer_windows_msi_build-1.0.0-1.zip to the Windows VM and extract it in CA. Use Advanced Installer to create the msi.

Cygwin Packages

The msi contains a local repository of Cygwin packages. The automated install may be only capable of installing the base packages. To ensure other required packages may be installed, the repository may be created as follows:

Point e.g., to http://cygwin.com and download setup.exe to the desktop.

Execute setup.exe and Download Without Installing. Install the packages in a temporary directory. In addition to the base install, include these packages:

Archive->zip

Archive->unzip

Editors->vim

Net->curl

Net->openssh

Net->rsync

Perl->ipcalc

Perl->perl

Perl->perl-Error

Utils->bzip2

Utils->cpio

Utils->diffutils

Utils->file

Utils->patch

Web->links

Web->wget

Make a directroy c:/appliance/cygwin-package. Move the cygwin setup.exe under this directory. Move the file setup.ini and the folder release from the temporary cygwin install sub-directory under this directory as well. While reviewing the additional packages and their dependencies within the Cygwin install GUI, edit setup.ini so as to move these packages into the base install. At this point, everything needed to perform a cygwin install may be under the c:/appliance/cygwin-package directory.

Theory of Operation

Filer_windows may be a standalone appliance that provides filesystem-level access to a volume with a NTFS file system.

Configuration

External Network Setup

Filer_Windows has may have an external interface which to allows the appliance to communicate with the outside world (accept requests from a network host). When the external interface needs to be configured, Filer_Windows invokes the /appliance/appliance_netsetup.sh script to configure the external interface (found in one or more AppLogic™ gateways).

The /appliance/appliance_netsetup.sh script assigns ip_addr (if one may be specified) to the external interface. This script also sets the netmask and gateway, as well as setting the DNS servers.

Log Files

Filer_Windows may does not create any additional logs.

Volume Management Commands

In at least some embodiments, examples of various commands which may be supported may include, but are not limited to, one or more of the following (or combinations thereof):

| Command | Description |
| --- | --- |
| list | Retrieve list of volumes |
| info | Retrieve detailed information for a volume |
| set | Set volume information |
| create | Create a new volume for an application |
| destroy | Remove an existing volume from an application |
| format | Format an application user volume |
| rename | Rename an application user volume |
| resize | Resize a volume. |
| copy | Copy a volume |
| move | Move a volume to another application |
| manage | Manage a volume |
| check | List volumes in the grid than may need fixing |
| fscheck | Check the file system on a volume |
| fsrepair | Repair the file system on a volume |
| repair | Repair volume |
| migrate | Migrate volume |
| clean | Destroy unsynchronized/orphaned volume(s) |

List

| | | |
| --- | --- | --- |
| Description: | List volumes in the specified scope | |
| Syntax: | volume list --sys [--verbose][--batch] [--mounted] | |
| | volume list server=name [--verbose][--batch] [--mounted] | |
| | volume list name [--all] [--verbose] [--batch] [--mounted] | |
| Arguments: | name | application, catalog, class, cache, or server name. |
| | | For global catalogs, the format of name may be /catalog. |
| | | For application volumes, the format of name may be application. |
| | | For application class volumes, the format of name may be application:class. |
| | | For local catalogs, the format of name may be application/catalog. |
| | | For local catalog class volumes, the format of name may be application/catalog:class. |
| | | For cached volumes, the format of name may be application/volcache. |
| | | If server may be specified, name may be the name of a server. |
| | --verbose | Include volume comment in the list |
| | --batch | Display output in UDL format |
| | --mounted | Display only those volumes that may be mounted on the controller. |
| Examples: | volume list --sys - list all volumes | |
| | volume list server=srv2 - list all volumes with a mirror on 'srv2' | |
| | volume list sugarcrm - list volumes for application 'sugarcrm' | |
| | volume list sugarcrm:config - list volumes for class 'config' in application 'sugarcrm' | |
| | volume list sugarcrm/local - list volumes for local catalog of application 'sugarcrm' | |
| | volume list sugarcrm/volcache - list instance volumes for application 'sugarcrm' | |
| | volume list /system - list all volumes in global catalog 'system' | |
| | volume list /system:NAS - list all volumes for 'system' catalog class 'NAS' | |
| Notes: | If no name may be specified and the --sys option may be specified, all volumes in the grid may be listed. | |
| | If an application name may be specified and the --all option may be specified, ALL volumes for the application may be listed. | |
| | A specification of the output of this command may be found here. | |

Example Output

| Scope | Name | Size(MB) | Server | State | Filesystem | Mirrored | Mount State |
|---|---|---|---|---|---|---|---|
| perf | perf | 2500 | srv2, srv3 | ok | ext3 | Y | available |
| perf | perf1 | 2500 | srv2 | ok | ext3 | N | available |
| perf | PERF1.boot | 1650 | srv2, srv3 | ok | ext3 | Y | available |
| sugarcrm | code | 50 | srv2, srv3 | ok | ext3 | Y | in_use |
| sugarcrm | config | 50 | srv1, srv2 | ok | ext3 | Y | in_use |
| sugarcrm | data | 50 | srv3, srv1 | ok | ext3 | Y | in_use |
| sugarcrm | logs | 50 | srv2, srv3 | ok | ext3 | Y | in_use |
| test | uservol | 10 | srv2, srv3 | ok | ext3 | Y | available |
| applfc/local | in1.boot | 80 | srv1, srv2 | ok | ext3 | Y | available |
| applfc/locol | in1.usr | 200 | srv2, srv3 | ok | ext3 | Y | available |
| jsperf/catalog | PEPRF.boot | 1650 | srv2, srv3 | ok | ext3 | Y | available |
| newcat/catalog | HLB.boot | 80 | srv3, srv1 | ok | ext3 | Y | available |
| newcat/catalog | HLB.usr | 200 | srv2, srv3 | ok | ext3 | Y | available |
| newcat/catalog | IN.boot | 80 | srv2, srv3 | ok | ext3 | Y | available |
| newcat/catalog | IN.usr | 200 | srv2, srv3 | ok | ext3 | Y | available |
| applfc/volcache | main.T_DRN.boot | 901 | srv1, srv3 | ok | ext3 | Y | available |
| applfc/volcache | main.T_SRC.boot | 1101 | srv1, srv3 | ok | ext3 | Y | available |
| bh/volcache | main.LUX.boot | 80 | srv3, srv1 | ok | ext3 | Y | available |
| jsperf/volcache | main.PERF.boot | 1650 | srv2 | degraded | ext3 | Y | available |
| jsperf/volcache | main.PERF1.boot | 1650 | srv3 | degraded | ext3 | Y | available |
| jsperf/volcache | main.T_DRN.boot | 901 | srv1, srv2 | ok | ext3 | Y | available |
| perf/volcache | main.PERF.boot | 1650 | srv3, srv1 | ok | ext3 | Y | available |
| qa_appl/volcache | main.comp1.boot | 901 | srv1, srv2 | degraded | ext3 | Y | available |
| qa_appl/volcache | main.comp2.boot | 901 | srv2, srv3 | degraded | ext3 | Y | available |
| qa_appl/volcache | main.comp3.boot | 901 | srv3, srv1 | ok | ext3 | Y | auailable |
| qa_appl/volcache | main.comp4.boot | 901 | srv1, srv2 | degraded | ext3 | Y | available |
| qa_appl/volcache | main.comp5.boot | 901 | srv3, srv1 | ok | ext3 | Y | available |
| qa_appl/volcache | main.comp6.boot | 901 | srv2, srv3 | degraded | ext3 | Y | available |
| qa_appl/volcache | main.comp7.boot | 901 | srv1, srv2 | degraded | ext3 | Y | available |
| qa_appl/volcache | main.comp8.boot | 901 | srv2, srv3 | degraded | ext3 | Y | available |
| qa_gway/volcache | main.in1.boot | 80 | srv3, srv1 | ok | ext3 | Y | available |
| qa_gway/volcache | main.in2.boot | 80 | srv1, srv2 | ok | ext3 | Y | available |
| qa_gway/uolcache | main.out1.boot | 80 | srv1, srv2 | ok | ext3 | Y | available |
| qa_gway/volcache | main.out2.boot | 80 | srv3, srv1 | ok | ext3 | Y | available |
| qa_gway/volcache | main.prc1.boot | 901 | srv2, srv3 | ok | ext3 | Y | available |
| ga_gway/volcache | main.prc2.boot | 901 | srv2, srv3 | ok | ext3 | Y | available |
| sugarcrm/volcache | main.admin.boot | 80 | srv2, srv3 | ok | ext3 | Y | in_use |
| sugarcrm/volcache | main.config.boot | 80 | srv1, srv2 | ok | ext3 | Y | in_use |
| sugarcrm/volcache | main.dbase.boot | 80 | srv3, srv1 | ok | ext3 | Y | in_use |
| sugarcrm/volcache | main.logs_boot | 80 | srv3, srv1 | ok | ext3 | Y | in_use |
| sugarcrm/volcache | main.mail_boot | 80 | srv1, srv2 | ok | ext3 | Y | in_use |
| sugarcrm/volcache | main.srv1.boot | 110 | srv3, srv1 | ok | ext3 | Y | in_use |
| sugarcrm/volcache | main.srv2.boot | 110 | srv1, srv2 | ok | ext3 | Y | in_use |
| sugarcrm/volcache | main.usr.boot | 80 | srv2, srv3 | ok | ext3 | Y | in_use |
| sugarcrm/volcache | main.webs.boot | 80 | srv2, srv3 | ok | ext3 | Y | in_use |
| /proto | LINUX.boot | 2040 | srv2, srv3 | ok | ext3 | Y | available |
| /system | HLB.boot | 80 | srv1, srv2 | ok | ext3 | Y | available |
| /system | HLB.usr | 200 | srv3, srv1 | ok | ext3 | Y | in_use |
| /system | IN.boot | 80 | srv2, srv3 | ok | ext3 | Y | available |
| /system | IN.usr | 200 | srv1, srv2 | ok | ext3 | Y | in use |
| /system | LUX.boot | 80 | srv3, srv1 | ok | ext3 | Y | available |
| /system | LUX.usr | 200 | srv2, srv3 | ok | ext3 | Y | available |
| /system | MYSQL.boot | 80 | srv1, srv2 | ok | ext3 | Y | available |
| /system | MYSQL.usr | 200 | srv3, srv1 | ok | ext3 | Y | in_use |
| /system | NAS.boot | 80 | srv2, srv3 | ok | ext3 | Y | available |
| /system | NAS.usr | 200 | srv1, srv2 | ok | ext3 | Y | in_use |
| /system | NET.boot | 80 | srv2, srv3 | ok | ext3 | Y | available |
| /system | NET.usr | 200 | srv1, srv2 | ok | ext3 | Y | available |
| /system | OUT.boot | 80 | srv3, srv1 | ok | ext3 | Y | available |
| /system | OUT.usr | 200 | srv2, srv3 | ok | ext3 | Y | in_use |
| /system | WEB.boot | 110 | srv1, srv2 | ok | ext3 | Y | available |
| /system | WEB.usr | 400 | srv3, srv1 | ok | ext3 | Y | in_use |
| /test | LINUX.boot | 2040 | srv1, srv2 | ok | ext3 | Y | available |
| /test | PERF.boot | 1650 | srv1, srv2 | ok | ext3 | Y | available |

INFO

| | |
|---|---|
| Description: | Retrieve detailed information for an existing volume |
| Syntax: | volume info name [--batch] |
| Arguments: | name    name of the volume for which to retrieve information<br>The format of name may be the following:<br>application:volume - application volume<br>application:class.volume - singleton class volume<br>application/catalog:class.volume ◆ application catalog class volume<br>/catalog:class.volume ◆ global catalog class volume<br>application/volcache:subordinate.volume - application instance volume<br>--batch    Display output in UDL format |
| Examples: | volume info sugarcrm:data - Retrieve information for application user volume<br>volume info sugarcrm:NAS1.boot - Retrieve information for application singleton class volume<br>volume info sugarcrm/catalog:NAS1.boot - Retrieve information for application local catalog class volume<br>volume info /system:NAS.boot - Retrieve information for global catalog class volume |
| Notes: | A specification of the output of this command may be found here. |

Example Output

Name: sugarcrm:data
Link: no
Comment:
Size: 50 MB
State: ok
File system: ext3
Mount State: in_use
Mounted Device: none
Current Users: 1
Attributes: rw
Time Created: Sat May 27 08:16:24 2006
Time Written: Sat May 27 08:16:24 2006
Time Accessed: Sat May 27 10:58:53 2006
Number Mirrors: 2
Mirrors:
    Server State
    srv3 ok
    srv1 ok

Set

| | |
|---|---|
| Description: | Set volume information |
| Syntax: | volume set name comment=comment |
| Arguments: | name    name of volume The format of name may be the following:<br>application:volume - application volume<br>application:class.volume - singleton class volume<br>application/catalog:class.volume ◆ application catalog class volume<br>/catalog:class.volume ◆ global catalog class volume<br>comment    volume comment |
| Examples: | volume set sugarcrm:data comment="My comment" - Set information for application user volume<br>volume set sugarcrm:NAS1.boot comment="My comment" - Set information for application singleton class volume<br>volume set sugarcrm/catalog:NAS1.boot comment="My comment" - Set information for application local catalog class volume<br>volume set /system:NAS.boot - Set information for global catalog class volume |
| Notes: | None. |

Create

| | | |
|---|---|---|
| Description: | Create a new volume for an application | |
| Syntax: | volume create name [size=size] [comment=comment] [link=link] [mkfs=\|fs=fstype [fs_options=fs_options] [ mirrored=mirrored] [--prefill][-n] [--batch] | |
| Arguments: | name | Name of the volume to create. The format of name may be the following: application:[class.]volume |
| | size | volume size, units may be specified (e.g., 128 M[B], 2 G[B]). If units may be not specified, it may be assumed that the size may be specified in MB. |
| | comment | volume comment |
| | fstype | file system type |

-continued

|  |  |  |
|---|---|---|
|  | fs_options | file system-specific options used when installing the file system. This option may be only valid if fstype may be specified. AppLogic (TM) 2.3+. |
|  | link | name of application user volume to which volume may be to be linked |
|  | mirrored | volume may be mirrored. default may be 1 if multi-server grid may be configured |
|  | --prefill | Allocate ALL blocks of the volume. |
|  | -n | Skip verification that volume reference may be in the class descriptor if adding an application singleton class volume. |
| Examples: | volume create sugarcrm:data1 size=128M fs=ext3 - create application user volume |  |
|  | volume create sugarcrm:NAS1:data1 size=128M fs=ext3 - create application singleton class volume |  |
| Notes: | If the volume size may be not specified, the default volume size of 1 GB may be used. |  |
|  | See this topic for a list of supported file systems. |  |
|  | The value specified for the fs_options parameter may be a space-separated list, may be file system specific, and may be valid only in conjunction with the mkfs parameter. The following may be the options available for each supported file system: |  |
|  | ext3-snapshot | vol_group_name: string specifying the name of the LVM volume group to create on the volume. If not specified, a volume group name may be randomly generated.<br>data_percentage: percentage of the volume that may be used to store data, remaining portion of the volume may be for snapshots. If not specified, 80% of the volume may be used for data. |
|  | zfs | pool_name: the name of the pool - defaults to volume name if this may be not set<br>mountpoint: mount path of the pool root (or "legacy" or "none", e.g., mountpoint=legacy) - defaults to /pool_name<br>autoreplace: on/off - controls automatic device replacement - defaults to off<br>delegation: on/off - controls whether a non-privileged user may be granted access based on the dataset permissions defined on the dataset - defaults to on<br>failmode: wait/continue/panic - defaults to wait<br>version: 1-10 - defaults to 10 (current) |
|  | A specification of the output of this command may be found here. |  |

Destroy

| Description: | Remove an existing volume from an application |
|---|---|
| Syntax: | volume destroy name |
| Arguments: | name  Name of the volume to remove, format of name may be the following: application:[class.]volume |

-continued

| Examples: | volume destroy sugarcrm:data - Destroy application user volume |
|---|---|
|  | volume destroy sugarcrm:NAS1.boot - Destroy application singleton class volume |
| Notes: | The destroy command may fail if the volume may be currently in use. |

Format

| Description: | Format an existing application user volume |  |
|---|---|---|
| Syntax; | volume format name [mkfs=|fs=fstype [fs_options=fs_options] [--force] |  |
| Arguments: | name | Name of the volume to format. The format of name may be the following: application:volume |
|  | fstype | file system type |
|  | fs_options | file system-specific options used when installing the file system. This option may be only valid if fstype may be specified. |
|  | --force | Skip verification of format operation. |
| Examples: | volume format sugarcrm:data fs=ext3 - format application user volume |  |
| Notes: | See this topic for a list of supported file systems. |  |
|  | The value specified for the fs_options parameter may be a space-separated list, may be file system specific, and may be valid only in conjunction with the mkfs parameter. The following may be the options available for each supported file system: |  |
|  | ext3-snapshot | vol_group_name: string specifying the name of the LVM volume group to create on the volume. If not specified, a volume group name may be randomly generated.<br>data_percentage: percentage of the volume that may be used to store data, remaining portion of the volume may be for snapshots. If not specified, 80% of the volume may be used for data. |

|  |  |  |
|---|---|---|
| | zfs | pool_name: the name of the pool - defaults to volume name if this may be not set<br>mountpoint: mount path of the pool root (or "legacy" or "none", e.g., mountpoint=legacy) - defaults to /pool_name<br>autoreplace: on/off - controls automatic device replacement - defaults to off<br>delegation: on/off - controls whether a non-privileged user may be granted access based on the dataset permissions defined on the dataset - defaults to on<br>failmode: wait/continue/panic - defaults to wait<br>version: 1-10 - defaults to 10 (current) |

Rename

| | |
|---|---|
| Description: | Rename a volume in an application |
| Syntax: | volume rename name new-name |
| Arguments: | name                 Name of the existing volume to rename.<br>new-name         New name for the volume. |
| Examples: | volume rename sugarcrm:data data2 - rename application user volume |
| Notes: | name may specify an application volume. new-name may be simply the new volume name in the same application. The format for name may be application:volume. The format for new-name may be or application:volume. If the volume may be currently in use, this command may fail. |

Resize

| | |
|---|---|
| Description: | resize a volume for an application |
| Syntax: | volume resize name size=val [--prefill] |
| Arguments: | name     name of the volume to resize. May specify an application user or singleton class voluem.<br>size=val     Specify new size for the volume. Units may be specified (e.g., 128 M[B], 2 G[B]). If units may be not specified, it may be assumed that the size may be in MB. The content of the volume may fit within, the specified size.<br>--prefill     Allocate ALL blocks of the volume. |
| Notes: | This operation resizes the volume by performing a file-level copy preserving permissions, ownersheip, links, special attributes, etc. |

40

Copy

| | |
|---|---|
| Description: | Copy a volume to an application |
| Syntax: | volume copy source destination [comment= val [ mirrored=val ] [ -n ] [--overwrite [--force]]<br>volume copy source destination [--keepcomment] [ mirrored=val ] [--overwrite [--force]]<br>volume copy source destination [comment= val] [ mirrored=val ) [size=val] [--fscpy [--prefill] [fs_options=fs_options]] [ -n ] [--overwrite [--force]]<br>volume copy source destination [--stripcomment] [mirrored=val] [size=val] [--fscpy [--prefill][fs_options=fs_options]] [ -n ] [--overwrite [--force]] |
| Arguments: | source           name of the existing volume to copy. May specify any volume.<br>destination     Name of the new copied volume in the application. May specify an application user or singleton class volume.<br>comment=val    Comment that may be to be set for the destination volume.<br>mirrored=val     Set to 1 if volume may be to be mirrored. Default may be 1 if multi-server grid may be configured.<br>--keepcomment    If specified, the comment from the source volume may be set for the destination volume.<br>size=val      Specify size for new volume. Units may be specified (e.g, 128 M[B], 2 G[B]). If units may be not specified, it may be assumed that the specified value may be in MB. If not specified, the destination volume may be created with the same size as the source volume.<br>--fscpy     Perform file-level copy when copying the volume. If this option may be not specified, block-level copy may be performed. |

-continued

|   |   |   |
|---|---|---|
|   | fs_options | file system-specific options used when installing the file system. This option may be only valid if --fscpy may be specified. AppLogic (TM) 2.3+. |
|   | --prefill | Allocate ALL blocks of the volume. |
|   | --stripcomment | If specified, the comment from the source volume may be not copied to the destination volume and the comment for the destination volume may be set to empty. |
|   | -n | Skip verification that volume reference may be in the class descriptor if the destination volume may be an application singleton class volume |
| Examples: | volume copy sugarcrm:data sugarcrm:data2 - Copy application user volume | |
|   | volume copy /system:NAS.boot sugarcrm:NAS2.boot - Copy global catalog class volume to application singleton class volume | |
| Notes: | If neither comment=val or --keepcomment arguments may be specified, the comment for the new volume may be set to the comment of the source volume with "copy of:" prepended to the comment if the comment of the source volume may be non-empty. | |
|   | If the --overwrite option may be specified and the destination volume exists, the destination volume may be overwritten, otherwise the copy may be failed. | |
|   | If the --force option may be specified, the user may be not asked to confirm the overwriting of the volume if --overwrite was specified. | |
|   | If either the source or destination volume may be currently in use, this command may fail. | |
|   | If size=val argument may be specifies, the destination volume may be an application user of singleton class volume and may not already exist. | |
|   | If --fscpy and --overwrite options may be provided, the destination volume may be destroyed and re-created. | |
|   | The value specified for the fs_options parameter may be a space-separated list, may be file system specific, and may be valid only in conjunction with the --fscpy parameter. The following may be the options available for each supported file system: | |
|   | ext3-snapshot | vol_group_name: string specifying the name of the LVM volume group to create on the volume. If not specified, a volume group name may be randomly generated. |
|   |   | data_percentage: percentage of the volume that may be used to store data, remaining portion of the volume may be for snapshots. If not specified, 80% of the volume may be used for data. |
|   | zfs | pool_name: the name of the pool - defaults to volume name if this may be not set |
|   |   | mountpoint: mount path of the pool root (or "legacy" or "none", e.g., mountpoint=legacy) - defaults to /pool_name |
|   |   | autoreplace: on/off - controls automatic device replacement - defaults to off |
|   |   | delegation: on/off - controls whether a non-privileged user may be granted access based on the dataset permissions defined on the dataset - defaults to on |
|   |   | failmode: wait/continue/panic - defaults to wait |
|   |   | version: 1-10 - defaults to 10 (current) |

Move

| | |
|---|---|
| Description: | Move a volume to another application |
| Syntax: | volume move src dest |
| Arguments; | src Name of the existing volume to move. May specify an application user volume. |
|   | dst Name of the destination volume. May specify an application user volume. |
| Examples: | volume move sugarcrm:data newapp:data - Move volume from application 'sugarcrm' to application 'newapp' |
| Notes: | This command may be not supported in single workstation mode. |
|   | If the volume may be currently in use, this command may fail. |

Manage

| | | |
|---|---|---|
| Description: | Manage a volume | |
| Syntax: | volume manage name [--ro \| --rw] [ --nossh ] [prop=val]* | |
| Arguments: | name | name of the volume to be manage. |
|   | --ro | access to volume may be read-only. |
|   | --rw | access to volume may be read-write. |
|   | --nossh | do not provide SSH access to the managed volume. |
|   | prop=val | Specifies settings to configure external network access for use with the volume manager GUI/shell. The following values may be supported: |

-continued

| | |
|---|---|
| | ip - Specifies the IP address.<br>netmask - Specifies the network mask. This may be specified if ip may be specified.<br>gateway - Specifies the IP address of the default network gateway. It may be left blank only if the remote host may be on the same subnet; may be specified otherwise.<br>dns1 - Specifies the IP address of the primary DNS server used to resolve domain names. This allows the user to specify hostnames when uploading/downloading files to/from a volume.<br>dns2 - Specifies the IP address of the secondary DNS server, which may be used if the primary DNS server does not respond. |
| Examples: | volume manage sugarcrm:data --rw - manage application user volume<br>volume manage /system:NAS.boot --ro - manage global catalog class volume<br>volume manage /myapp:myvol --rw ip=192.168.1.100 netmask=255.255.255.0 gateway=192.168.1.254 - manage application user volume and set up external network access from within the volume manager. This allows the user to upload/download files to/from the specified volume to/from a remote location, all from within the volume manager GUI/shell. |
| Notes: | By default, the user may be SSH'd into the volume manager shell. The volume may be accessible under /mnt/vol. In addition, a URL may be provided to access the visual interface (eXtplorer) through which the volume may be accessed and modified (files may be uploaded, downloaded, created, edited, etc).<br>Note that the GUI does have a 10 MB file upload limitation. To upload larger files to your volume, use the volume manager shell. |

Fscheck

| | |
|---|---|
| Description: | Check the health of the file system on a volume |
| Syntax: | volume fscheck name |
| Arguments: | name    name of the volume to be checked |
| Examples: | volume fscheck sugarcrm:data - Check file system on application user volume<br>volume fscheck /system:NAS.boot - Check file system on global catalog class volume |
| Notes: | This operation may be similar to running the Linux fsck utility over a volume. |

Fsrepair

| | |
|---|---|
| Description: | Check and repair the file system on a volume |
| Syntax: | volume fsrepair name |
| Arguments: | name    name of the volume to be repaired |
| Examples: | volume fsrepair sugarcrm:data - Check and repair file system on application user volume<br>volume fsrepair /system:NAS.boot - Check and repair file system on global catalog class volume |
| Notes: | This operation may be similar to running the Linux fsck utility with the repair option over a volume. |

Check

| | | |
|---|---|---|
| Description: | List volumes that may need repair | |
| Syntax: | volume check [ --all \| --migrate \| --repair \| --error \| --link \| --sync \| --orphan ] [ --batch ] | |
| Arguments: | --all | lists all logical volumes in the grid that may be migrated, all logical volumes that may be repaired, all inaccessible volumes, all logical volumes that may be unsynchronized (belong to no entity), and all orphan volumes (mirrors that do not belong to any volume). |
| | --migrate | list all volumes in the grid that may be migrated |
| | --repair | list all degraded volumes in the grid |
| | --error | list all inaccessible volumes in the grid |
| | --link | list all volumes with broken symbolic links. |
| | --sync | list all unsynchronized volumes in the grid |
| | --orphan | list all orphan virtual volumes in the grid |
| Examples: | volume check --all - list all volumes that need fixing<br>volume check --migrate - list all volumes that need migration<br>volume check --sync - list all unsynchronized volumes | |
| Notes: | A specification of the output of this command may be found here. | |

Example Output

| System Volumes | | | | | | |
|---|---|---|---|---|---|---|
| Name | Scope | Type | Size(MR) | State | Mirrored | Linked |
| main.in2.boot | qa_conn2/volcache | REPAIR | 80 | degraded | yes | no |
| main.out.boot | qa_conn2/volcache | REPAIR | 80 | degraded | yes | no |
| main.comp8.boot | qa_app1/volcache | REPAIR | 901 | degraded | yes | no |
| main.drn3.boot | qa_app1/volcache | REPAIR | 981 | degraded | yes | no |

-continued

| | | | | | | |
|---|---|---|---|---|---|---|
| main.comp6.boot | qa_app1/volcache | REPAIR | 901 | degraded | yes | no |
| main.comp1.boot | qa_app1/volcache | REPAIR | 901 | degraded | yes | no |
| main.src2.boot | qa_app1/volcache | REPAIR | 1101 | degraded | yes | no |
| main.drn2.boot | qa_app1/volcache | REPAIR | 901 | degraded | yes | no |
| main.src3.boot | qa_app1/volcache | REPAIR | 1101 | degraded | yes | no |
| main.comp4.buot | qa_app1/volcache | REPAIR | 901 | degraded | yes | no |
| main.comp2.boot | qa_app1/volcache | REPAIR | 901 | degraded | yes | no |
| main.comp7.boot | qa_app1/volcache | REPAIR | 901 | degraded | yes | no |
| main.PERF.boot | jsperf/volcache | REPAIR | 1650 | degraded | yes | no |
| main.PERF1.boot | jsperf/volcache | REPAIR | 1650 | degraded | yes | no |
| boot | SYSTEM | REPAIR | 1023 | degraded | yes | no |
| meta | SYSTEM | REPAIR | 1029 | degraded | yes | no |
| impex | SYSTEM | REPAIR | 10239 | degraded | yes | no |

Orphan Volumes

| Name | Size(MB) | State |
|---|---|---|
| srv1.v-213a6474-31ca-4144-8c65-9562F0F39acb | 1101 | available |
| srv1.v-ce5a30d4-e8f1-48f5-92a4-d352645c2183 | 901 | available |
| srvl.v-f009b607-e7ae-4de8-824f-2269b6d08c1d | 901 | available |
| srv2.v-0e976f26-b6e4-4d1F-9637-5b1bac06477d | 901 | available |
| srv2.v-27cc7a10-cae7-4ed2-b49b-c104ab829be4 | 1101 | available |
| srv2.v-60746655-8cef-4337-8e4e-12577f4be09a | 901 | available |
| srv2.v-84b8c2d0-12d2-4361-a1bd-a304de154143 | 1101 | available |
| srv2.v-8e30bbb8-6068-487a-bc93-25269103bd8e | 901 | available |
| srv3.v-56ddebf5-735c-49fd-9348-7c5a28b44d8c | 1101 | available |
| srv3.v-ba38ba35-b1df-49fa-bb3a-02416a7594db | 1101 | available |

Migrate

| | | |
|---|---|---|
| Description: | Migrate volume(s) | |
| Syntax: | volume migrate name \| --all [ n=n-vols ] [ --nowait ] [ --force ] [ --stop ] | |
| Arguments: | name | Name of the volume(s) to migrate. |
| | --all | Migrate all volumes that need migration. |
| | n-vols | number of volumes to simultaneously migrate. If not specified, one volume at a time may be migrated. |
| | --nowait | Perform operation in the background - do not wait for it to complete. |
| | --force | Ignore failures and continue with migration |
| | --stop | Cancel migration operation for volume(s) currently being migrated. |
| Examples: | volume migrate --all - Migrate all volumes | |
| | volume migrate --all --nowait - Migrate all volumes in the background | |
| | volume migrate sugarcrm - Migrate all volumes in an application | |
| | volume migrate sugarcrm:data - Migrate an application user volume | |
| | volume migrate /system - Migrate all volumes in a global catalog | |
| | volume migrate --all --stop - Stop migration for all volumes currently being migrated. | |
| Notes: | None. | |

Repair

| | | |
|---|---|---|
| Description: | Repair volume(s) | |
| Syntax: | volume repair name \| --all [ n=n-vols ] [ --nowait ][ --force ] [ --stop ] | |
| Arguments: | name | Name of the volume(s) to repair. |
| | --all | Repair all volumes that need repair. |
| | n-vols | number of volumes to simultaneously repair. If not specified, one volume at a time may be repaired. |
| | --nowait | Perform operation in the background - do not wait for it to complete. |
| | --force | Ignore failures and continue with repair |
| | --stop | Cancel repair operation for volume(s) currently being repaired. |
| Examples: | volume repair --all - Repair all volumes | |
| | volume repair --all --nowait - Repair all volumes in the background | |
| | volume repair sugarcrm - Repair all volumes in an application | |
| | volume repair sugarcrm:data - Repair an application user volume | |

-continued

| | |
|---|---|
| | volume repair /system- Repair all volumes in a global catalog<br>volume repair --all --stopt - Stop repair for all volumes currently being repaired |
| Notes: | None. |

Clean

| | |
|---|---|
| Description: | Destroy unsynchronized/orphaned volume(s) |
| Syntax: | volume clean [ --sync \| --orphan \| --link ] [ --force ] |
| Arguments: | --sync     Destroy unsynchronized volumes<br>--orphan   Destroy orphan volumes<br>--link     Destroy volumes with broken symbolic links<br>--force    Ignore failures and continue with clean operation |
| Examples: | volume clean - Destroy all broken link, unsynchronized and orphan volumes<br>volume clean --sync - Destroy all unsynchronized volumes<br>volume clean --orphan - Destroy all orphan volumes |
| Notes: | If no arguments may be specified, both unsynchronized and orphan volumes may be destroyed. |

Figure 11:
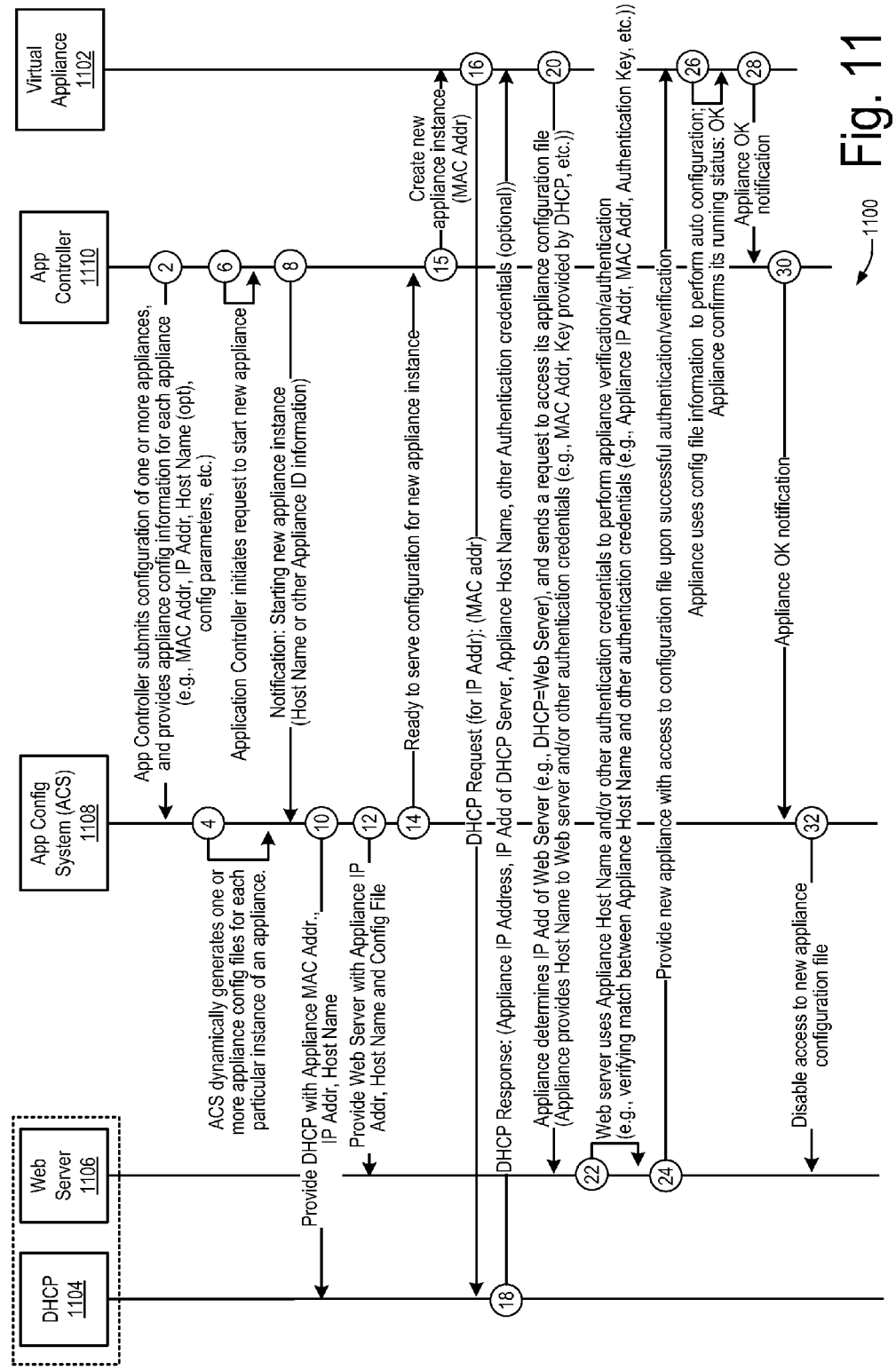
FIG. 11 shows an a specific example embodiment of an interaction diagram between various systems/devices which may be utilized for automated configuration of virtual appliances.

FIG. 11 shows an a specific example embodiment of an interaction diagram between various systems/devices which may be utilized for automated configuration of virtual appliances. In at least one embodiment, the interaction diagram of FIG. 11 illustrates one example embodiment of how a runtime instance of a virtual appliance (such as, for example, a virtual filer appliance) may be started and dynamically and automatically configured by a distributed computing network. In at least one embodiment, the automatic and custom configuration of a runtime instance of a virtual appliance may be implemented in a manner which is independent of the specific operating system of the virtual appliance being configured. In this way, the automatic and custom configuration of a runtime instance of a virtual appliance may be accomplished without knowledge of the OS inside appliance.

In the specific example embodiment of FIG. 11, it is assumed that a new runtime instance of a virtual appliance (e.g., 1102) is to be started within a virtual application running at a distributed computing network and automatically configured. As illustrated in the example embodiment of FIG. 11, the distributed computing network includes a variety of virtualized machines, appliances and/or other components, including, for example:

an Application Controller 1110;
an Appliance Configuration System (ACS) 1108;
a DHCP Server 1104;
a Web Server 1106;
etc.

In the specific example embodiment of FIG. 11, it is assumed that a virtual machine has been configured or designed to implement functionality for both the DHCP Server 1104 and Web Server 1106.

As illustrated in the example embodiment of FIG. 11, at 2, it is assumed that an Application Controller 1110 submits to the ACS 1108 information relating to the configuration of one or more appliances which may be instantiated in the virtual application. In at least one embodiment, the Application Controller may provide appliance configuration information for each appliance to be started or instantiated such as, for example, one or more of the following (or combinations thereof): Appliance MAC Address, Appliance IP Address, Appliance Host Name (optional), Appliance configuration parameters, etc.

As illustrated in the example embodiment of FIG. 11, at 4, the ACS process the Appliance configuration information provided to it by the Application Controller, and dynamically generates one or more appliance configuration files for each particular instance of an appliance which may be created or started.

As illustrated in the example embodiment of FIG. 11, at 6, the Application Controller initiates a request to start a new instance of an appliance.

As illustrated in the example embodiment of FIG. 11, at 8, the Application Controller provides notification to the ACS that a new virtual appliance instance is to be started. In at least one embodiment, the notification may include Appliance identifier information such as, for example, Appliance Host Name, Appliance MAC address, and/or other Appliance ID information.

As illustrated in the example embodiment of FIG. 11, at 10, the ACS provides the DHCP Server 1104 with the Appliance MAC address, IP Address, and Host Name associated with the new instance of the appliance which is to be created or started by the Application Controller 1110.

As illustrated in the example embodiment of FIG. 11, at 12, the ACS provides the Web Server 1106 with the Appliance IP Address, Host Name, and configuration file associated with the new instance of the appliance which is to be created or started by the Application Controller 1110.

As illustrated in the example embodiment of FIG. 11, at 14, the ACS provides notification to the Application Controller that it is ready to serve configuration for new appliance instance.

As illustrated in the example embodiment of FIG. 11, at 15, the Application Controller may respond by creating or starting a runtime instance of the identified virtual appliance. As part of this process a new VM is created for the new instance of the virtual appliance together with a new virtual network interface configured with the virtual appliance's designated MAC Address.

As illustrated in the example embodiment of FIG. 11, at 16, once the new instance of the virtual appliance has been created, the virtual appliance sends a DHCP Request to the DHCP server to obtain an IP address. In at least one embodiment, the DHCP request may include the Appliance MAC address.

As illustrated in the example embodiment of FIG. 11, at 18, the DHCP Server provides a response to the virtual appliance 1102 which, for example, may include one or more of the following (or combinations thereof): Appliance IP Address, IP Add of DHCP Server, Appliance Host Name, other authentication credentials (optional), etc.

As illustrated in the example embodiment of FIG. 11, at 20, the virtual appliance determines the IP address of Web Server 1106 (which, in the specific example embodiment is the same as the IP address of the DHCP Server), and sends a request to the Web Server to access the virtual appliance's configuration file. In at least one embodiment, the virtual appliance may provide its Host Name and/or other authentication credentials (e.g., MAC Address, key provided by DHCP, etc.) to the Web Server which, for example, may be used (1) to identify the requesting virtual appliance, and (2) validate and/or authenticate the identity of the requesting virtual appliance.

Accordingly, as illustrated in the example embodiment of FIG. 11, at 22, the Web Server uses the Appliance Host Name (and/or other authentication credentials) to perform appliance verification/authentication. For example, in one embodiment, such appliance verification/authentication may include verifying match between the Appliance Host Name and other authentication credentials (e.g., Appliance IP Address, MAC Address, Authentication Key, etc.

As illustrated in the example embodiment of FIG. 11, at 24, upon successful authentication/verification the Web Server provides the virtual appliance with access to its configuration file.

As illustrated in the example embodiment of FIG. 11, at 26 the virtual appliance uses the configuration file information to perform auto configuration, and thereafter confirms its running/operational status as "OK."

As illustrated in the example embodiment of FIG. 11, at 28, the virtual appliance provides notification of its OK status to the Application Controller, which, in turn, provides (30) notification of the virtual appliance's OK status to the ACS.

As illustrated in the example embodiment of FIG. 11, at 32, the ACS may respond by providing instructions to the Web Server to disable access to the appliance configuration file.

In at least one embodiment, a virtual appliance configuration system may be provided for configuring one or more virtual appliances in a distributed computing network. In some embodiments the system may include, for example:

a first virtual appliance including an image of an operating system (OS) operable to be loaded or booted in a first virtual machine to thereby enable a first running instance of the first virtual appliance to be created or instantiated at the distributed computing network;

a DHCP server, operable to provide at least one IP address to the first virtual appliance in response to a DHCP request received from the first virtual appliance;

an appliance configuration server, operable to facilitate access to a first appliance configuration file associated with the first virtual appliance an agent (or the appliance), operable to request the first appliance configuration file; and/or a web server, operable to provide the first virtual appliance with access to the first appliance configuration file in response to a request received from the first virtual appliance.

In at least one embodiment, the first virtual appliance includes an appliance configurator operable to automatically and dynamically configure at least one network interface of the virtual appliance using information obtained from the first appliance configuration file.

In at least one embodiment, the first virtual appliance includes a network address map resolver operable to resolve host names to remote network hosts using information obtained from the first appliance configuration file.

In at least one embodiment, the first virtual appliance includes a configuration file manipulator operable to automatically update information in at least one appliance configuration file using information obtained from the first appliance configuration file.

In at least one embodiment, the first virtual appliance includes a property extractor operable to automatically extract individual configuration parameters from the first appliance configuration file, and operable to provide access to at least a portion of the configuration parameters as separate configuration parameters for use in configuration of software operating in the virtual appliance.

In at least one embodiment, the first virtual appliance includes a volume configurator operable to automatically mount at least one virtual storage volume into file system mountpoints using volume configuration information obtained from the first appliance configuration file.

Appliance Kit (APK)

In at least one embodiment, APK may be a package of tools and runtime for creating AppLogic™ appliances out of OS installations. It includes scripts and utilities that help implement the appliance boundary, as well as a set of tools to assist appliance developers in preparing appliances.

Description

APK includes:
  user manual (this document):
    appliance boundary definition (what makes a VM an AppLogic™ appliance)
    appliance cookbook (how to build and customize appliances)
  installation guide (separate documents, one per supported target OS)
    Installation Guide for RedHat and CentOS Linux Distributions
    Installation guide for Ubuntu Linux Distributions
    Installation guide for Open Solaris and Solaris 10 Distributions
  binary archive (one per supported target), including an install script. The binary archives may be found within the AppLogic™ release folder on the ALDO server.

The APK installation supports:
  creating appliances from physical server installs or from VMware/Xen images,
  upgrading old-style (volfix) AppLogic™ appliances to APK
  upgrading new-style (APK) appliances to a newer version of APK APK may be installed either on a boot volume image mounted into a subdirectory, or on a live appliance. The following software may be installed by APK:
  All platforms:
    initialization script—sets up the network as preferable for the OS to operate as an appliance and starts the AppLogic™-specific services (VMA and CCA).
    Virtual Machine Agent (VMA), including a command to send events to the controller
    Counter Collection Agent (CCA). CCA may be started only if the appliance has a configured 'mon' terminal and the terminal may be connected.
  for Linux, a pre-compiled para-virtualized kernel may be also provided as a separate archive.

Appliance Boundary

This chapter explains in detail what may be an AppLogic™ appliance.

Overview/General

An AppLogic™ virtual appliance (or simply, appliance, in the text below) may be an instance of an OS installation or another self-contained executable entity that can run as an i386 (or x86_64) virtual machine and has the following characteristics:
  the executable code may be contained on one or more volume images, formatted either as a PC x86 bootable hard disk or as single disk partitions;
  configures itself (network, properties, etc) using the dhcp-based protocol described below;
  upon startup, reports success/failure to the AppLogic™ grid, using one or more utilities provided for this purpose;
  if used as part of an AppLogic™ application, communicates with other appliances using peer-to-peer ISPv4 connections—the AppLogic™ equivalent of a direct link between two Ethernet ports;

all configurable settings of the appliance may be in the form of properties—that may be, named parameters, each one with a defined type chosen from the types supported by AppLogic™ and optionally a defined range of valid values. The property types currently supported by AppLogic™ may be: string, integer, IP address.

(In at least one embodiment, AppLogic™ also supports a 'legacy' appliance, which may be not configured over the network and preferably includes its volumes to be modified off line prior to start. This type of appliance isn't covered by the present document).

Exterior Boundary

This section defines how the appliance looks to the "outside world"—that may be, to the grid controller and to other appliances on the grid. The "exterior boundary" may be implemented mostly by APK, the appliance designer does not need to do much beyond installing APK in order to make the OS behave like an AppLogic™ appliance.

Boot File Locations (PVM Appliances Only)

A para-virtualized (PVM) appliance may be one that has been configured with a virtualization-aware OS kernel, and uses the XEN hypervisor APIs for access to all hardware (console, memory, disk, network).

A para-virtualized appliance may have its initial executable image in the form of a statically-linked ELF file, optionally compressed with gzip. The initial executable may be usually the OS kernel. The appliance may also use one or more additional binaries loaded into memory at boot time (e.g., an initial ramdisk).

The locations of the initial executable and any other optional binaries may be defined in a file stored on the appliance's boot volume, and named either /boot/grub/grub.conf or /boot/grub/menu.1st The file format may be that of the GRUB configuration file (e.g., see man 8 grub). The files referred to in the grub configuration file may be relative to the boot disk's file system and may be on the boot disk image itself. Note that the GRUB binary itself need not be present—it may be not used to boot a para-virtualized appliance.

Booting para-virtualized appliances may be limited to the same file system formats as the ones supported by GRUB (E.g., ext2/3, fat, ufs, reiserfs, minix, xfs, jfs).

Network Configuration

An appliance uses its last network interface (the one appearing last in a network device discovery scan) as the service interface, used to configure itself and to communicate with the AppLogic™ grid. This interface may be referred to in AppLogic™ documentation as the 'default' interface.

Upon startup, an appliance configures itself as follows:
set up the default interface and request DHCP configuration for it
the DHCP response may contain the network parameters for the interface, plus a file name (in the filename DHCP option).
retrieve the following files using HTTP requests to port 8080 sent to the address of the server that responded to the DHCP request ($filename may be the name received in the DHCP response):
$filename.net
$filename.desc
$filename.ext
use the data contained in the retrieved files to configure itself and begin normal operation. Note that except for the DHCP-configured default interface and the local loopback interface, the appliance's network may be set up entirely according to data provided in the $filename.net configuration file (and not using any OS-specific network configuration data stored on the appliance itself).

The format of the configuration files that the appliance receives from the AppLogic™ grid may be described in the Appendix. Note that in most cases the appliance designer need not be concerned with the format of these files, as the APK initialization scripts take care to interpret them and configure the appliance accordingly. For appliances that have configurable properties, APK provides their values in various easy to use 'cooked' formats which may be read by the appliance-specific code. Also, in many cases it may be possible to instruct APK to modify appliance-specific configuration files on startup and insert the values of the appliance's properties into them at the right places. See the Interior Boundary section further below.

VM Agent and Boot Completion Report

After it has configured its network, the appliance starts the VM Agent (a binary executable provided by APK), which, for example, may open a service connection to the AppLogic™ infrastructure, using one or more different protocols such as, for example, a binary protocol.

When the boot may be completed, the appliance uses the service connection to report success or failure. APK provides the preferable tools to the appliance designer to add customized code to check if the appliance started OK and report status to the grid. If failure may be reported, or if the appliance fails to contact the grid altogether, the appliance start may be considered un-successful and the virtual machine (and possibly the entire application in which this appliance participates) may be shut down.

Interior Boundary

This section describes the AppLogic™-specific services that APK provides for use within the appliance OS itself.

An appliance may be not required to use any of these services. Only the "exterior" boundary (implemented by APK and described above) may be what defines an appliance as far as AppLogic™ may be concerned. The ";interior boundary" services may be provided to help adapt an existing generic service (e.g., firewall, a mail server, or Web server program) for use as a self-contained virtual appliance running in AppLogic™.

Boot Status Check/Report

By default, when the appliance boot process completes, the APK initialization code sends a "boot completed" notification using the service connection established by the VM Agent.

This may be used by the grid as a signal that the appliance started successfully.

The appliance may be equipped with an optional "boot check" script, which may be run on completion of the OS startup and can check (in some appliance-specific way) whether the appliance may be initialized correctly and may be ready to operate. For example, if the appliance may be an HTTP server, the script might attempt to make a request to the HTTP port on the local host to verify that the HTTP daemon may be operational.

The boot check script may be a shell script named AppLogic™_appliance (stored in an OS-specific location—see the install guides), ran as "include files" (e.g., with the "." command for a Posix shell). It may be expected to return a success/failure status and optionally print an error message to the standard error stream (stderr).

Log Messages

Code on the appliance may report info, warning or error messages to be posted in the grid system log.

APK provides the 'vme' command for this purpose. It may be invoked with the following command line syntax.

vme id=log msg='text'

Note that if the message text includes spaces or other meta-characters, it may be quoted appropriately.

Network Access—Terminals

Communication between appliances in AppLogic™ may be over peer-to-peer IP connections. The endpoints of these connections may be referred to as terminals. This may be somewhat different from the "usual" setup of a multi-device network application, where most devices may be connected to a common bus (e.g., an Ethernet switch) and each appliance may connect (or mis-connect) to any other appliance on the same bus.

In contrast, AppLogic™ uses a separate "virtual wire" for each connection (equivalent to a port-to-port Ethernet cable between two network devices) and ensures that traffic goes only along those wires. This may be made possible by the fact that the AppLogic™ virtual appliances may be not limited by a fixed number of physical connection ports and can therefore dedicate a separate "virtual terminal" for each connection.

There may be two logical types of terminals:
- input terminal: a terminal on which the appliance provides a specific service (I.e, acts as a server).
- output terminal: a terminal that an appliance uses to request a service from another appliance (I.e, acts as a client).

An input terminal can have any number of output terminals connected to it. An output terminal may be connected to a single input terminal. Either kind of terminal may remain unconnected. An application designer may specify that an output terminal may be "mandatory", e.g., the appliance preferably includes the service provided on it and may not work without it being connected.

APK automatically configures the network settings for the virtual network interfaces uses as terminals. It makes the terminals visible to the appliance code by name (providing the name resolution and the preferable IP routes), as follows:
- a connected output's name resolves to the address of the appliance that may be connected on the other side, that may be, the address to which the terminal name resolves may be used directly to request a connection. For example, if the appliance has an output terminal named 'web', connectable to an http server, one might do the equivalent of a command like this: wget http://web/some-paqe.html.
- an input terminal's name resolves to the IP address of the terminal itself, thus allowing one to use the name when configuring a server, e.g., if the appliance has an input terminal named 'in' that may be supposed to respond to HTTP requests, one might add this directive to the Apache configuration file: Listen in: 80.

An output terminal that may be not connected may have its name resolve to an invalid IP address: 0.255.255.255. An appliance that may be designed to have optional outputs (which may be left unconnected) may recognize this, or be prepared to handle gracefully the "invalid address" error on an attempt to connect.

Network Access—Gateway Terminal

A gateway terminal may be a special case of an output terminal (as described above). An appliance can have at most one gateway terminal. It may be configured as regular output terminal in that the name resolves to the remote peer. In addition:
- the default route may be set to be via the peer address to which the terminal may be connected, so that connections to any address other than those belonging to regular terminals or those used by the 'default' interface (the AppLogic™ internal service network) may be routed via the gateway output.
- the DNS nameserver may be set to the gateway terminal's peer address Thus, an appliance with a gateway terminal can operate like a device connected to a "regular" LAN, intranet or WAN, within the limits of whatever name resolution and routing may be provided by the "gateway" appliance connected to the terminal. (AppLogic™ provides ready-made appliances that act as gateways, including one that provides un-restricted outgoing access to the Internet).

Properties

AppLogic™ provides configuration for appliances in the form of properties (named configuration strings). An appliance receives its configured properties on startup in the configuration files retrieved from the DHCP server (see the Exterior Boundary section above).

APK may be responsible to retrieve the configuration files and it provides the appliance properties in several formats. Any or all of these formats may be used by the appliance-specific code to read its configuration data. In addition, APK may be instructed (during installation) to use the received property values to update one or more files on the appliance (see the next sub-section-Automatic Configuration File Update).

APK provides the property values in the following formats. The file names for each format may be provided in parentheses. The location of the files in the appliance file system may be OS-specific (see the install guide for each OS).
- raw (appliance.conf): a text file, containing one property value per line. Each line starts with the property name, followed by a single space character and the property value extending to the end of the line. The values may be provided verbatim, with no meta-character quoting of any kind. The "raw" format may be suitable for reading with the Posix shell's 'read' command, or with read( ) or scanf( ) from binary code.
- Posix shell (appliance.sh): a text file, suitable for being included by a Bourne or Posix compatible shell script, with the "." command. Each property may be defined as an exported shell variable, prefixed with the underscore character (to avoid name conflicts with common shell variables).
- C shell (appliance.csh): a text file, suitable for being included by a C-shell script. Each property may be defined as an exported shell variable, prefixed with the underscore character.

Automatic Configuration File Update

In many cases, the appliance properties correspond directly to strings that may be inserted into an appliance-specific configuration file. In such cases, rather than writing code to read one of the APK-provided property files (described above) and generate the appropriate configuration files on each boot, it may be possible to instruct APK to apply the property values directly to the configuration file(s). This may be done in all cases where the following conditions may be met:
- the appliance has a writable disk volume (e.g., this method may be not suitable for an appliance whose volumes may be all read-only)
- the property value may be simply inserted into the configuration file
- the configuration file may be a text file
- the configuration file format allows for adding comments to it, and the program(s) using it either do not modify the file, or it re-write it keeping the comments intact.

To set up APK to do automatic config file updates on boot:
- the configuration file(s) may be "instrumented" with special comments that specify exactly where the property values may be to be inserted. An example of the instrumentation syntax may be may be found at: http://doc.3Tera.net/AppLogic™2/AdvADLPropertyMarkup.html The list of files to be updated may be configured in the APK_CONFIG_FILES setting in the AppLogic™_init config Appliance Cookbook In at least one embodiment, step-by-step "recipes" may be provided for creating several kinds of appliances and may be intended to serve as a tutorial and as a source of examples to be emulated when building new appliances.

For example, in at least some embodiments, one or more of the following recipes may be included:
- building a "blank" appliance template (basic OS installation, with no specific functionality) from scratch. This may be primarily useful for creating a few non-specialized templates which can later be re-used and configured for a specific purpose. Since a few such ready-made basic templates may be provided in the AppLogic™ system catalog, this recipe may be intended mostly for use when porting APK to a new OS type for which there may be no ready appliance in the catalog.
- Creating a "virtual private server" (VPS) appliance—a virtual machine that may be not intended to interact with other appliances and be part of a multi-tier application, but rather serve as the equivalent of a private hosted server, with a single Internet-accessible network interface.
- Building a fast-boot mini-appliance, based entirely on a read-only volume. This use case may be suitable for creating various "filer" type virtual devices that do not store persistently any data, like WAN routers, firewalls, load balancers, etc. This recipe may be specific to the Linux OS, which may be generally well-suited to operate in an embedded environment with a read-only boot volume.

Blank Appliance

OS Install

One step of this recipe may be to prepare a vanilla OS installation. This may be done outside of AppLogic™, because (for now), AppLogic™ does not provide access to the system console of a virtual machine under its control.

There may be two options for the OS install platform:
1. use a real server and install the OS on a blank hard disk
2. use a XEN virtual machine in hardware-emulation mode, to run the OS install.

Only the second option may be covered here, as being more flexible, requiring less invasive actions (e.g., swapping hard disks in a real machine) and providing more hardware independence—e.g., a relatively old OS like RedHat 9 might be set up this way and be used successfully as an AppLogic™ appliance, on hardware that may be not natively supported by the OS.

A running host with a CPU that supports HVM (E.g., newer Intel Xeon or AMD Opteron processors), and installed XEN 3.0.4 or later may be needed. Create one or more zero-filled files that may serve as the "boot disks" for the new OS. Choose their sizes according to the expected OS configuration that may be installed. the sizes may be an exact multiple of 1M (1024*1024). In most cases, a single "disk" may be enough, but for OS-es that allow some of their files to be stored on a read-only partition (e.g., the /usr file space on the various Unix-ish OS-es) might benefit from having two disks: AppLogic™ has to copy the writable boot volumes of each instantiable appliance, so making them as small as possible may be desirable.

Have the OS installation media (CD or DVD image) ready, in the form of an ISO file on the XEN host.

Have the APK archive (and DomU kernel, for Linux) ready and available on the local network, over a simple protocol like FTP or HTTP (we may need to get them from within the new OS, once it may be up and running).

Set up and run a new XEN virtual machine (in hardware-emulation mode) with the OS install ISO file as the boot disk. Here may be an example XEN config file with one emulated HDD and a CDROM (used as the boot device):

```
import os, re
arch = os.uname( ) [4]
arch_libdir = 'lib'
device_model = '/usr/' + arch_libdir +
    '/xen/bin/qemu-dm'
kernel = "/usr/lib/xen/boot/hvmloader"
builder = 'hvm'
memory = 1024
name = "hvml"
acpi = 1
apic = 0
vif = [ 'type=ioemu, mac=00:16:3e:00:00:94,
    bridge=xenbrl' ]
disk = [ 'file:/tmp/boot-disk1,ioemu:hda,w.',
    'file:/root/sol-nv-b76-x86-
    dvd.iso,hdc:cdrom,r' ]
on_poweroff='destroy'
on_crash='destroy'
on_reboot='destroy'
boot="d"
vnc=1
vncviewer=0
vncpasswd''
vnclisten='192.168.0.122'
ne2000=0
```

Once the VM goes up, a VNC connection may be opened to see its console. Even though the console may be an emulated VGA with graphical capabilities, it may be advisable to choose text-based install, if the OS has one, especially if the GUI install may be overly dependent on mouse usage. The latter doesn't work very well over VNC.

Do the OS install according to taste, taking care not to install more than could fit on the small volumes that were prepared for it. Keep the following in mind:
- (Suggestion: verify this after the OS install!) SSH server may be installed and set up to start on boot. it may have public key authentication enabled and root logins allowed. To keep your OS safe, disable password logins for root (or disable it altogether). A version of the SSH server that may be compatible with the OpenSSH format of authentication keys may be preferable. See the appropriate APK install guide for any OS-specific notes regarding SSH setup.
- do not set up more than one partition per "disk". Use of swap partitions may be not recommended for appliances, but if desired, leave that step for later (when the image may be ready and proven to run under AppLogic™). Do not set up swap partitions during install.
- The network setup may be the bare minimum preferable, so as to be able to transfer the APK files to the new OS for installation. The network setup may not be kept beyond the install phase—once the image may be ready, its network may be configured by APK.
- Do not install graphical tools/GUI, if at all possible. This may be a headless appliance, not a desktop Once the install may be done, let the installer shut down the VM and reset it. It may not auto-reboot by itself (we configured XEN to destroy the VM on attempt to reboot).

Now, modify the VM config file to use the disk as the boot device, rather than the CD/DVD image (set the boot variable to "c"), and re-start it. Alternatively, if the OS installer has the option to chain-boot from hard disk, use that instead—saves the modification of the VM config file.

Log in via VNC and check that your new OS may be running OK.

Download the APK files and do the install as described in the OS-specific install guide (including any listed steps outside of running the install script—most importantly, delete all of the network setup that was put in during the install and disable any services that need real hardware to work—e.g., 'kudzu' in RedHat, smartd, etc.).

Shut down the OS.

Linux only: strip the master boot record and any padding that comes with it from the disk image files, leaving only the actual FS partition in each image file. This may be done using 'fdisk-lu' to see the starting sector of the partition (usually 63) and then dd to grab data from the start sector to end of file. Ship the installed OS image files to an AppLogic™ grid, e.g., as follows:

1. Create a new application and add a new blank component to it. Edit the new component class (right-click Edit Class) and add un-formatted volumes with the same exact sizes as the ones created for the OS install above. Always start with the boot volume, then add the other volumes in the order in which they were set up during OS installation. In at least one embodiment, do not specify a mount point for the OS volumes.
2. For each of the volumes, do the following (the example assumes that the appliance was named my-application and the component was named newos:
3. 3t vol manage my-application:newos.volname --rw ip=avail-ip-addr netmask=mask gateway=gw
4. (use an available external EP address for your grid, with the corresponding netmask and gateway, to configure the vol manager instance with a working external network access).
   1. from the vol manager shell, download the volume image onto the disk (commands may vary with OS and the method used to transfer the volume image, also see the OS-specific APK install guide for the exact location of the appliance.desc file on the vol manager—it may be needed to find the device name):
   2. devname=sed -n -e '/volume dst/s/ *volume dst: *dev=//p'/var/run/AppLogic™/appliance.desc'
   3. wget -o $devname ftp://myftphost/osimage.boot
   4. exit from the vol manager shell (and repeat the above steps for other volumes, if the OS was installed on more than one volume).
5. Once all volumes have been copied, start the application and log into the appliance (from the AppLogic™ shell):
6. application start my-application
7. ssh my-application:main.newos
8. (or if using the remote-access macros: ca my-application; astart; assh newos;)

9. Check the log file for any unusual error messages. If needed correct any glitches found (e.g., disable any useless hardware-related service that wasn't disabled during the initial setup and now fails, because it can't see its favorite piece of metal).

The new blank appliance may be now almost ready for being moved into a catalog. Final cleanups:
1. delete all log files, clean out the temp file directory
2. zap all free space on the disks, e.g., using commands like these (repeat for each volume, e.g., once for/and once for /usr, if these may be your two volume mount points):
3. cat/dev/zero >/path/to/somefile where /path/to may be a directory somewhere on the volume
4. wait for the cat command to fail (with disk full)
5. rm /path/to/somefile
6. If one or more of the appliance volumes were designated to become read-only: stop the application, and edit the appliance class to set them as read-only. Restart and log back in to see if it still works.
7. Stop the application, move the singleton into a catalog of your choice (e.g., 'user', which may be always present on a grid and writable).

Creating a VPS Template

This recipe builds on the "Blank Appliance" one, and adds the following customizations, appropriate for using the appliance as a general purpose virtual server:

an internet-accessible network interface secondary SSH login with its own configuration file and access key setup, independent of the automatic setup performed by APK for the benefit of the 'ssh' command of the AppLogic™ shell.

configuration properties to facilitate the use of the VPS appliance class for easy provisioning (E.g., simple/automated making of copies of the VPS to rent out to clients).

One step may be to create the OS image for the future VPS template. The "Blank Appliance" recipe described above may be used, or one can start from an existing blank appliance class. Below are example of what may be set up differently:

larger disk volume, with more software pre-installed the appliance class may not become a catalog class, instead the entire application containing the VPS component may be saved as a template.

the root password may be set to empty before saving the application as a template—this may be used as an indication to the startup script to initialize the password (see the next section for more on root password configuration).

the 'external' interface may be enabled in the component descriptor (Edit Class->Interfaces, External interface).

VPS Server Configuration

The following standard properties may be defined for any VPS server appliance and exported to the application boundary, so that they may be configured with the 'application configure' command or the 'application provision' command:

| | |
|---|---|
| hostname | the VPS host name may be set to this |
| root_pw | if the root password may be empty (as it may be on the first run of the VPS), it may be set to the value of this property. This provides the initial root password, after that the property may be ignored. The VPS user may set their own root password after they log in for the first time. |
| primary_ip | external IP address of the server |
| secondary_ip | (optional) an additional IP address. |

| | |
|---|---|
| netmask | Optional netmask, if not set the server may assume that all IP addresses may be reachable directly (proxy ARP setup). If netmask may be set, both the primary_ip and secondary_ip may be on the same subnet with respect to the netmask. |
| gateway | Default gateway. If netmask may be set, this may be set as well, unless the VPS may be intended to communicate only on a local network as defined by primary_ip and netmask. |
| dns1 | DNS server address |
| dns2 | DNS server address |
| dns3 | DNS server address (optional) |

(VPS templates provided with AppLogic™ also have these properties, which allow creating an initial user account: user, user_pw)

The appliance may be outfitted with a startup script that runs immediately after the APK startup script (AppLogic™_init) and before the ssh server starts (important to keep the initial password setup safe). This script may be responsible for applying the VPS configuration properties in an OS-specific manner, as outlined in the above table.

Setting Up Two SSH Server Instances

In this step we set up a secondary SSH sever, so that the VPS may be accessible both to the client that rents it, and to the provider of the VPS (as well as to maintainers of the AppLogic™ grid itself), while each SSH instance maintains its own configuration and changes to it do not interfere with the operation of the other instance. The "primary" SSH instance, as configured by the OS install may be left for use by the VPS user(s) and may be configurable by them. The secondary instance may be dedicated to access from the grid, for the VPS provider/maintainter.

Note that the actual setup may vary with OS type and SSH server version. The examples here assume the OS may be unix-style and the server may be OpenSSH.

The two instances of the SSH server may be configured with different security settings, to match specific needs of the VPS user.

1. Copy the configuration of sshd into a new sub-directory, e.g.:
2. mkdir /etc/ssh_grid
3. cp /etc/ssh/sshd_config /etc/ssh_grid
4. Edit the original configuration file (/etc/ssh/sshd_config) and:
   remove all ListenAddress directives, if any
   add the following lines to the configuration file (with no empty lines between them):
   # $$propN: 1111:primary_ip
   ListenAddress 1111
5. Edit the copied configuration file (/etc/ssh_grid/sshd_config) and make the following changes:
   disable reverse DNS lookups:
   UseDNS no (or LookupClientHostnames no on some SSH implementations)
   disable password logins:
   PasswordAuthentication no
   allow root login (with key only):
   PermitRootLogin without-password
   set a custom key file name, which works only for root:
   AuthorizedKeysFile /root/.ssh/alt_authorized_keys
   disable GSSAPI authentication (cannot be used from the AppLogic™ controller):
   GSSAPIAuthentication no
   Remove all 'ListenAddress' options
6. Create a new auto-start script for the second ssh server, with the following commands in it:
7. # get service IP address
8. f=/var/run/AppLogic™/appliance.desc
9. p=instance: 'udlparse elst $f instance' /interface:default
10. addr='udlparse get $f $p/ip'
11.
12. # start ssh daemon
13. sshd -f /etc/ssh_grid/sshd_config -o ListenAddress=$addr Final Steps The following settings may be added to the AppLogic™_init configuration file (usually /etc/sysconfig/AppLogic™_init—see the APK install guide for exact location).

In at least one embodiment, modify the file paths to match the settings in the sshd config file for the secondary SSH instance, as configured above.

apply configuration to these files:
APK_CONFIG_FILES="/etc/ssh/sshd_config"
make AppLogic™ configure this file as the grid ssh access key
APK_AUTH_KEY_PATH=/root/.ssh/alt_authorized_keys Building a Mini-Appliance In at least one embodiment, various techniques described herein may be used to implement a fast-booting mini-appliance, based entirely on a read-only volume. A small footprint appliance like this may be the basis of a NAT gateway, load balancer and anything else that does not need to keep persistent state.

This application incorporates by reference in its entirety and for all purposes U.S. patent application Ser. No. 11/522,050, by Miloushev et al., entitled "APPARATUS, METHOD AND SYSTEM FOR RAPID DELIVERY OF DISTRIBUTED APPLICATIONS", filed Sep. 15, 2006.

This application incorporates by reference in its entirety and for all purposes U.S. patent application Ser. No. 11/024,641, by Miloushev et al., entitled "APPARATUS, METHOD AND SYSTEM FOR AGGREGRATING COMPUTING RESOURCES", filed Dec. 29, 2004.

This application incorporates by reference in its entirety and for all purposes U.S. Patent Application Ser. No. 61/068,659, by Nickolov et al., entitled "GLOBALLY DISTRIBUTED UTILITY COMPUTING CLOUD", filed Mar. 7, 2008.

This application incorporates by reference in its entirety and for all purposes U.S. Patent Application Ser. No. 61/125,334, by Nickolov et al., entitled "GLOBALLY DISTRIBUTED UTILITY COMPUTING CLOUD", filed Apr. 23, 2008.

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art It is claimed:

1. A system for facilitating manipulation of a file system on a virtual storage volume of a distributed computing network, the system comprising:
   at least one processor;
   at least one interface; and
   memory;
   a first plurality of virtual filer appliances including a first virtual filer appliance operable to perform at least one file system manipulation on at least one file system type;
   the first virtual filer appliance including an image of an operating system (OS) operable to be loaded or booted in a first virtual machine to thereby enable a first running instance of the first virtual filer appliance to be created or instantiated at the distributed computing network;
   the system being operable to:
   identify, for performing a first file system manipulation, a first virtual storage volume having a first file system, the first file system corresponding to a first file system type;
   identify, from the first plurality of virtual filer appliances, a selected virtual filer appliance that is suitable for performing the first file system manipulation at the first virtual storage volume;
   automatically starting an instance of the selected virtual filer appliance; and
   automatically providing the instance of the selected virtual filer appliance with access to the first virtual storage volume.

2. The system of claim 1 wherein the first file system type is selected from a group of file system types consisting of: Linux-based file system types, Solaris-based file system types, and Windows-based file system types.

3. A method for facilitating manipulation of a file system on a virtual storage volume of a distributed computing system, the distributed computing system comprising a first plurality of virtual filer appliances including a first virtual filer appliance operable to perform at least one file system manipulation on at least one file system type, the method comprising:
   identifying, for performing a first file system manipulation, a first virtual storage volume having a first file system, the first file system corresponding to a first file system type;
   identifying, from the first plurality of virtual filer appliances, a selected virtual filer appliance that is suitable for performing the first file system manipulation at the first virtual storage volume, the first virtual filer appliance including an image of an operating system (OS) operable to be loaded or booted in a first virtual machine to thereby enable a first running instance of the first virtual filer appliance to be created or instantiated at the distributed computing system;
   automatically starting an instance of the selected virtual filer appliance; and
   automatically providing the instance of the selected virtual filer appliance with access to the first virtual storage volume.

4. A method for facilitating manipulation of a file system on a virtual storage volume of a distributed computing network, the method comprising:
   identifying a first file system type for use in accessing files at a first virtual storage volume of the distributed computing network;
   identifying, using the first file system type, a first virtual filer application suitable for manipulating a first file system at the first virtual storage volume corresponding to the first file system type, wherein the first virtual filer application includes at least one virtual appliance, the first virtual filer application including an image of an operating system (OS) operable to be loaded or booted in a first virtual machine to thereby enable a first running instance of the first virtual filer application to be created or instantiated at the distributed computing network;
   identifying a first running instance of first virtual filer application for use in manipulating the first file system on the first virtual storage volume;
   automatically providing the first instance of the first virtual filer application with access to the first virtual storage volume; and
   automatically providing the first instance of the first virtual filer application with instructions for causing the first instance of the first virtual filer application to perform at least one file system operation at the first file system.

5. The method in claim 4 further comprising:
   automatically creating the first running instance of the first virtual filer application at the distributed computing network.

6. The method in claim 4 further comprising:
   automatically allocating an available running instance of the first virtual filer application from a pool of available filer applications at the distributed computing network.

7. A system for facilitating manipulation of a file system on a virtual storage volume of a distributed computing network, the system comprising:
   at least one processor;
   at least one interface; and
   memory;
   a first plurality of virtual filer appliances including a first virtual filer appliance operable to perform at least one file system manipulation on at least one file system type;
   the first virtual filer appliance including an image of an operating system (OS) operable to be loaded or booted in a first virtual machine to thereby enable a first running instance of the first virtual filer appliance to be created or instantiated at the distributed computing network;
   the system being operable to:
   identify a first file system type for use in accessing files at a first virtual storage volume of the distributed computing network;
   identify, using the first file system type, a first virtual filer application suitable for manipulating a first file system at the first virtual storage volume corresponding to the first file system type, wherein the first virtual filer application includes at least one virtual appliance;
   identify a first running instance of first virtual filer application for use in manipulating the first file system on the first virtual storage volume;
   automatically provide the first instance of the first virtual filer application with access to the first virtual storage volume; and
   automatically provide the first instance of the first virtual filer application with instructions for causing the first instance of the first virtual filer application to perform at least one file system operation at the first file system.

8. The system in claim 7 being further operable to:
   automatically create the first running instance of the first virtual filer application at the distributed computing network.

9. The system in claim 7 being further operable to:
automatically allocate an available running instance of the first virtual filer application from a pool of available filer applications at the distributed computing network.

10. The system of claim 7 wherein the first file system type is selected from a group of file system types consisting of: Linux-based file system types, Solaris-based file system types, and Windows-based file system types.

* * * * *